(12) United States Patent
Minamoto

(10) Patent No.: US 8,711,950 B2
(45) Date of Patent: Apr. 29, 2014

(54) APPARATUS AND METHOD FOR ADAPTED DEBLOCKING FILTERING STRENGTH

(75) Inventor: Junichi Minamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 12/369,906

(22) Filed: Feb. 12, 2009

(65) Prior Publication Data

US 2009/0207911 A1 Aug. 20, 2009

(30) Foreign Application Priority Data

Feb. 14, 2008 (JP) ................................ P2008-032893

(51) Int. Cl.
*H04N 7/12* (2006.01)
(52) U.S. Cl.
USPC .................................................... 375/240.29
(58) Field of Classification Search
USPC .................................................... 375/240.29
See application file for complete search history.

(56) References Cited

U.S. PATENT DOCUMENTS

| | | | | |
|---|---|---|---|---|
| 2006/0227881 A1* | 10/2006 | Gordon | ................... | 375/240.25 |
| 2008/0031336 A1* | 2/2008 | Yamaguchi | ............. | 375/240.16 |
| 2010/0142835 A1* | 6/2010 | Nakagami et al. | ........... | 382/233 |

FOREIGN PATENT DOCUMENTS

| | | |
|---|---|---|
| JP | 2004 180248 | 6/2004 |
| JP | 2007 36463 | 2/2007 |
| JP | 2007 184870 | 7/2007 |
| JP | 2007 184871 | 7/2007 |
| JP | 2007 235931 | 9/2007 |
| WO | WO 2007013437 A1 * | 2/2007 |

* cited by examiner

*Primary Examiner* — Richard Torrente
(74) *Attorney, Agent, or Firm* — Frommer Lawrence & Haug LLP; William S. Frommer; Ellen Marcie Emas

(57) ABSTRACT

A picture processing apparatus for carrying out decoding processing to produce picture data from a bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data.

10 Claims, 21 Drawing Sheets

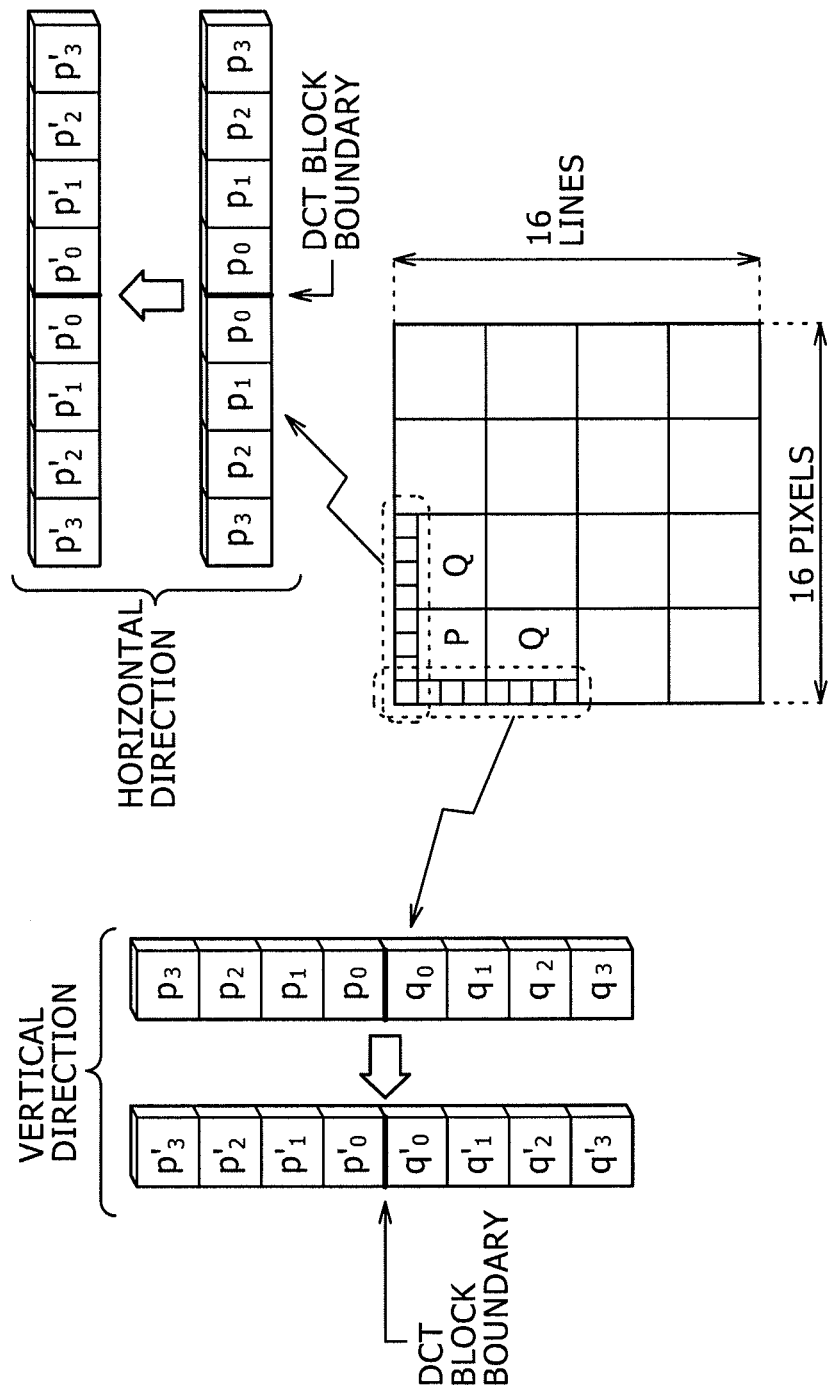

FIG. 4

| RELATION AMONG PIXELS p AND q HAVING VALUES p0 AND q0 AND THE INTRA-CODED MACROBLOCK | BS VALUE |
|---|---|
| EITHER THE PIXELS p AND q PERTAINS TO A MACROBLOCK COMPLETING AN INTRA (IN-SCREEN) CODING PROCESS AND, THE PIXEL IS POSITIONED ON A MACROBLOCK BOUNDARY | BS=4 (STRONGEST FILTERING) |
| EITHER THE PIXELS p AND q PERTAINS TO A MACROBLOCK COMPLETING AN INTRA CODING PROCESS AND THE PIXEL IS NOT POSITIONED ON A MACROBLOCK BOUNDARY | BS=3 |
| BOTH THE PIXELS p AND q DO NOT PERTAIN TO A MACROBLOCK COMPLETING AN INTRA CODING PROCESS AND EITHER OF THE PIXELS HAS AN ORTHOGONAL TRANSFORM COEFFICIENT SERVING AS A DCT COEFFICIENT | BS=2 |
| BOTH PIXELS p AND q DO NOT PERTAIN TO A MACROBLOCK COMPLETING AN INTRA CODING PROCESS, BOTH THE PIXELS DO NOT HAVE AN ORTHOGONAL TRANSFORM COEFFICIENT AND THE REFERENCE FRAMES OR THE REFERENCE-FRAME COUNTS FOR THE PIXELS ARE DIFFERENT FROM EACH OTHER OR THE MOTION VECTORS FOR THE PIXELS ARE DIFFERENT FROM EACH OTHER | BS=1 |
| BOTH PIXELS p AND q DO NOT PERTAIN TO A MACROBLOCK COMPLETING AN INTRA CODING PROCESS, BOTH THE PIXELS DO NOT HAVE AN ORTHOGONAL TRANSFORM COEFFICIENT AND THE PIXELS SHARE THE SAME REFERENCE FRAME AS WELL AS THE SAME MOTION VECTOR | BS=0 (NO FILTERING) |

APPARATUS AND METHOD FOR ADAPTED DEBLOCKING FILTERING STRENGTH

CROSS REFERENCES TO RELATED APPLICATIONS

The present invention contains subject matter related to Japanese Patent Application JP 2008-032893 filed in the Japan Patent Office on Feb. 14, 2008, the entire contents of which being incorporated herein by reference.

BACKGROUND OF THE INVENTION

1. Field of the Invention

The present invention relates to a picture processing apparatus, a picture processing method adopted by the picture processing apparatus, a picture processing method program implementing the picture processing method and a recording medium used for recording the picture processing method program. For example, the embodiments of the present invention can be applied to a stream decoding apparatus capable of decoding an MPEG (Moving Picture Experts Group)-2 bit stream and an MPEG-4 Part10 AVC (Advanced Video Coding) bit stream which is referred to as an H.264/AVC bit stream in the following description. In comparison with the existing technology, a technology according to the embodiments of the present invention are capable of effectively avoiding deteriorations of the quality of a picture with a high degree of reliability by making use of a simple configuration. This is because, as will be described later in detail, the embodiments of the present invention set boundary-strength determination information in accordance with whether an intra coding process or an inter coding process has been carried out on adjacent predicted-value generation units and in accordance with whether or not a boundary between adjacent orthogonal transform process units coincides with a boundary between the predicted-value generation units and, if prediction modes for generating predicted values in the adjacent orthogonal transform process units are different from each other, the boundary-strength determination information is set so that the strength of a filtering process becomes large in comparison with a case in which the adjacent orthogonal transform process units have the same prediction mode.

2. Description of the Related Art

The existing video apparatus carries out data compression/coding processing on moving pictures by adoption of a compression technique such as the MPEG (Moving Picture Experts Group)-2 or H.264/AVC coding/decoding method. In this patent specification, the data compression/coding processing is also referred to simply as coding processing. An MPEG-2 coding apparatus serving as an existing video apparatus adopting the MPEG-2 coding/decoding method delimits successive pictures into GOP (group of pictures) units, sets types for pictures included in each of the GOP units and rearranges the pictures in the GOP unit. In addition, the MPEG-2 coding apparatus delimits the rearranged pictures into macroblock units, each of which is used as the predicted-value generation unit cited above, and generates a prediction error, which is a difference between the true value of a macroblock unit and a predicted value according to the type of the picture, for each of the macroblock units. Subsequently, the MPEG-2 coding apparatus carries out a DCT (Discrete Cosine Transform) process on the prediction errors of the macroblock units in DCT block units, each of which is the aforementioned orthogonal transform process unit having a size of 8 pixels×8 pixels, to result in DCT coefficients. Then, the MPEG-2 coding apparatus carries out a sequential quantization process and an entropy coding process on the DCT coefficients in order to generate a bit stream.

In order to be compatible with the MPEG-2 coding apparatus having the configuration described above, an MPEG-2 decoding apparatus 1 for carrying out data decompression/decoding processing on an MPEG-2 bit stream S1 generated by the MPEG-2 coding apparatus is designed to have a configuration shown in a block diagram of FIG. 21. In this patent specification, the data decompression/decoding processing is also referred to simply as decoding processing. In the MPEG-2 decoding apparatus 1, an entropy decoding section 2 receives an MPEG-2 bit stream S1 and carries out an entropy decoding process as a part of the decoding processing, which is being carried out by the MPEG-2 decoding apparatus 1, on the MPEG-2 bit stream S1. A motion prediction section 3 detects a motion vector MV from data output by the entropy decoding section 2 and supplies the motion vector MV to a motion compensation section 4. The motion compensation section 4 carries out a motion compensation process on reference picture data stored in an FM (frame memory) 5 by making use of the motion vector MV received from the motion prediction section 3 in order to generate a predicted value corresponding to an inter coding process carried out previously by a coding apparatus to generate the MPEG-2 bit stream S1. An intra prediction section 6 to be described more later is a section for generating a predicted value corresponding to an intra coding process, which has been carried out by the coding apparatus to generate the MPEG-2 bit stream S1, on the basis of data output by an addition section 9 also to be described more later.

An inverse quantization (IQ) section 7 carries out an inverse quantization process as a part of the decoding processing, which is being carried out by the MPEG-2 decoding apparatus 1, on data output by the entropy decoding section 2 in order to generate a DCT (Discrete Cosine Transform) coefficient. The DCT coefficient is the same data as the DCT coefficient generated in the course of the coding process carried out by the MPEG-2 coding apparatus as described above. An inverse DCT transform section 8 carries out an inverse DCT process as a part of the decoding processing, which is being carried out by the MPEG-2 decoding apparatus 1, on the DCT coefficient output by the inverse quantization section 7 in order to generate a prediction error. The prediction error is the same data as the prediction error generated in the course of the coding process carried out by the MPEG-2 coding apparatus as described above. The addition section 9 cited above carries out an addition process as a part of the decoding processing, which is being carried out by the MPEG-2 decoding apparatus 1, to add a predicted value output by the motion compensation section 4 or the intra prediction section 6 to the prediction error generated by the inverse DCT transform section 8 in order to generate picture data for each macroblock. The addition section 9 outputs the picture data to the intra prediction section 6. In the MPEG-2 decoding apparatus 1, the picture data generated by the addition section 9 is stored in the frame memory 5 on a temporary basis. Then, pictures of the picture data stored in the frame memory 5 are rearranged in order to produce a video signal SV. In addition, the picture data stored in the frame memory 5 is also used as the aforementioned reference picture data supplied to the motion compensation section 4.

In the same way as the MPEG-2 coding/decoding method, in accordance with the H.264/AVC coding/decoding method, prediction errors found by carrying out intra prediction and inter prediction processes are subjected to orthogonal transform and variable-length coding processes in order to compress a moving picture. The H.264/AVC coding/decoding method is different from the data MPEG-2 coding/decoding method in that, in the case of the H.264/AVC coding/decoding method, a variety of devices are contrived so that the coding process to compress data can be carried out with an even higher degree of efficiency.

FIG. 22 is a block diagram showing an H.264/AVC decoding apparatus 11 to be compared with the MPEG-2 decoding apparatus shown in the block diagram of FIG. 21. In the H.264/AVC decoding apparatus 11, an entropy decoding section 12 receives an H.264/AVC bit stream S2 and carries out an entropy decoding process as a part of the decoding processing, which is being carried out by the H.264/AVC decoding apparatus 11, on the H.264/AVC bit stream S2. A motion prediction section 13 detects information such as a motion vector MV and information used for identifying a reference frame from data output by the entropy decoding section 12 and supplies the detected information to a motion compensation section 14. The motion compensation section 14 carries out a motion compensation process on reference picture data stored in an FM (frame memory) 15 by making use of the information received from the motion prediction section 13 in order to generate a predicted value corresponding to an inter coding process carried out by a coding apparatus to generate the H.264/AVC bit stream S2. As described above, the information received from the motion prediction section 13 includes a motion vector MV. An intra prediction section 16 to be described more later is a section for generating a predicted value corresponding to an intra coding process, which has been carried out by the coding apparatus to generate the H.264/AVC bit stream S2, on the basis of data output by an addition section 19 also to be described more later.

An inverse quantization (IQ) section 17 carries out an inverse quantization process as a part of the decoding processing, which is being carried out by the H.264/AVC decoding apparatus 11, on data output by the entropy decoding section 12 in order to generate a DCT (Discrete Cosine Transform) coefficient. The DCT coefficient is the same data as the DCT coefficient generated in the course of the coding process carried out by an H.264/AVC coding apparatus. An inverse DCT transform section 18 carries out an inverse DCT process as a part of the decoding processing, which is being carried out by the H.264/AVC decoding apparatus 11, on the DCT coefficient output by the inverse quantization section 17 in order to generate a prediction error. The prediction error is the same data as the prediction error generated in the course of the coding process carried out by the H.264/AVC coding apparatus. The addition section 19 cited above carries out an addition process as a part of the decoding processing, which is being carried out by the H.264/AVC decoding apparatus 11, to add a predicted value output by the motion compensation section 14 or the intra prediction section 16 to the prediction error generated by the inverse DCT transform section 18 in order to generate picture data. The addition section 19 outputs the picture data to the intra prediction section 16 and a deblocking filter 20.

A deblocking filter 20 removes block noises from the picture data generated by the addition section 19. In the H.264/AVC decoding apparatus 11, picture data generated by the deblocking filter 20 is stored in the frame memory 15 on a temporary basis. Then, pictures of the picture data stored in the frame memory 15 are rearranged in order to produce a video signal SV. In addition, the picture data stored in the frame memory 15 is also used as the aforementioned reference picture data supplied to the motion compensation section 14.

In the coding processing adopting the MPEG-2 or H.264/AVC coding/decoding method, if the data compression rate is increased, high-frequency components are lost in the quantization process. As a result, gradation differences are generated on boundaries between DCT blocks of the video signal SV obtained as a result of the decoding processing. In addition, in the case of a vigorous motion or the like, the prediction error also increases. As a result, high-frequency components are also lost as well in the quantization process and, thus, gradation differences are generated on boundaries between DCT blocks of the video signal SV obtained as a result of the decoding processing. On top of that, in the case of a vigorous motion, the prediction error in the macroblock also increases and, as a result, gradation differences are generated on boundaries between macroblocks. The gradation differences generated on the boundaries between DCT blocks and on the boundaries between macroblocks due to lost high-frequency components substantially deteriorate the quality of the picture. The gradation differences generated on the boundaries between DCT blocks and on the boundaries between macroblocks are referred to as block noises.

In the case of the H.264/AVC coding/decoding method, the use of a deblocking filter is prescribed. The deblocking filter is a filter for repressing the block noises. In the case of the MPEG-2 coding/decoding method, however, the use of a deblocking filter is not prescribed. Thus, in order to repress the block noises in the case of the MPEG-2 coding/decoding method, a block-noise reduction apparatus 21 is newly added to the MPEG-2 decoding apparatus 1 shown in the block diagram of FIG. 21 and provided at the output stage of the MPEG-2 decoding apparatus 1 to give a configuration shown in a block diagram of FIG. 23. The block-noise reduction apparatus 21 is an apparatus for repressing the block noises of the video signal SV. It is to be noted that, in the configuration shown in the block diagram of FIG. 23, components identical with their respective counterparts employed in the MPEG-2 decoding apparatus 1 shown in the block diagram of FIG. 21 are denoted by the same reference numerals as the counterparts and the explanation of the identical components is omitted in order to avoid duplications of descriptions.

With regard to the decoding processing adopting the MPEG-2 coding/decoding method or the like, each of Japanese Patent Laid-Open No. 2007-184870 and Japanese Patent Laid-Open No. 2007-184871 discloses a configuration omitting the process carried out by the deblocking filter, depending on a coding mode and a quantization parameter. Japanese Patent Laid-Open No. 2007-36463 discloses a configuration making use of a deblocking filter provided for the H.264/AVC data decompression/decoding apparatus in an MPEG-2 data decompression/decoding apparatus. In this patent specification, the data decompression/decoding apparatus is also referred to simply as a decoding apparatus and, by the same token, a data compression/coding apparatus is also referred to simply as a coding apparatus. In this patent specification, the decoding apparatus and the coding apparatus are also referred to as the aforementioned picture processing apparatus, which is a generic technical term provided for both the decoding apparatus and the coding apparatus.

Incidentally, in order to repress block noises so as to effectively prevent the picture quality of the video signal SV from deteriorating by making use of the block-noise reduction apparatus 21 provided at the output stage of the MPEG-2 decoding apparatus 1 as shown in the block diagram of FIG. 23, it is necessary to selectively repress merely gradation differences caused by the block noises. It is thus necessary to detect merely block-noise components from a base-band video signal with a high degree of reliability so that, in consequence, there is raised a problem of a complicated overall configuration.

As a method for solving this problem, it is conceivable to apply a technique described in Japanese Patent Laid-Open No. 2007-36463. In particular, a decoding apparatus configured to be capable of decoding both the MPEG-2 and H.264/AVC bit streams is forecasted in recent years. Thus, if the deblocking filter used in the H.264/AVC decoding apparatus can be used in the MPEG-2 decoding apparatus, the configuration of the decoding apparatus configured to be capable of decoding both the MPEG-2 and H.264/AVC bit streams can be made even simpler.

Because of existence of various processes not described by the H.264/AVC specifications as processed for the MPEG-2 coding/decoding method, however, the technique disclosed in Japanese Patent Laid-Open No. 2007-36463 raises a problem of inadequacies still existing in the practical use.

SUMMARY OF THE INVENTION

Addressing the problems described above, the embodiments of the present invention present a picture processing apparatus capable of repressing block noises with a high degree of reliability so as to effectively prevent the picture quality of the video signal SV from deteriorating by making use of a configuration simpler than the existing picture processing apparatus and presents a picture processing method to be adopted by the picture processing apparatus, a picture processing method program implementing the picture processing method as well as a recording medium used for storing the picture processing method program.

In order to solve the problems described above, in accordance with a first mode of the present invention, there is provided a picture processing apparatus for carrying out decoding processing to produce picture data from a bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, the picture processing apparatus including an inverse orthogonal transform section configured to carry out an inverse orthogonal transform process as a part of the decoding processing in order to generate the prediction error; a predicted-value generation section configured to generate the predicted value; an addition section configured to carry out an addition operation as a part of the decoding processing so as to add the predicted value generated by the predicted-value generation section to the prediction error generated by the inverse orthogonal transform section as a result of the inverse orthogonal transform process in order to generate the picture data; a deblocking filter configured to carry out a filtering process of removing block noises from the picture data output by the addition section as a result of the addition operation on the basis of filtering-location identifying information used for indicating the position of a subject of the filtering process, boundary-strength determination information used for indicating the strength of the filtering process and a quantization parameter; and a control section configured to set the filtering-location identifying information, the boundary-strength determination information as well as the quantization parameter from the bit stream and supplying the filtering-location identifying information, the boundary-strength determination information as well as the quantization parameter to the deblocking filter, wherein the control section sets the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the control section sets the boundary-strength determination information so that the strength of the filtering process becomes large in comparison with a case in which the adjacent orthogonal transform process units have the same prediction mode.

In accordance with a second mode of the present invention, there is provided a picture processing apparatus for carrying out processing to code picture data by selection of setting of picture types from a frame structure of the picture data and from a field structure of the picture data in order to generate a bit stream, the picture processing apparatus including a predicted-value generation section configured to generate a predicted value of the picture data for each predicted-value generation unit; a subtraction section configured to subtract the predicted value generated by the predicted-value generation section from the true value of the picture data in order to produce a prediction error of the picture data; an orthogonal transform section configured to carry out an orthogonal transform process on the prediction error received from the subtraction section for each orthogonal transform process unit; a quantization section configured to quantize data generated by the orthogonal transform section; a data processing section configured to process data received from the quantization section in order to generate the bit stream; a data decoding section configured to decode data received from the quantization section in order to generate the picture data; a deblocking filter configured to carry out a filtering process of removing block noises from the picture data output by the data decoding section as a decoding result on the basis of filtering-location identifying information used for indicating the position of a subject of the filtering process, boundary-strength determination information used for indicating the strength of the filtering process and a quantization parameter; and a control section configured to set the filtering-location identifying information, the boundary-strength determination information as well as the quantization parameter and supplying the filtering-location identifying information, the boundary-strength determination information as well as the quantization parameter to the deblocking filter, wherein the control section sets the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the control section sets the boundary-strength determination information so that the strength of the filtering process becomes large in comparison with a case in which the adjacent orthogonal transform process units have the same prediction mode.

In accordance with a third mode of the present invention, there is provided a picture processing apparatus for carrying out decoding processing to produce picture data selectively from a first bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, or from a second bit stream generated previously in processing performed typically by a coding apparatus to code the picture data by setting picture types for each frame and by carrying out the orthogonal transform process for each orthogonal transform process unit of the picture data on the prediction error, the picture processing apparatus including an inverse orthogonal transform section configured to carry out an inverse orthogonal transform process as a part of the decoding processing in order to generate the prediction error; a predicted-value generation section configured to generate the predicted value; an addition section configured to carry out an addition operation as a part of the decoding processing so as to add the predicted value generated by the predicted-value generation section to the prediction error generated by the inverse orthogonal transform section as a result of the inverse orthogonal transform process in order to generate the picture data; a deblocking filter configured to carry out a filtering process of removing block noises from the picture data output by the addition section as a result of the addition operation on the basis of filtering-location identifying information used for indicating the position of a subject of the filtering process, boundary-strength determination information used for indicating the strength of the filtering process and a quantization parameter; and a control section configured to set the filtering-location identifying information, the boundary-strength determination information as well as the quantization parameter from the first and second bit streams and supplying the filtering-location identifying information, the boundary-strength determination information as well as the quantization parameter to the deblocking filter, wherein the control section sets the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, in a process carried out by the control section in order to generate the boundary-strength determination information from the first bit stream, the control section sets the boundary-strength determination information so that the strength of the filtering process becomes large in comparison with a case in which the adjacent orthogonal transform process units have the same prediction mode.

In accordance with a fourth mode of the present invention, there is provided a picture processing method for carrying out decoding processing to produce picture data from a bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, the picture processing method including the steps of carrying out an inverse orthogonal transform process as a part of the decoding processing in order to generate the prediction error; generating the predicted value; carrying out an addition operation as a part of the decoding processing so as to add the predicted value generated at the predicted-value generation step to the prediction error generated at the inverse orthogonal transform step as a result of the inverse orthogonal transform process in order to generate the picture data; carrying out a filtering process of removing block noises from the picture data output at the addition step as a result of the addition operation on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter from the bit stream and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the boundary-strength determination information is set so that the strength of the filtering process becomes large in comparison with a case in which the adjacent orthogonal transform process units have the same prediction mode.

In accordance with a fifth mode of the present invention, there is provided a picture processing method for carrying out processing to code picture data by selection of setting of picture types from a frame structure of the picture data and from a field structure of the picture data in order to generate a bit stream, the picture processing method including the steps of generating a predicted value of the picture data for each predicted-value generation unit; subtracting the predicted value generated at the predicted-value generation step from the true value of the picture data in order to produce a prediction error of the picture data; carrying out an orthogonal transform process on the prediction error generated at the subtraction step for each orthogonal transform process unit; quantizing data generated at the orthogonal transform step; processing data received from the quantization step in order to generate the bit stream; decoding data received from the quantization step in order to generate the picture data; carrying out a filtering process of removing block noises from the picture data output by the data decoding step as a decoding result on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the boundary-strength determination information is set so that the strength of the filtering process becomes large in comparison with a case in which the adjacent orthogonal transform process units have the same prediction mode.

In accordance with a picture processing method for carrying out decoding processing to produce picture data selectively from a first bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, or from a second bit stream generated previously in processing performed typically by a coding apparatus to code the picture data by setting picture types for each frame and by carrying out the orthogonal transform process for each orthogonal transform process unit of the picture data on the prediction error, the picture processing method including the steps of carrying out an inverse orthogonal transform process as a part of the decoding processing in order to generate the prediction error; generating the predicted value; carrying out an addition operation as a part of the decoding processing so as to add the predicted value generated at the predicted-value generation step to the prediction error generated at the inverse orthogonal transform step as a result of the inverse orthogonal transform process in order to generate the picture data; carrying out a filtering process of removing block noises from the picture data output by the addition step as a result of the addition operation on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter from the first and second bit streams and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, in a process to generate the boundary-strength determination information from the first bit stream, the boundary-strength determination information is set so that the strength of the filtering process becomes large in comparison with a case in which the adjacent orthogonal transform process units have the same prediction mode.

In accordance with a seventh mode of the present invention, there is provided a program implementing a picture processing method for carrying out decoding processing to produce picture data from a bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, the program including the steps of carrying out an inverse orthogonal transform process as a part of the decoding processing in order to generate the prediction error; generating the predicted value; carrying out an addition operation as a part of the decoding processing so as to add the predicted value generated at the predicted-value generation step to the prediction error generated at the inverse orthogonal transform step as a result of the inverse orthogonal transform process in order to generate the picture data; carrying out a filtering process of removing block noises from the picture data output at the addition step as a result of the addition operation on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter from the bit stream and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the boundary-strength determination information is set so that the strength of the filtering process becomes large in comparison with a case in which the adjacent orthogonal transform process units have the same prediction mode.

In accordance with an eighth mode of the present invention, there is provided a program implementing a picture processing method for carrying out processing to code picture data by selection of setting of picture types from a frame structure of the picture data and from a field structure of the picture data in order to generate a bit stream, the program including the steps of generating a predicted value of the picture data for each predicted-value generation unit; subtracting the predicted value generated at the predicted-value generation step from the true value of the picture data in order to produce a prediction error of the picture data; carrying out an orthogonal transform process on the prediction error generated at the subtraction step for each orthogonal transform process unit; quantizing data generated at the orthogonal transform step; processing data received from the quantization step in order to generate the bit stream; decoding data received from the quantization step in order to generate the picture data; carrying out a filtering process of removing block noises from the picture data output by the data decoding step as a decoding result on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the boundary-strength determination information is set so that the strength of the filtering process becomes large in comparison with a case in which the adjacent orthogonal transform process units have the same prediction mode.

In accordance with a ninth mode of the present invention, there is provided a program implementing a picture processing method for carrying out decoding processing to produce picture data selectively from a first bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, or from a second bit stream generated previously in processing performed typically by a coding apparatus to code the picture data by setting picture types for each frame and by carrying out the orthogonal transform process for each orthogonal transform process unit of the picture data on the prediction error, the program including the steps of carrying out an inverse orthogonal transform process as a part of the decoding processing in order to generate the prediction error; generating the predicted value; carrying out an addition operation as a part of the decoding processing so as to add the predicted value generated at the predicted-value generation step to the prediction error generated at the inverse orthogonal transform step as a result of the inverse orthogonal transform process in order to generate the picture data; carrying out a filtering process of removing block noises from the picture data output by the addition step as a result of the addition operation on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter from the first and second bit streams and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, in a process to generate the boundary-strength determination information from the first bit stream, the boundary-strength determination information is set so that the strength of the filtering process becomes large in comparison with a case in which the adjacent orthogonal transform process units have the same prediction mode.

In accordance with a tenth mode of the present invention, there is provided a recording medium used for recording a program implementing a picture processing method for carrying out decoding processing to produce picture data from a bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, the program including the steps of carrying out an inverse orthogonal transform process as a part of the decoding processing in order to generate the prediction error; generating the predicted value; carrying out an addition operation as a part of the decoding processing so as to add the predicted value generated at the predicted-value generation step to the prediction error generated at the inverse orthogonal transform step as a result of the inverse orthogonal transform process in order to generate the picture data; carrying out a filtering process of removing block noises from the picture data output at the addition step as a result of the addition operation on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter from the bit stream and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the boundary-strength determination information is set so that the strength of the filtering process becomes large in comparison with a case in which the adjacent orthogonal transform process units have the same prediction mode.

In accordance with an eleventh mode of the present invention, there is provided a recording medium used for recording a program implementing a picture processing method for carrying out processing to code picture data by selection of setting of picture types from a frame structure of the picture data and from a field structure of the picture data in order to generate a bit stream, the program including the steps of generating a predicted value of the picture data for each predicted-value generation unit; subtracting the predicted value generated at the predicted-value generation step from the true value of the picture data in order to produce a prediction error of the picture data; carrying out an orthogonal transform process on the prediction error generated at the subtraction step for each orthogonal transform process unit; quantizing data generated at the orthogonal transform step; processing data received from the quantization step in order to generate the bit stream; decoding data received from the quantization step in order to generate the picture data; carrying out a filtering process of removing block noises from the picture data output by the data decoding step as a decoding result on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, the boundary-strength determination information is set so that the strength of the filtering process becomes large in comparison with a case in which the adjacent orthogonal transform process units have the same prediction mode.

In accordance with a twelfth mode of the present invention, there is provided a recording medium used for recording a program implementing a picture processing method for carrying out decoding processing to produce picture data selectively from a first bit stream generated previously in processing performed typically by a coding apparatus to code the picture data by selection of setting of picture types from a frame structure of the picture data and from a field structure of the picture data and by execution of an orthogonal transform process for each orthogonal transform process unit of the picture data on a prediction error, which is a difference between a predicted value generated for each predicted-value generation unit of the picture data and the true value of the picture data, or from a second bit stream generated previously in processing performed typically by a coding apparatus to code the picture data by setting picture types for each frame and by carrying out the orthogonal transform process for each orthogonal transform process unit of the picture data on the prediction error, the program including the steps of carrying out an inverse orthogonal transform process as a part of the decoding processing in order to generate the prediction error; generating the predicted value; carrying out an addition operation as a part of the decoding processing so as to add the predicted value generated at the predicted-value generation step to the prediction error generated at the inverse orthogonal transform step as a result of the inverse orthogonal transform process in order to generate the picture data; carrying out a filtering process of removing block noises from the picture data output by the addition step as a result of the addition operation on the basis of filtering-location identifying information used for indicating the position of a subject of the filtering process, boundary-strength determination information used for indicating the strength of the filtering process and a quantization parameter; and setting the filtering-location identifying information, the boundary-strength determination information as well as the quantization parameter from the first and second bit streams and supplying the filtering-location identifying information, the boundary-strength determination information as well as the quantization parameter to the deblocking filtering process step, whereby the control step is carried out to set the boundary-strength determination information in accordance with whether an intra coding process or an inter coding process has been carried out on adjacent predicted-value generation units and in accordance with whether or not a boundary between the adjacent orthogonal transform process units coincides with a boundary between the predicted-value generation units and, if prediction modes for generating the predicted values in adjacent orthogonal transform process units are different from each other, in a process to generate the boundary-strength determination information from the first bit stream, the boundary-strength determination information is set so that the strength of the filtering process becomes large in comparison with a case in which the adjacent orthogonal transform process units have the same prediction mode.

In the configurations according to the first, fourth, seventh and tenth modes of the present invention, decoding processing is carried out to produce picture data from a bit stream generated previously in processing executed typically by a coding apparatus to code the picture data by selecting the setting of picture types from a frame structure of the picture data and from a field structure of the picture data and by carrying out an orthogonal transform process for each orthogonal transform process unit of the picture data on a prediction error, which is a difference between a predicted value generated for each predicted-value generation unit of the picture data and the true value of the picture data. The decoding processing to produce picture data is carried out by executing processes including an inverse orthogonal transform process to generate the prediction error. Thus, the decoding processing can be carried out to produce picture data from a bit stream generated previously in processing executed typically by a coding apparatus to code the picture data in accordance with a coding method such as an MPEG-2 coding/decoding method implemented by selecting the setting of picture types from a frame structure of the picture data and from a field structure of the picture data. In addition, a deblocking filter is used to carry out a filtering process of removing block noises from the picture data on the basis of filtering-location identifying information, boundary-strength determination information and a quantization parameter. Thus, typically, an H.264/AVC deblocking filter can be used for carrying out the filtering process to remove block noises from the picture data, which has been obtained as a result of the decoding processing, on the basis of the filtering-location identifying information, the boundary-strength determination information and the quantization parameter. As a result, in comparison with the existing technology, a technology according to the embodiments of the present invention is capable of removing block noises by dynamically changing the strength of the filtering process in a simple configuration. That is to say, in comparison with the existing technology, the technology according to the embodiments of the present invention is capable of removing block noises with a high degree of reliability and, hence, effectively avoiding deteriorations of the quality of a picture by making use of a simple configuration. On top of that, if prediction modes for generating the predicted values in adjacent orthogonal transform process units are different from each other, the control step is carried out to set the boundary-strength determination information so that the strength of the filtering process becomes large in comparison with a case in which the adjacent predicted-value generation units have the same prediction mode.

Thus, the strength of the filtering process can be controlled to properly match the prediction mode peculiar to the bit stream which has been generated in processing executed to code the picture data by selecting the setting of picture types from a frame structure of the picture data and from a field structure of the picture data. As a result, the embodiments of the present invention are capable of removing block noises with an even higher degree of reliability and, hence, effectively avoiding deteriorations of the quality of a picture.

In the configurations according to the second, fifth, eighth and eleventh modes of the present invention, processing is carried out to code picture data by selecting the setting of picture types from a frame structure of the picture data and from a field structure of the picture data in order to generate a bit stream. Thus, processing can be carried out to code picture data to produce a bit stream by adoption of a coding method such as the MPEG-2 coding/decoding method which is implemented by selecting the setting of picture types from a frame structure of the picture data and from a field structure of the picture data. In addition, a deblocking filter in is used in the processing carried out to code the picture data in order to carry out a filtering process of removing block noises from the picture data on the basis of filtering-location identifying information, boundary-strength determination information and a quantization parameter. Thus, typically, an H.264/AVC deblocking filter can be used to for carrying out the filtering process remove block noises from the picture data, which has been obtained as a result of a decoding process included in the processing carried out to code the picture data, on the basis of the filtering-location identifying information, the boundary-strength determination information and the quantization parameter. As a result, in comparison with the existing technology, a technology according to the embodiments of the present invention is capable of removing block noises by dynamically changing the strength of the filtering process in a simple configuration. That is to say, in comparison with the existing technology, the technology according to the embodiments of the present invention is capable of removing block noises with a high degree of reliability and, hence, effectively avoiding deteriorations of the quality of a picture by making use of a simple configuration. On top of that, if prediction modes for generating the predicted values in adjacent orthogonal transform process units are different from each other, the control step is carried out to set the boundary-strength determination information so that the strength of the filtering process becomes large in comparison with a case in which the adjacent predicted-value generation units have the same prediction mode. Thus, the strength of the filtering process can be controlled to properly match the prediction mode peculiar to the bit stream which has been generated in processing executed to code the picture data by selecting the setting of picture types from a frame structure of the picture data and from a field structure of the picture data. As a result, the embodiments of the present invention are capable of removing block noises with an even higher degree of reliability and, hence, effectively avoiding deteriorations of the quality of a picture.

In the configurations according to the third, sixth, ninth and twelfth modes of the present invention, decoding processing is carried out to produce picture data selectively from a first bit stream generated previously in processing executed typically by a coding apparatus to code the picture data by selecting the setting of picture types from a frame structure of the picture data and from a field structure of the picture data or from a second bit stream generated previously in processing executed typically by a coding apparatus to code the picture data by setting picture types for each frame. Thus, the decoding processing can be carried out to produce picture data from a first bit stream generated previously in processing executed typically by a coding apparatus to code the picture data in accordance with a coding method such as the MPEG-2 coding/decoding method implemented by selecting the setting of picture types from a frame structure of the picture data and from a field structure of the picture data. Moreover, the decoding processing can also be carried out to produce picture data from a second bit stream generated previously in processing executed typically by a coding apparatus to code the picture data in accordance with a coding method such as an H.264/AVC coding/decoding method implemented by setting picture types for each frame. In addition, a deblocking filter is used to carry out a filtering process of removing block noises from the picture data, which has been obtained as a result of processing to decode a first or second bit stream, on the basis of filtering-location identifying information, boundary-strength determination information and a quantization parameter. Thus, typically, an H.264/AVC deblocking filter can be used for carrying out the filtering process to remove block noises from the picture data of a first or second bit stream on the basis of the filtering-location identifying information, the boundary-strength determination information and the quantization parameter. As a result, in comparison with the existing technology, a technology according to the embodiments of the present invention is capable of removing block noises by dynamically changing the strength of the filtering process in a simple configuration. That is to say, in comparison with the existing technology, the technology according to the embodiments of the present invention is capable of removing block noises with a high degree of reliability and, hence, effectively avoiding deteriorations of the quality of a picture by making use of a simple configuration. On top of that, if prediction modes for generating the predicted values in adjacent orthogonal transform process units are different from each other, the control step is carried out to set the boundary-strength determination information so that the strength of the filtering process becomes large in comparison with a case in which the adjacent predicted-value generation units have the same prediction mode. Thus, the strength of the filtering process can be controlled to properly match the prediction mode peculiar to the first bit stream which has been generated in processing executed to code the picture data by selecting the setting of picture types from a frame structure of the picture data and from a field structure of the picture data. As a result, the embodiments of the present invention are capable of removing block noises with an even higher degree of reliability and, hence, effectively avoiding deteriorations of the quality of a picture.

A picture processing apparatus configured in accordance with the embodiments of the present invention is capable of repressing block noises with a high degree of reliability so as to effectively prevent the picture quality of the video signal SV from deteriorating by making use of a configuration simpler than the existing picture processing apparatus.

BRIEF DESCRIPTION OF THE DRAWINGS

These and other innovations and features of the embodiments of the present invention will become clear from the following description of the preferred embodiments given with reference to the accompanying diagrams, in which

FIG. 3 is an explanatory diagram to be referred to in description of a filtering process carried out by a deblocking filter 40 employed in the decoding apparatus 31 shown in the block diagram of FIG. 2;

FIG. 4 is an explanatory table to be referred to in description of boundary-strength determination information generated by the decoding apparatus 31 shown in the block diagram of FIG. 2;

FIGS. 18A and 18B are explanatory diagrams to be referred to in description of block noises generated as a result of a coding process carried out in the frame DCT mode for the frame structure;

FIGS. 19A and 19B are explanatory diagrams to be referred to in description of block noises generated as a result of a coding process carried out in field DCT mode;

DETAILED DESCRIPTION OF THE PREFERRED EMBODIMENTS

Preferred embodiments of the invention are described by referring to diagrams as follows.

First Embodiment (1) Constitution of the Embodiment

Figure 2:
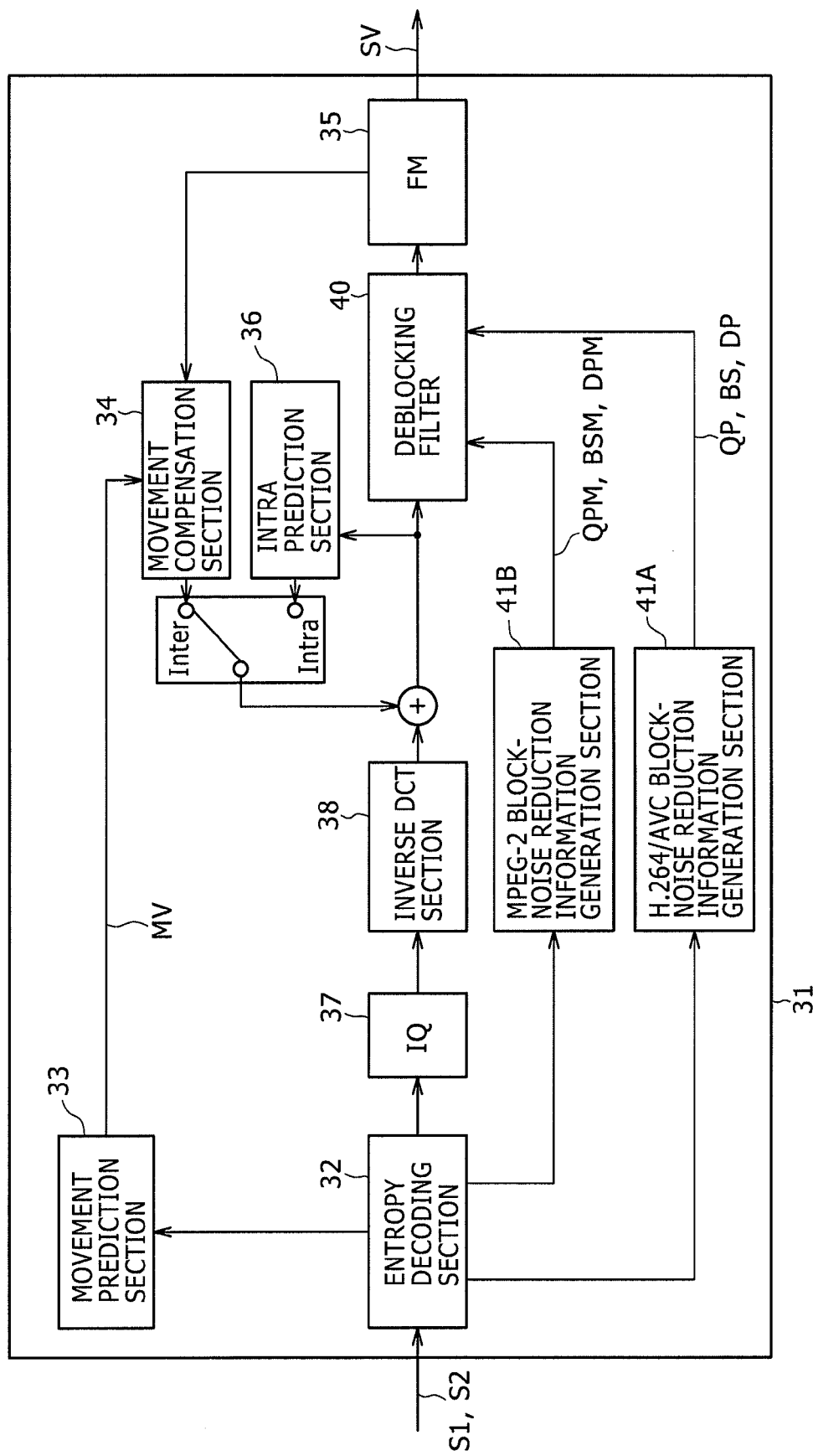
FIG. 2 is a block diagram showing the configuration of the decoding apparatus 31 according to the first embodiment of the present invention.

FIG. 2 is a block diagram showing the configuration of a decoding apparatus 31 according to a first embodiment of the present invention. The decoding apparatus 31 is a decoding apparatus capable of decoding both an MPEG-2 bit stream S1 and an H.264/AVC bit stream S2. The decoding apparatus 31 is provided with a controller for switching the components of the decoding apparatus 31 from operations for processing the MPEG-2 bit stream S1 to operations for processing the H.264/AVC bit stream S2 and vice versa so as to enable the decoding apparatus 31 to decode an MPEG-2 bit stream S1 or an H.264/AVC bit stream S2. The controller itself is not shown in the figure though.

In the decoding apparatus 31, an entropy decoding section 32 carries out an entropy decoding process as a part of the decoding processing, which is being carried out by the decoding apparatus 31, on an MPEG-2 bit stream S1 or an H.264/AVC bit stream S2 by properly switching its operation in accordance with control executed by the controller. A motion prediction section 33 extracts information such as a motion vector MV and information used for identifying a reference frame from data output by the entropy decoding section 32, supplying the extracted information to a motion compensation section 34. The motion compensation section 34 makes use of the information received from the motion prediction section 33 to carry out a motion compensation process on reference picture data stored in a FM (frame memory) 35 and outputs a predicted value corresponding to an inter coding process carried out by a coding apparatus to generate the MPEG-2 bit stream S1 or the H.264/AVC bit stream S2 to an addition section 39. As described above, the information received from the motion prediction section 33 includes a motion vector MV. An intra prediction section 36 to be described more later is a section for generating a predicted value corresponding to an intra coding process, which has been carried out by the coding apparatus to generate the MPEG-2 bit stream S1 or the H.264/AVC bit stream S2, on the basis of data output by an addition section 39 also to be described more later.

An inverse quantization (IQ) section 37 carries out an inverse quantization process as a part of the decoding processing, which is being carried out by the decoding apparatus 31, on data output by the entropy decoding section 32 in order to generate a DCT (Discrete Cosine Transform) coefficient. An inverse DCT transform section 38 carries out an inverse DCT process as a part of the decoding processing, which is being carried out by the decoding apparatus 31, on the DCT coefficient output by the inverse quantization section 37 in order to generate a prediction error. The addition section 39 cited above carries out an addition process as a part of the decoding processing, which is being carried out by the decoding apparatus 31, to add a predicted value output by the motion compensation section 34 or the intra prediction section 36 to the prediction error generated by the inverse DCT transform section 38 in order to generate picture data.

A deblocking filter 40 is configured to include a deblocking filter module employed in an H.264/AVC decoding apparatus. For example, the deblocking filter 40 is configured to include a series circuit including 4-tap FIR (Finite Impulse Response) filters each for carrying out a filtering process in the horizontal and vertical directions. The deblocking filter 40 removes block noises from the picture data output by the addition section 39 and stores the picture data with no block noises in the frame memory 35. In the decoding apparatus 31, the picture data generated by the deblocking filter 40 is held on a temporary basis in the frame memory 35. Then, pictures of the picture data stored in the frame memory 35 are rearranged in order to produce a video signal SV. In addition, the picture data stored in the frame memory 35 is also used as the aforementioned reference picture data supplied to the motion compensation section 34.

(1-1) Reduction of Block Noises in H.264/AVC

In a process of decoding an H.264/AVC bit stream S2, the deblocking filter 40 removes block noises from the picture data output by the addition section 39 by dynamically switching the filtering process from the processing for an MPEG-2 bit stream S1 to processing for the H.264/AVC bit stream S2. The deblocking filter 40 removes block noises from the picture data on the basis of filtering-location identifying information DP, boundary-strength determination information BS (Boundary Strength) and a quantization parameter QP which are received from an H.264/AVC block-noise reduction information generation section 41A provided for the H.264/AVC coding/decoding method. The H.264/AVC block-noise reduction information generation section 41A is a control section for controlling the deblocking filter 40 by properly setting the filtering-location identifying information DP, the boundary-strength determination information BS as well as the quantization parameter QP on the basis of various kinds of information included in the H.264/AVC bit stream S2 and supplying the filtering-location identifying information DP, the boundary-strength determination information BS as well as the quantization parameter QP to the deblocking filter 40.

Figure 10:
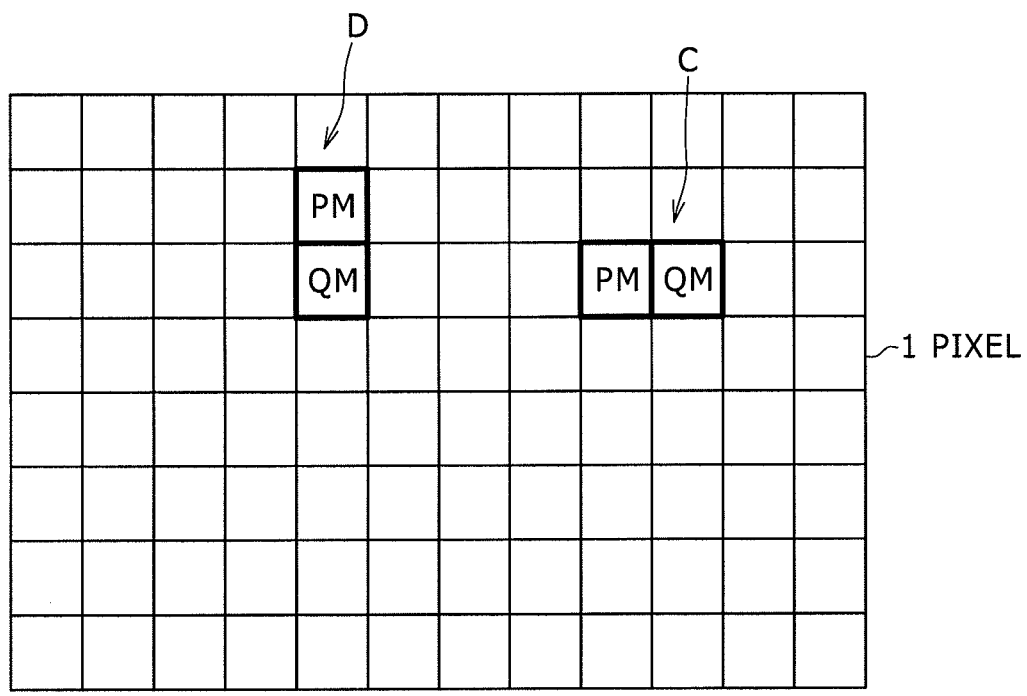
FIG. 10 is a diagram showing macroblocks Q each including a DCT block serving as a subject of processing and macroblocks P which are each adjacent to one of the macroblocks Q and are separated away from the macroblocks Q in the vertical and horizontal directions.

In a diagram of FIG. 3, reference notation Q denotes a DCT block including four lines each including four pixels. The DCT block Q is a DCT block serving as a subject of a filtering process carried out to reduce block noises. Reference notation P also denotes such a DCT block adjacent to the filtering-subject DCT block Q. In the following description, the DCT blocks Q and P are referred to as a filtering-subject DCT block Q and an adjacent DCT block P respectively. In comparison with the position of the filtering-subject DCT block Q, however, the adjacent DCT block P is placed at a location adjacent to the start of raster scan operations carried out in the horizontal and vertical directions (The reader is suggested to refer to a diagram of FIG. 10 showing macroblocks PM and QM each appearing on a screen as a macroblock MB including DCT blocks). As shown at the bottom right corner of the diagram of FIG. 3, sixteen DCT blocks P and Q compose a macroblock MB. Pixels included in the adjacent DCT block P as pixels having pixel values p3 to p0 are separated away from pixels included in the filtering-subject DCT block Q as pixels having the pixel values q0 to q3 by a DCT block boundary. After a filtering process is carried out by the deblocking filter 40 in order to remove block noises from picture data represented by the pixel values p3 to p0 and q0 to q3, the pixels included in the adjacent DCT block P have pixel values p'3 to p'0 whereas the pixels included in the filtering-subject DCT block Q have pixel values q'0 to q'3. To put it in detail, the deblocking filter 40 carries out the filtering process on picture data represented by pixel values p3 to p0 of pixels in the adjacent DCT block P and pixel values q0 to q3 of pixels in the filtering-subject DCT block Q separated away from the adjacent DCT block P in the horizontal direction by the DCT block boundary. By the same token, the deblocking filter 40 carries out a filtering process on picture data represented by pixel values p3 to p0 of pixels in the adjacent DCT block P and pixel values q0 to q3 of pixels in the filtering-subject DCT block Q separated away from the adjacent DCT block P in the vertical direction by the DCT block boundary. That is to say, each of reference notations p3 to p0 denotes a pre-filtering pixel value of a pixel in an adjacent DCT block P whereas each of reference notations q0 to q3 denotes a pre-filtering pixel value of a pixel in a filtering-subject DCT block Q. A pre-filtering pixel value p or q is a pixel value prior to a filtering process. On the other hand, reference notations p'3 to p'0 denote post-filtering pixel values of pixels included in an adjacent DCT block P as pixels with values obtained as a result of a filtering process carried out on the pixel values p3 to p0 respectively whereas reference notations q'0 to q'3 denote post-filtering pixel values of pixels included in a filtering-subject DCT block Q as pixels with values obtained as a result of a filtering process carried out on the pixel values q0 to q3 respectively.

Thus, if the filtering-subject DCT block Q serving as a subject of a filtering process carried out to reduce block noises is a DCT block at the intersection of the top row and the leftmost column in the screen, the adjacent DCT block P separated away from the filtering-subject DCT block Q in the horizontal and vertical directions as described above does not exist from the beginning. Thus, if the filtering-subject DCT block Q serving as a subject of a filtering process carried out to reduce block noises is a DCT block at the intersection of the top row and the leftmost column in the screen, the deblocking filter 40 cancels the filtering processes carried out in the horizontal and vertical directions.

The filtering-location identifying information DP is generated by the H.264/AVC block-noise reduction information generation section 41A as information used for identifying the position of a macroblock MB including the filtering-subject DCT block Q serving as a subject of a filtering process for the purpose of determining the position of the filtering-subject DCT block Q. At the bottom left corner in the diagram of FIG. 3, a block including sixteen lines each including sixteen pixels is a macroblock MB. The H.264/AVC block-noise reduction information generation section 41A generates the filtering-location identifying information DP from, among others, a slice header included in the H.264/AVC bit stream S2.

The boundary-strength determination information BS is generated by the H.264/AVC block-noise reduction information generation section 41A as information used for setting the strength of a filtering process to be carried out for the DCT block boundary. In the case of the H.264/AVC coding/decoding method, values of the boundary-strength determination information BS are defined by an explanatory table of FIG. 4. If the boundary-strength determination information BS indicates that either of the pixels having the pixel values p0 and q0 explained above by referring to the diagram of FIG. 3 pertains to a macroblock MB completing an intra coding process and, if the pixel is positioned on a macroblock boundary, the value of the boundary-strength determination information BS is set at 4 which indicates a filtering process with the largest strength.

If the boundary-strength determination information BS indicates that either of the pixels having the pixel values p0 and q0 pertains to a macroblock MB completing an intra coding process and if the pixel is not positioned on a macroblock boundary, the value of the boundary-strength determination information BS is set at 3 which indicates a filtering process with a strength second to the largest strength having the value of 4.

If the boundary-strength determination information BS indicates both the pixels having the pixel values p0 and q0 do not pertain to a macroblock MB completing an intra coding process and if either of the pixels has an orthogonal transform coefficient serving as a DCT coefficient, the value of the boundary-strength determination information BS is set at 2 which indicates a filtering-process strength at a level right below the filtering-process strength indicated by the value 3.

If the boundary-strength determination information BS indicates both the pixels having the pixel values p0 and q0 do not pertain to a macroblock MB completing an intra coding process, if both the pixels do not have an orthogonal transform coefficient and if the reference frames or the reference-frame counts for the pixels are different from each other or if the motion vectors for the pixels are different from each other, the value of the boundary-strength determination information BS is set at 1 which indicates a filtering-process strength at a level right below the filtering-process strength indicated by the value 2.

If the boundary-strength determination information BS indicates both the pixels having the pixel values p0 and q0 do not pertain to a macroblock MB completing an intra coding process, if both the pixels do not have an orthogonal transform coefficient and if the pixels share the same reference frame as well as the same motion vector, the value of the boundary-strength determination information BS is set at 0 which indicates that no filtering process is to be carried out.

Thus, the value of the boundary-strength determination information BS is set in accordance with whether an intra coding process or an inter coding process has been carried out on a DCT block serving as the subject of processing and a DCT block adjacent to the DCT block serving as the subject of processing and in accordance with whether or not the boundary between the adjacent DCT blocks each serving as an orthogonal transform process unit coincides with the boundary between adjacent predicted-value generation units which are each a macroblock MB. To put it more concretely, in the case of an intra coding process, the boundary-strength determination information BS is set at a value indicating a large strength of the filtering process in comparison with an inter coding process. In addition, for a case in which the DCT macro block boundary is a macroblock boundary, the boundary-strength determination information BS is set at a value indicating a large strength of the filtering process in comparison with a case in which the DCT macro block boundary is not a macroblock boundary.

The H.264/AVC block-noise reduction information generation section 41A generates boundary-strength determination information BS on the basis of various kinds of information including filtering-location identifying information used for indicating the position of a DCT block, information used for identifying a reference frame and motion-vector information. These pieces of information are information included in the H.264/AVC bit stream S2. In addition, the H.264/AVC block-noise reduction information generation section 41A also retrieves a quantization parameter QP from a header set in every macroblock MB.

The deblocking filter 40 carries out a filtering process for a case in which an adjacent DCT block P is placed at a location adjacent to the start of raster scan operations carried out in the horizontal and vertical directions as described before and merely if relations represented by the following inequality expressions are satisfied $BS>0$ $$|p0-q0|>\alpha; |p1-p0|<\beta; |q1-q0|<\beta \qquad (1)$$

Figure 5:
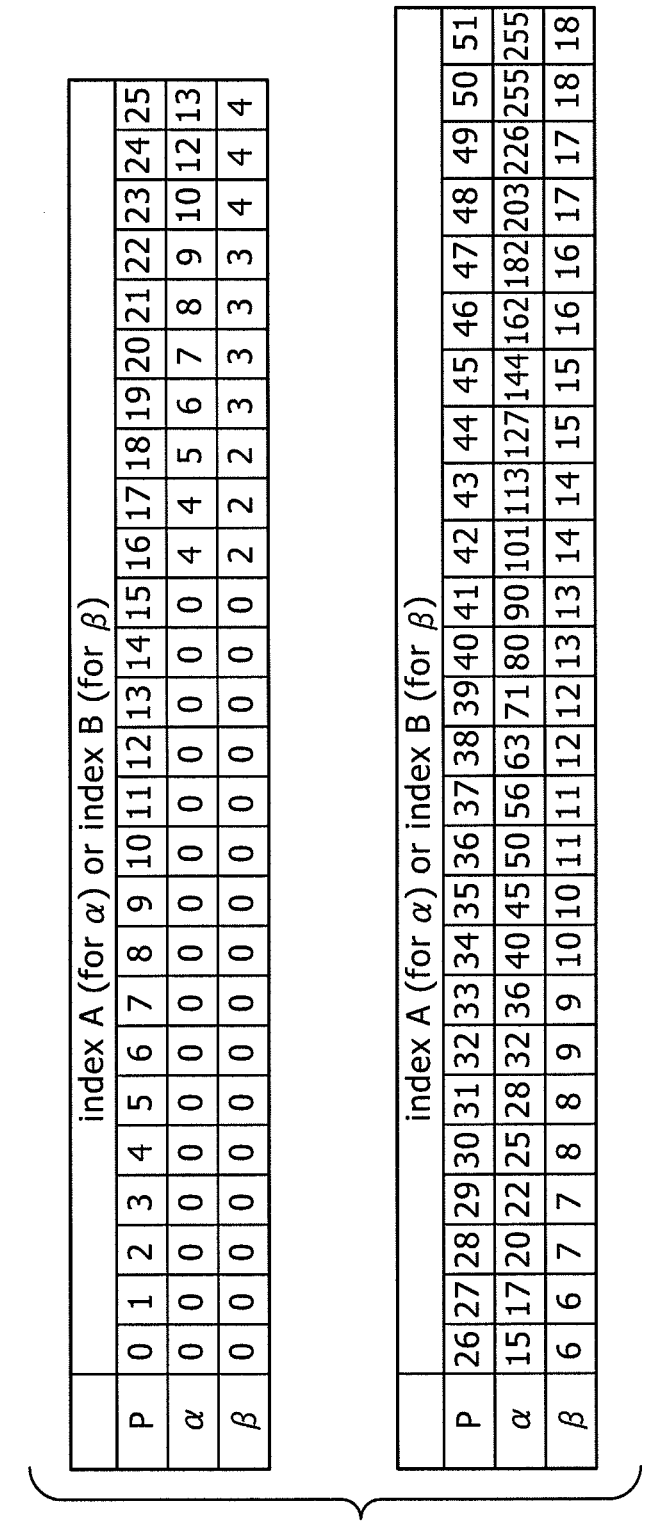
FIG. 5 shows a table to be referred to in description of a filtering process carried out by making use of the boundary-strength determination information shown in the explanatory table of FIG. 4.

Threshold values $\alpha$ and $\beta$ used in the above expressions are threshold values defined in accordance with indexes A and B respectively as shown in a diagram of FIG. 5. The indexes A and B are indexes defined in accordance with the quantization parameter QP by equations given below. It is to be noted that, in the equations given below, reference notation qPp denotes the quantization parameter QP of the adjacent DCT block P adjacent to the filtering-subject DCT block Q whereas reference notation qPq denotes the quantization parameter QP of the filtering-subject DCT block Q which serves as the subject of the filtering process. In addition, reference notation Clip3 (a, b, c) denotes an operation carried out to clip c at a and b so that the following relation is satisfied, a≤c≤b. It is to be noted that each of reference notations Filter Offset A and Filter Offset B denotes a parameter set by the user to change the strength of the filtering process.

$qPav=(qPp+qPq+1)>>1$ index $A=\text{Clip3}(0.51,qPav+\text{Filter Offset }A)$ $$\text{index } B=\text{Clip3}(0.51,qPav+\text{Filter Offset }B) \qquad (2)$$

If a filtering process is carried out and the value of the boundary-strength determination information BS is smaller than 4, the deblocking filter 40 sets the pixel values p'0 and q'0 of adjacent pixels on both the sides of the DCT block boundary in accordance with the following equations.

$p'0=\text{Clip1}(p0+\Delta)$ $q'0=\text{Clip1}(q0+\Delta)$ $$\Delta=\text{Clip3}(-tc,tc((((q0-p0)<<2)+(p1-q1)+4)>>3)) \qquad (3)$$

Reference notation Clip1 (a) used in the above equations denotes an operation to clip a whereas tc is expressed by Eq. (4) for a chroma Edge Flag of 0 or Eq. (5) for a chroma Edge Flag of a value other than 0.

$$tc=tc0+((ap<\beta)?1:0)+(aq<\beta)?1:0) \qquad (4)$$

$$tc=tc0+1 \qquad (5)$$

Figure 6:
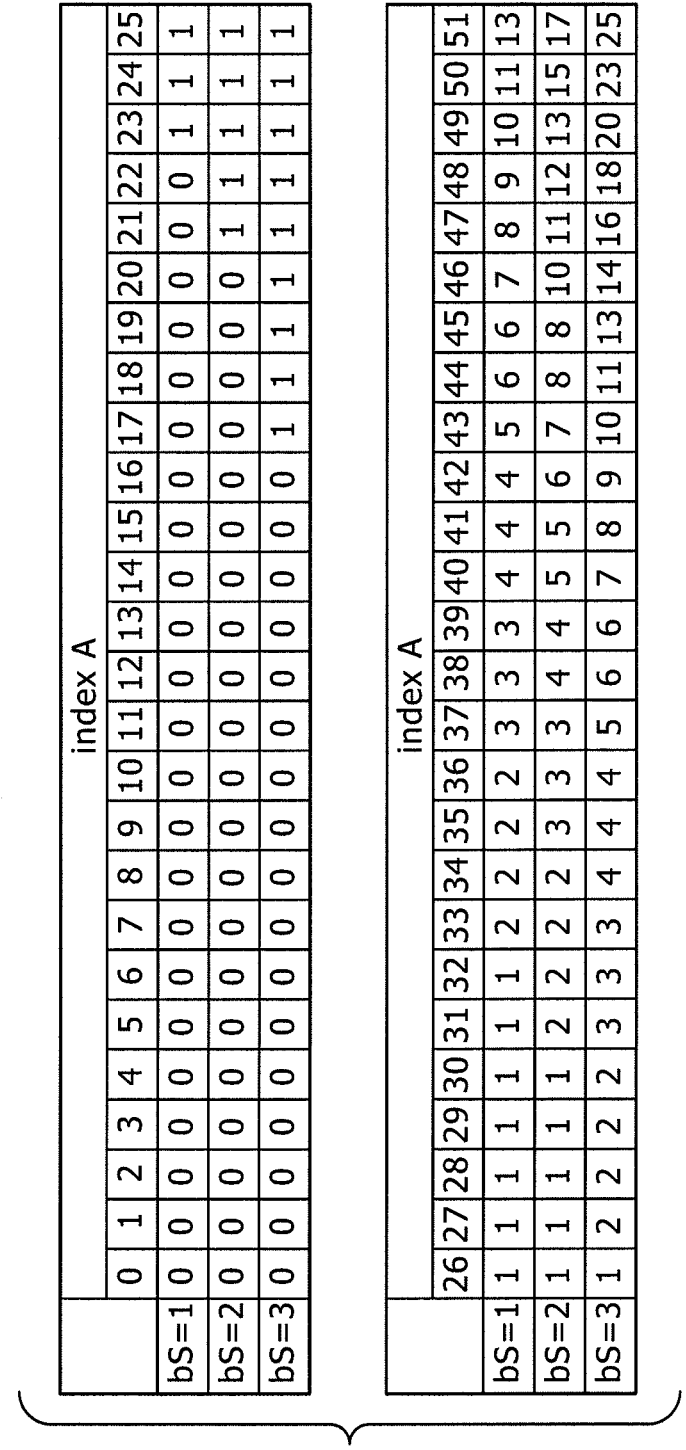
FIG. 6 is a table showing indexes A and B included in the table of FIG. 5.

It is to be noted that reference notation '( )? 1:0' denotes the value 1 if the condition in the parentheses is satisfied or the value 0 if the condition in the parentheses is not satisfied. In addition, tc0 is found from a table shown in FIG. 6 in accordance with the value of the boundary-strength determination information BS and the value of the index A.

ap and aq used in Eq. (4) are expressed by the following equations.

$$ap=|p2-p0|$$

$$aq=|q2-q0| \quad (6)$$

In Eqs. (6) given above, each of reference notations p0, p2, q0 and q2 denotes a pixel value described earlier.

For the chroma Edge Flag having the value of 0 and the value of ap not greater than β, the pixel values p'1 and q'1 are found by carrying out operations based on the following equations.

$$p'1=p1+\text{Clip3}(-tc0,tc0,(p2+((p0+q0+1)>>1)-(p1<<1((>>1))$$

$$q'1=q1+\text{Clip3}(-tc0,tc0,(q2+((p0+q0+1)>>1)-(q1<<1))>>1) \quad (7)$$

In the above equations, reference notation p1 is the pixel value of a pixel adjacent to a pixel having the pixel value p0 whereas reference notation q1 is the pixel value of a pixel adjacent to a pixel having the pixel value q0.

If the chroma Edge Flag has a value other than 0 or the value of ap is greater than β, on the other hand, the pixel values p'1 and q'1 are found by carrying out operations based on the following equations.

$$p'1=p1$$

$$q'1=q1 \quad (8)$$

The pixel values p2, p3, q2 and q3 of the remaining pixels are not changed by the filtering process. That is to say, each of the following equations holds true, p'2 p2, p'3=p3, q'2=q2 and q'3=q3.

If the value of the boundary-strength determination information BS is 4 and equality expression (9) holds true, the deblocking filter 40 carries out a filtering process based on Eq. (10) in order to find pixel values p'0, p'1 and p'2 of the adjacent DCT block P.

$$ap<\beta \&\& |p0-q0|<((\alpha>>2)+2) \quad (9)$$

$$p'0=(p2+2\cdot p1+2\cdot p0+2\cdot q0+q1+4)>>3$$

$$p'1=(p2+p1+p0+q0+2)>>2$$

$$p'2=(2\cdot p3+3\cdot p2+p1 p0+q0+4)>>3 \quad (10)$$

If the value of the boundary-strength determination information BS is 4 but equality expression (9) does not hold true, the deblocking filter 40 carries out a filtering process based on Eq. (11) in order to find pixel values p'0, p'1 and p'2 of the adjacent DCT block P.

$$p'0=(2\cdot p1+p0+q1+2)>>2$$

$$p'1=p1$$

$$p'2=p2 \quad (11)$$

If the value of the boundary-strength determination information BS is 4, the value of the chroma Edge Flag is 0 and equality expression (12) holds true, the deblocking filter 40 carries out a filtering process based on Eq. (13) in order to find pixel values q'0, q'1 and q'2 of the adjacent DCT block Q which serves as the subject of the processing.

$$aq<\&\&|p0-q0|<((\alpha>>2)+2) \quad (12)$$

$$q'0=(p1+2\cdot p0+2\cdot q0+2\cdot q1+q2+4)>>3$$

$$q'1(p0+q0+q1+q2+2)>>2$$

$$q'2=(2\cdot q3+3\cdot q2+q1+q0+p4+4)>>3 \quad (13)$$

If the value of the boundary-strength determination information BS is 4, the value of the chroma Edge Flag is other than 0 and equality expression (12) does not hold true, the deblocking filter 40 carries out a filtering process based on Eq. (14) in order to find pixel values q'0, q'1 and q'2 of the adjacent DCT block Q which serves as the subject of the processing.

$$q'0=(2\cdot q1+q0+p1+2)>>2$$

$$q'1=q1$$

$$q'2=q2 \quad (14)$$

The deblocking filter 40 carries out the processes according to relations (1) to (14) given above in the vertical and horizontal directions in order to eliminate block noises of the vertical and horizontal directions.

(1-2) Reduction of Block Noises in MPEG-2

The decoding apparatus 31 shown in the block diagram of FIG. 2 has an H.264/AVC block-noise reduction information generation section 41A for an H.264/AVC bit stream S2 and an MPEG-2 block-noise reduction information generation section 41B for an MPEG-2 bit stream S1. The MPEG-2 block-noise reduction information generation section 41B generates filtering-location identifying information DPM, a quantization parameter QPM and boundary-strength determination information BSM. The filtering-location identifying information DPM, the quantization parameter QPM and the boundary-strength determination information BSM correspond to respectively the filtering-location identifying information DP, the quantization parameter QP and the boundary-strength determination information BS which are generated by the H.264/AVC block-noise reduction information generation section 41A.

In the process carried out by the decoding apparatus 31 to decode an MPEG-2 bit stream S1, the deblocking filter 40 removes block noises on the basis of the filtering-location identifying information DPM, the quantization parameter QPM and the boundary-strength determination information BSM which are generated by the MPEG-2 block-noise reduction information generation section 41B in place of the filtering-location identifying information DP, the quantization parameter QP and the boundary-strength determination information BS which are generated by the H.264/AVC block-noise reduction information generation section 41A.

It is to be noted that the functions of each of the H.264/AVC block-noise reduction information generation section 41A and the MPEG-2 block-noise reduction information generation section 41B can be carried out by software executed by a CPU employed in each of the H.264/AVC block-noise reduction information generation section 41A and the MPEG-2 block-noise reduction information generation section 41B respectively or by hardware composing each of the H.264/AVC block-noise reduction information generation section 41A and the MPEG-2 block-noise reduction information generation section 41B respectively. If the functions of each of the H.264/AVC block-noise reduction information generation section 41A and the MPEG-2 block-noise reduction information generation section 41B can be carried out by software, in the case of this embodiment, each of programs composing the software is presented as a program installed in advance in the decoding apparatus 31. As an alternative, each of the programs can also be presented by downloading the program to the decoding apparatus 31 from a program provider by way of various kinds of communication means or presented as a program recorded in one of a variety of recording mediums such as an optical disk, a magnetic disk and a memory card.

The MPEG-2 block-noise reduction information generation section 41B detects picture-configuration information and macroblock position relation information from parameters provided on an MPEG-2 sequence layer, a picture layer or the like. The macroblock position relation information is filtering-location identifying information indicating the position of a macroblock MB on the screen. The position of a macroblock MB on the screen is a position relative to the head macroblock MB on the screen. The macroblock position relation information is expressed as macro-block counts representing the horizontal and vertical coordinates of the position of a macroblock MB.

Figure 7:
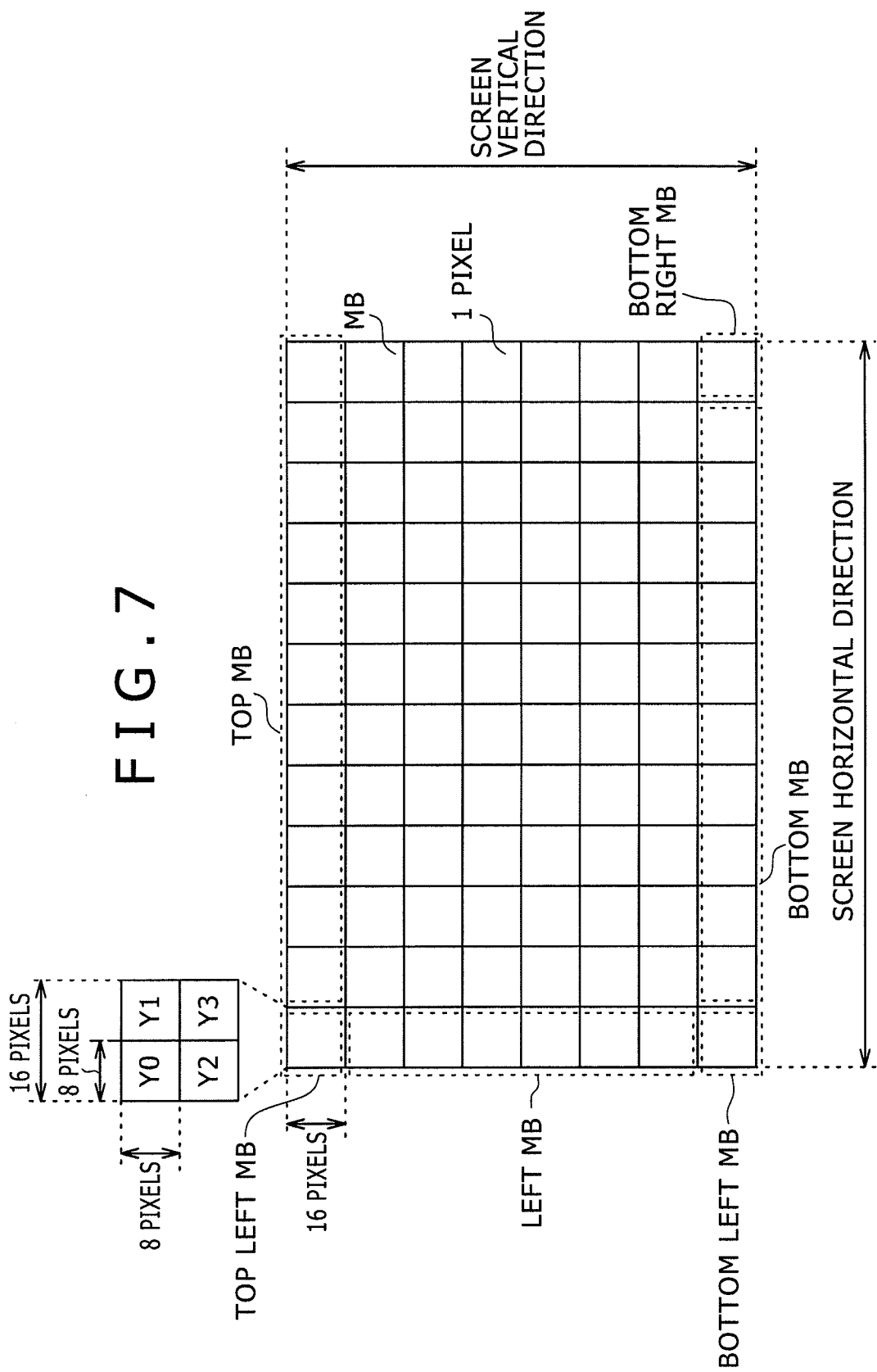
FIG. 7 is a diagram showing locations of macroblocks MB on the screen of a moving picture generated by the decoding apparatus 31 shown in the block diagram of FIG. 2.

FIG. 7 is a diagram showing locations' of macroblocks MB on the screen of a moving picture. As shown in the diagram of FIG. 7, the screen is a matrix of macroblocks MB which are each a sub-matrix of pixels. It is to be noted that every macroblock MB shown in the diagram of FIG. 7 is a macroblock MB of luminance data. Block noises are generated on a boundary between macroblocks MB or a boundary between DCT blocks composing a macroblock MB. The number of macroblocks MB arranged in the horizontal and vertical directions to form a screen changes when the number of pixels composing the screen is changed. Thus, the number of boundaries each separating two macroblocks MB adjacent to each other also changes when the number of pixels composing the screen is changed. To put it concretely, let us assume for example that the number of pixels composing the screen is small so that the number of macroblocks MB arranged in the horizontal direction along a row of the matrix is 10 for example. Thus, ten macroblocks MB including the first macroblock MB of a picture to the tenth macroblock MB form the top row of the screen. The first macroblock MB is the macroblock MB at the top left corner whereas the tenth macroblock MB is the macroblock MB at the top right corner. As shown in the diagram of FIG. 3, each macroblock MB including four DCT blocks, which are two upper DCT blocks and two lower DCT blocks. Thus, in the two upper DCT blocks of every macroblock MB on the top row, there are no DCT blocks P placed at a location adjacent to the start of a raster scan operation carried out in the vertical direction.

If the number of pixels composing the screen is large so that the number of macroblocks MB arranged in the horizontal direction along a row of the matrix is 20 for example, on the other hand, twenty macroblocks MB including the first macroblock MB of a picture to the twentieth macroblock MB form the top row of the screen. The first macroblock MB is the macroblock MB at the top left corner whereas the twentieth macroblock MB is the macroblock MB at the top right corner. Also in this case, in the two upper DCT blocks of every macroblock MB on the top row, there are no DCT blocks P placed at a location adjacent to the start of a raster scan operation carried out in the vertical direction. Thus, it is necessary to consider the position of a macroblock MB including a DCT block to be subjected to a filtering process to be carried out by the deblocking filter 40 and properly cancel the filtering processes to be carried out in the horizontal and vertical directions if there are no DCT blocks P placed at a location adjacent to the start of a raster scan operation carried out in the horizontal and vertical directions.

From the detected picture-configuration information and the detected macroblock position relation information, the MPEG-2 block-noise reduction information generation section 41B generates the filtering-location identifying information DPM by defining particular macroblocks as follows, a top-left macroblock MB is defined as a macroblock MB located at the start of a raster scan operation, top macroblocks MB are defined as macroblocks MB located on the top row excluding the top-left macroblock MB, a bottom left macroblock MB is defined as a macroblock MB located at the bottom left corner of the screen, left macroblocks MB are defined as macroblocks MB located on the leftmost column excluding the top-left macroblock MB and the bottom left macroblock MB a bottom right macroblock MB is defined as a macroblock MB located at the bottom right corner of the screen, and bottom macroblocks MB are defined as macroblocks MB located on the bottom row excluding the bottom-left macroblock MB and the bottom right macroblock MB. The MPEG-2 block-noise reduction information generation section 41B informs the deblocking filter 40 of the filtering-location identifying information DPM in order to notify the deblocking filter 40 of DCT block boundaries on which no filtering process is to be carried out.

Figure 8:
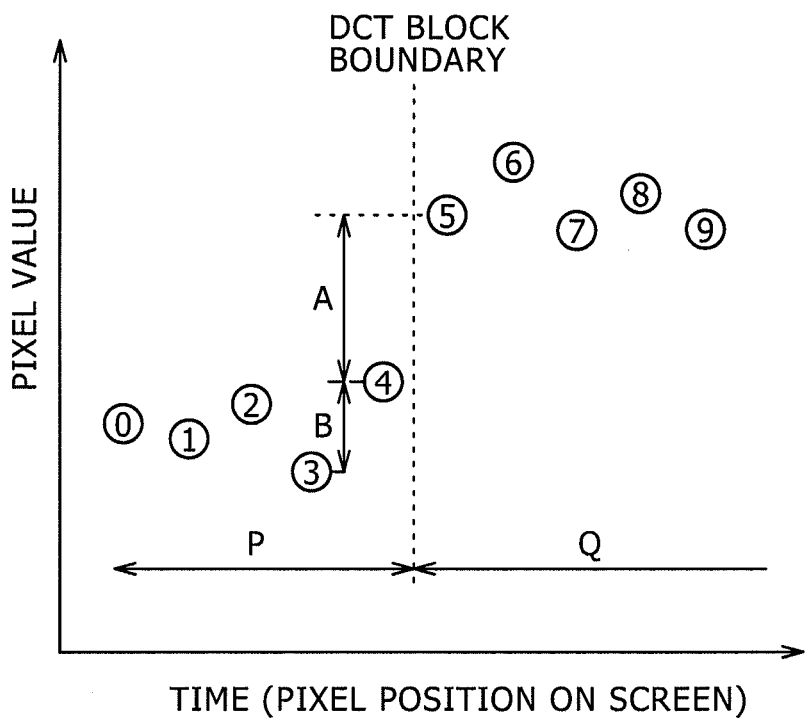
FIG. 8 is an explanatory diagram to be referred to in description of block noises.

The MPEG-2 block-noise reduction information generation section 41B acquires information used for edge determination from the MPEG-2 bit stream S1. The information for edge determination is information used for making determinations such as determination as to whether or not picture data is located on a DCT block boundary, determination as to whether or not a gradation difference with a pixel in an adjacent DCT block is caused by block noises as indicated by notation A shown in a diagram of FIG. 8 as a notation representing the difference between pixels values 4 and 5 as well as determination as to whether or not a gradation difference with an adjacent pixel in the same DCT block is caused by a contour or the like in the DCT block as indicated by notation B shown in the diagram of FIG. 8 as a notation representing the difference between pixels values 4 and 3. It is to be noted that a number enclosed in a circle shown in the diagram of FIG. 8 represents the pixel value of a pixel.

As the information used for making determination as to whether or not a gradation difference with an adjacent pixel in the same DCT block is caused by a contour or the like in the DCT block, an MPEG-2 quantization scale code Q_SCALE is used for each picture unit, each slice unit and each macroblock unit.

In the MPEG-2 coding processing, the larger the MPEG-2 quantization scale code Q_SCALE, the larger the rounding error generated in a quantization process of the MPEG-2 coding processing. Thus, in the MPEG-2 coding processing, the larger the MPEG-2 quantization scale code Q_SCALE, the easier the generation of block noises. Accordingly, the larger the MPEG-2 quantization scale code Q_SCALE, the higher the probability that the difference in level between adjacent pixels sandwiching a DCT block boundary is caused by the block noises. As a result, a quantization value can be used as a standard for determining an edge. That is to say, the MPEG-2 quantization scale code Q_SCALE can be used for generating quantities such as the indexes A and B described before for the H.264/AVC coding/decoding method.

However, the characteristic of the quantization process according to the H.264/AVC coding/decoding method is different from the characteristic of the quantization process according to the MPEG-2 coding/decoding method. For this reason, the MPEG-2 block-noise reduction information generation section 41B processes the MPEG-2 quantization scale code Q_SCALE in order to generate the quantization parameter QPM so as to make the characteristic of the quantization according to the MPEG-2 coding/decoding method compatible with the characteristic of the quantization according to the H.264/AVC coding/decoding method.

Figure 9:
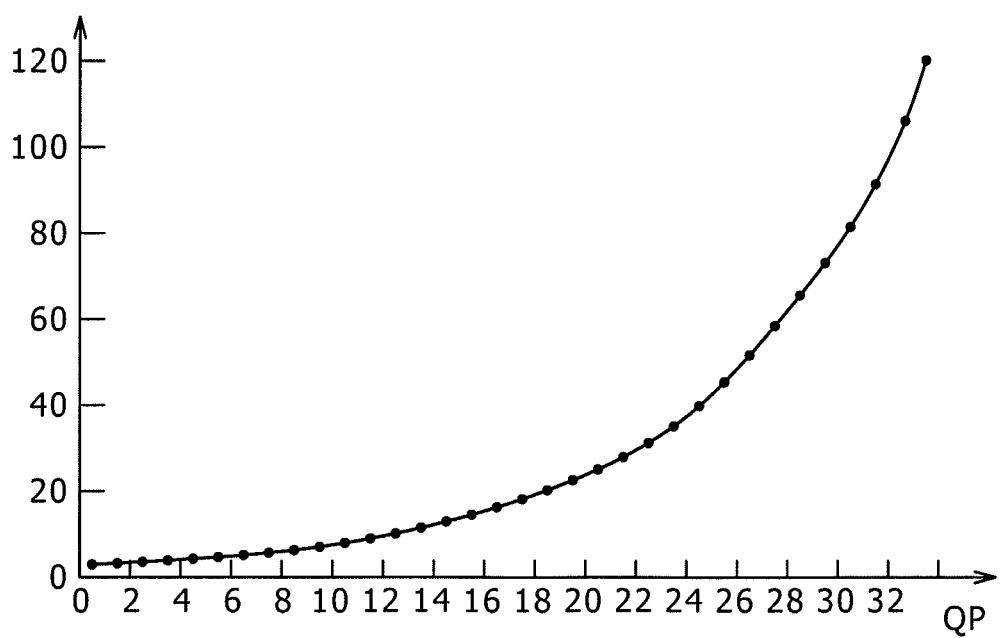
FIG. 9 is a diagram showing a characteristic curve representing the relation between the quantization parameter QP of an H.264/AVC coding/decoding method and the MPEG-2 quantization scale code Q_SCALE of an MPEG-2 coding/decoding method.

FIG. 9 is a diagram showing a characteristic curve representing the relation between the quantization parameter QP of the H.264/AVC coding/decoding method and the MPEG-2 quantization scale code Q_SCALE of the MPEG-2 coding/decoding method. A quantization parameter QP' is the quantization parameter QP of the H.264/AVC coding/decoding method in a particular range of 0 to 33. The relation between the quantization parameter QP' and the MPEG-2 quantization scale code Q_SCALE of the MPEG-2 coding/decoding method is expressed by the following equation.

$$Q \text{ SCALE} = 2^{20}/(676 \times A(QP')) \quad (15)$$

The expression A (QP'=0, . . . , 33) used in the above equation is expressed by the following equation.

$$\begin{aligned}A(QP'=0,\ldots,33) = [&620, 553, 492, 439, 391, 348,\\&310, 276, 246, 219, 195, 174, 155, 138, 12\ 3,\\&110, 98, 87, 78, 69, 62, 55, 49, 44, 39, 35, 31, 27,\\&24, 22, 19, 17, 15, 13]\end{aligned} \quad (16)$$

The following equation is derived from Eqs. (15) and (16).

$$\begin{aligned}Q \text{ SCALE } (QP' = 0, \ldots, 33) = [&2.5019, 2.8050, 3.1527,\\&3.5334, 3.9671, 4.4573, 5.0037, 5.6201, 6.3055, 7.0829,\\&7.9546, 8.9146, 10.0074, 11.2402, 12.6110, 14.1013,\\&15.8280, 17.8293, 19.8865, 22.4804, 25.0185, 28.2027,\\&31.6561, 35.2534, 39.7730, 44.3185, 50.0370, 57.4499,\\&64.6312, 70.5067, 81.6394, 91.2440, 103.1098, 119.3190]\end{aligned} \quad (17)$$

Eq. (17) is a transform equation for transforming a given value of the quantization parameter QP' into a value of MPEG-2 quantization scale code Q_SCALE. The MPEG-2 block-noise reduction information generation section 41B carries out a process in a direction opposite to the direction of a process based on Eq. (17). That is to say, the MPEG-2 block-noise reduction information generation section 41B processes a given value of the MPEG-2 quantization scale code Q_SCALE in order to find the value of the quantization parameter QP' so as to make the characteristic of the quantization according to the MPEG-2 coding/decoding method compatible with the characteristic of the quantization according to the H.264/AVC coding/decoding method. To put it concretely, let us assume for example that the given value of the MPEG-2 quantization scale code Q_SCALE is 100. In this case, the MPEG-2 block-noise reduction information generation section 41B searches the list on the right-hand side of Eq. (17) for a value closest to 100. Since the value 100 is between the values 91.2440 and 103.1098 on the list, the value 31 set for the quantization parameter QP' as a value corresponding to the value 91.2440 is taken as the desired value of the quantization parameter QP'. It is to be noted that the curve shown in the diagram of FIG. 9 represents the relation expressed by Eq. (17).

However, the quantization parameter QP' has a value in the range 0 to 33 whereas the quantization parameter QP of the H.264/AVC coding/decoding method has a value in the range 0 to 51. Thus, after finding the value of the quantization parameter QP' by carrying out the process in a direction opposite to the direction of the process based on Eq. (17), the MPEG-2 block-noise reduction information generation section 41B generates a quantization parameter QPM by adding an arbitrary offset to the value of the quantization parameter QP'. In addition, the user is allowed to issue a command for changing the offset and a command for changing the strength of the filtering process.

In addition, the MPEG-2 block-noise reduction information generation section 41B also acquires information such as a macroblock type, a picture coding type, a picture structure and a motion vector MV from the MPEG-2 bit stream S1, generating boundary-strength determination information BSM from the acquired information. It is to be noted that, in order to generate boundary-strength determination information BSM from the information acquired from the MPEG-2 bit stream S1, the acquired information is classified into the following three large information categories, information representing picture types and a macroblock mode, information representing a motion vector MV and a prediction mode and information representing the vector quantities of the motion vector MV.

As described above, the first information category is the information representing picture types and a macroblock mode. The information representing picture types and a macroblock mode includes attributes of a macroblock MB. The attributes are a picture coding type, a macroblock type, a picture structure, a DCT type and a macroblock pattern. The picture coding type is used for making determination as to whether an observed picture is an I picture, a P picture or a B picture. The macroblock type is used for making determination as to whether an observed macroblock is a skipped macroblock, a macroblock MB completing an intra-prediction process or a macroblock MB completing an inter-prediction process. The picture structure is used for making determination as to whether an observed picture is a field picture of a frame picture. The DCT type is used for making determination as to whether the DCT mode is a frame DCT mode or a field DCT mode. The macroblock pattern is used for making determination as to whether or not a DCT coefficient exists.

As described above, the second information category is the information representing a motion vector MV and a prediction mode. The information representing a motion vector MV and a prediction mode includes a frame (or field) motion type, a motion vector count representing the number of motion vectors MV, a motion-vector format, concealment motion vectors MV, a frame pred frame DCT, a picture structure and a motion vertical field select. The frame (or field) motion type, the motion vector count, the motion-vector format, the concealment motion vectors MV, the frame pred frame DCT and the picture structure are used for determining one of six MPEG-2 prediction modes. The six MPEG-2 prediction modes are three prediction modes for the frame structure (or the frame motion type) and three prediction modes for the field structure (or the field motion type). The three prediction modes for the frame structure (or the frame motion type) are a field prediction mode, a frame prediction mode and a dual prime mode. On the other hand, the three prediction modes for the field structure (or the field motion type) are a field prediction mode, a field 16×8 prediction mode and a dual prime mode. In addition, the picture structure is used for determining the reference direction and determining TopField, BottomField or Frame. Furthermore, the motion vertical field select is used for making determination as to whether a reference field select is a top or bottom reference field select.

As described above, the third information category is the information representing the vector quantities of the motion vector MV. The information representing the vector quantities of the motion vector MV is a macroblock type, a motion-vector format, a picture structure, a motion code, a motion residual, a dmvector, Forward (or Backward), Horizontal (or Vertical), Field, a frame motion type, a field motion type, a motion vector count, motion horizontal forward, motion vertical forward, motion vertical field select for, a forward hor r size, a forward ver r size, a backward hor r size, a backward ver r size, a forward f code and a backward f code which are used for computing the vector quantities and making determination on the vector quantities.

FIGS. 1 and 11 to 13 show a flowchart representing the procedure of processing to generate boundary-strength determination information BSM for a DCT block boundary oriented in the vertical direction. Thus, the boundary-strength determination information BSM generated in accordance with the processing procedure is used in the deblocking filter 40 for carrying a filtering process in the horizontal direction. It is to be noted that macroblocks MB processed in accordance the processing procedure represented by the flowchart shown in FIGS. 1 and 11 to 13 are macroblocks MB denoted by reference notation C in the diagram of FIG. 10. One of the macroblocks MB is a macroblock QM including DCT blocks each serving as a subject of the processing. A macroblock MB located at a position adjacent to the start of a raster scan operation and separated away from the macroblock QM in the horizontal direction is referred to as a macroblock PM. In line with the setting of the macroblock PM and the macroblock QM, a DCT block serving as the subject of the processing is referred to as a filtering-subject DCT block Q and a DCT block located on the left side of the filtering-subject DCT block Q at a position adjacent to the filtering-subject DCT block Q is referred to as an adjacent DCT block P.

Figure 11:
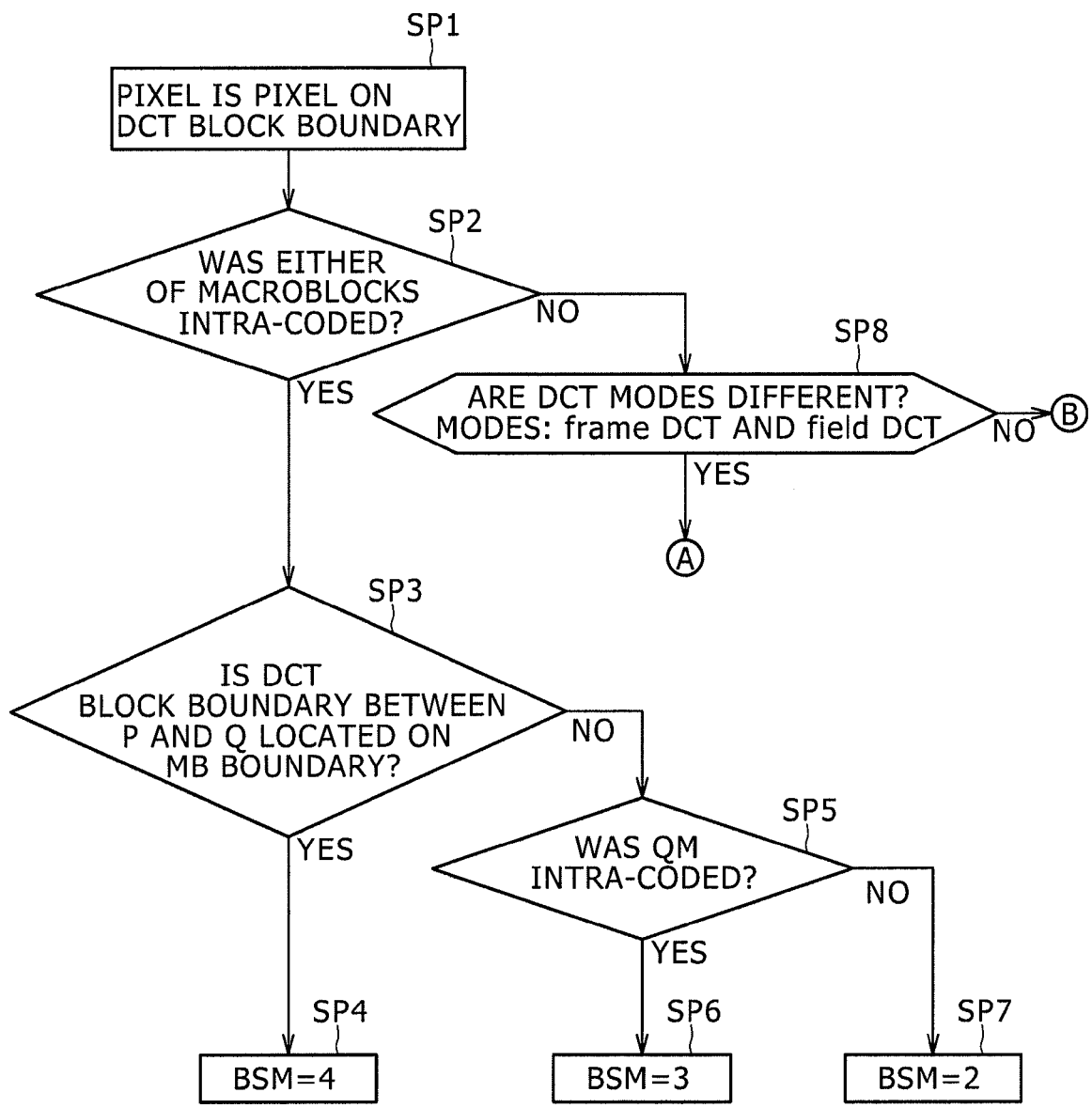
FIG. 11 shows a flowchart representing the procedure of processing carried out by the MPEG-2 block-noise reduction information generation section 41B employed in the decoding apparatus 31 according to the first embodiment of the present invention for block boundaries oriented in the vertical direction.

The MPEG-2 block-noise reduction information generation section 41B sequentially selects pieces of picture data typically in the raster scan order and, if the selected piece of picture data is found at a step SP1 of the flowchart shown in the diagram of FIG. 11 to be picture data adjacent to a DCT block boundary sandwiched by the adjacent DCT block P and the filtering-subject DCT block Q as a DCT block boundary on the left end side of the processed filtering-subject DCT block Q, the MPEG-2 block-noise reduction information generation section 41B carries out this processing procedure in order to set boundary-strength determination information BSM.

Then, the MPEG-2 block-noise reduction information generation section 41B continues the processing from the step SP1 to a step SP2. At the step SP2, the MPEG-2 block-noise reduction information generation section 41B makes determination as to whether either the macroblock PM or the macroblock QM has been subjected to an intra-coding process. A DCT block completing an intra-coding process generates block noises with ease in comparison with a DCT block which has been subjected to an inter-coding process. Thus, if the result of the determination made at the step SP2 is an affirmation, the MPEG-2 block-noise reduction information generation section 41B continues the processing from the step SP2 to a step SP3. At the step SP3, the MPEG-2 block-noise reduction information generation section 41B makes determination as to whether the DCT block boundary between the adjacent DCT block P and the filtering-subject DCT block Q coincides with a macroblock boundary.

It is quite within the bounds of possibility that a quantization coefficient varies from macroblock MB to macroblock MB. Thus, if the DCT block boundary between the adjacent DCT block P and the filtering-subject DCT block Q coincides with a macroblock boundary, it is quite within the bounds of possibility that block noises are generated severely in comparison with a case in which the DCT block boundary between the adjacent DCT block P and the filtering-subject DCT block Q does not coincide with a macroblock boundary. Thus, if the result of the determination made at the step SP3 is an affirmation, the MPEG-2 block-noise reduction information generation section 41B continues the processing from the step SP3 to a step SP4. At the step SP4, the MPEG-2 block-noise reduction information generation section 41B sets the value of the boundary-strength determination information BSM at 4. Then, the MPEG-2 block-noise reduction information generation section 41B ends the processing.

If the result of the determination made at the step SP3 is a negation, on the other hand, the MPEG-2 block-noise reduction information generation section 41B continues the processing from the step SP3 to a step SP5. At the step SP5, the MPEG-2 block-noise reduction information generation section 41B makes determination as to whether the macroblock QM including the filtering-subject DCT block Q serving as the subject of the processing has been subjected to an intra-coding process. If the result of the determination made at the step SP5 is an affirmation, the MPEG-2 block-noise reduction information generation section 41B continues the processing from the step SP5 to a step SP6. At the step SP6, the MPEG-2 block-noise reduction information generation section 41B sets the value of the boundary-strength determination information BSM at 3. Then, the MPEG-2 block-noise reduction information generation section 41B ends the processing. If the result of the determination made at the step SP5 is a negation, on the other hand, the MPEG-2 block-noise reduction information generation section 41B continues the processing from the step SP5 to a step SP7. At the step SP7, the MPEG-2 block-noise reduction information generation section 41B sets the value of the boundary-strength determination information BSM at 2. Then, the MPEG-2 block-noise reduction information generation section 41B ends the processing.

If the result of the determination made at the step SP2 is a negation, on the other hand, the MPEG-2 block-noise reduction information generation section 41B continues the processing from the step SP2 to a step SP8. At the step SP8, the MPEG-2 block-noise reduction information generation section 41B makes determination as to whether the DCT mode of the macroblock PM is different from the DCT mode of the macroblock QM. The DCT mode is defined for the MPEG-2 coding/decoding method but not defined for the H.264/AVC coding/decoding method. In the case of the MPEG-2 coding/decoding method, for the frame structure, the DCT mode can be switched from a frame DCT mode to a field DCT mode and vice versa in macroblock units. That is to say, for each macroblock MB, the frame DCT mode or the field DCT mode can be set as the DCT mode. For the field structure, on the other hand, the field DCT mode is applied as the DCT mode. Thus, if the DCT mode of the macroblock PM is different from the DCT mode of the macroblock QM, of course, the unit of the orthogonal transform process for the macroblock PM is different from the unit of the orthogonal transform process for the macroblock QM so that block noises are generated severely in comparison with a case in which the DCT mode of the macroblock PM is the same as the DCT mode of the macroblock QM. Thus, if the DCT mode of the macroblock PM is different from the DCT mode of the macroblock QM, the MPEG-2 block-noise reduction information generation section 41B sets the boundary-strength determination information BSM at a value which will increase the strength of the filtering process to be carried out by the deblocking filter 40.

Figure 12:
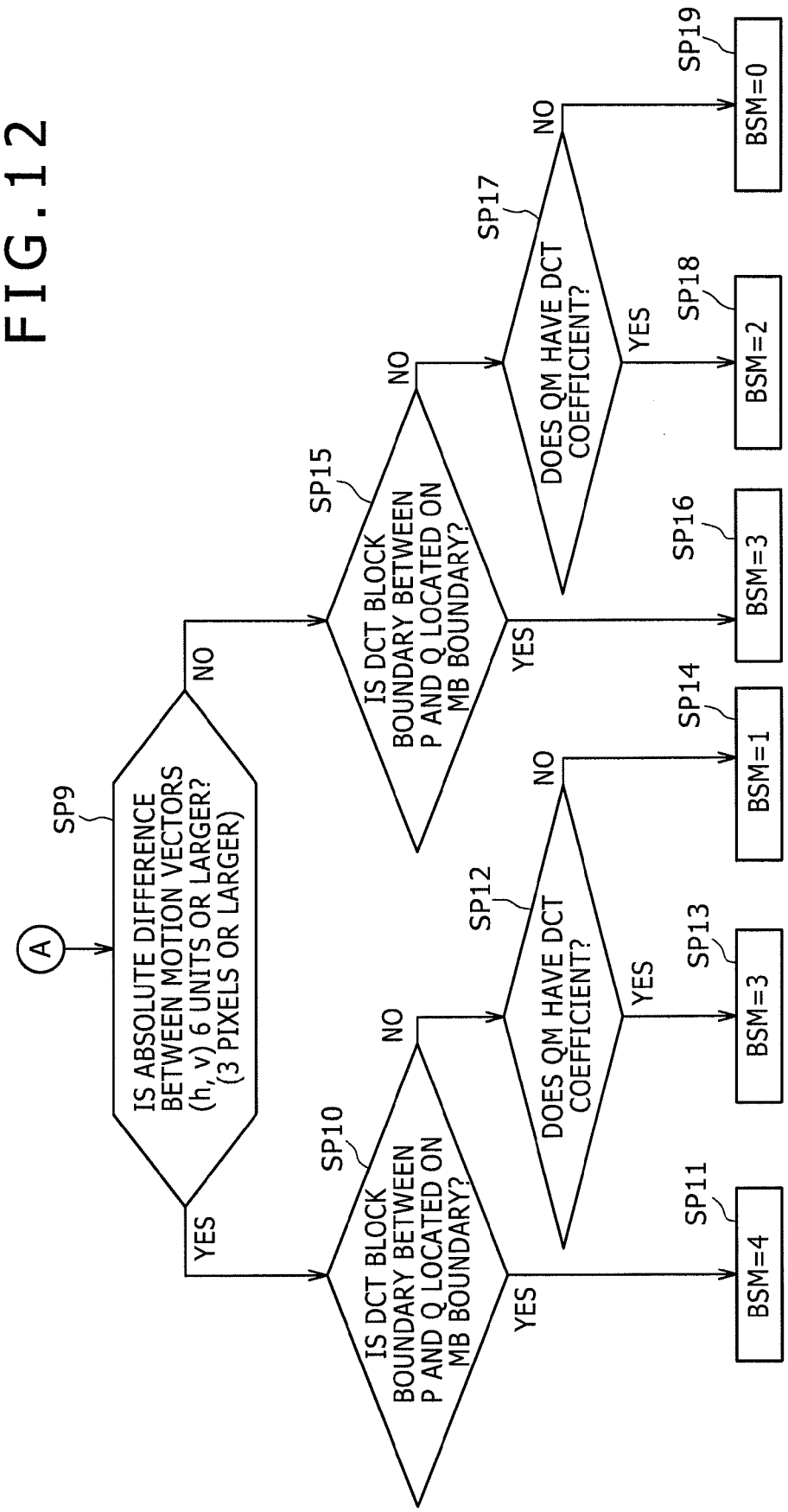
FIG. 12 shows a flowchart representing the procedure of processing carried out by the MPEG-2 block-noise reduction information generation section 41B as a continuation of processing, the procedure of which is represented by the flowchart shown in FIG. 11.

If the result of the determination made at the step SP8 is an affirmation, the MPEG-2 block-noise reduction information generation section 41B continues the processing from the step SP8 to a step SP9 of the flowchart shown in FIG. 12. At the step SP9, the MPEG-2 block-noise reduction information generation section 41B computes the absolute value of a difference between motion vectors MV of the macroblock QM and the macroblock PM, making determination as to whether the difference absolute value is at least equal to a criterion value determined in advance. In the case of the typical processing procedure represented by the flowchart shown in FIG. 11, the criterion value is set at six units or three pixels at the precision based on a half-pixel granularity. A large absolute value of a difference between motion vectors MV of the macroblock QM and the macroblock PM in a picture indicates that the picture exhibits vigorous motions and pieces of reference picture data used for generating predicted values of the macroblock QM and the macroblock PM respectively can be said to be pieces of picture data which separated far away from each other and have a weak relation. In this case, block noises are generated with ease.

If the result of the determination made at the step SP9 is an affirmation, the MPEG-2 block-noise reduction information generation section 41B continues the processing from the step SP9 to a step SP10. Also at the step SP10, the MPEG-2 block-noise reduction information generation section 41B makes determination as to whether the DCT block boundary between the adjacent DCT block P and the filtering-subject DCT block Q coincides with a macroblock boundary in the same way as the step SP3. If the result of the determination made at the step SP10 is an affirmation, the MPEG-2 block-noise reduction information generation section 41B continues the processing from the step SP10 to a step SP11. At the step SP11, the MPEG-2 block-noise reduction information generation section 41B sets the value of the boundary-strength determination information BSM at 4. Then, the MPEG-2 block-noise reduction information generation section 41B ends the processing.

If the result of the determination made at the step SP10 is a negation, on the other hand, the MPEG-2 block-noise reduction information generation section 41B continues the processing from the step SP10 to a step SP12. At the step SP12, the MPEG-2 block-noise reduction information generation section 41B makes determination as to whether the macroblock QM including the filtering-subject DCT block Q serving as the subject of the processing has a DCT coefficient. A macroblock MB having no DCT coefficient is either a copy of another macroblock MB or a reference macroblock MB. Thus, if the result of the determination made at the step SP12 is an affirmation, the MPEG-2 block-noise reduction information generation section 41B continues the processing from the step SP12 to a step SP13. At the step SP13, the MPEG-2 block-noise reduction information generation section 41B sets the value of the boundary-strength determination information BSM at 3. Then, the MPEG-2 block-noise reduction information generation section 41B ends the processing. If the result of the determination made at the step SP12 is a negation, on the other hand, the MPEG-2 block-noise reduction information generation section 41B continues the processing from the step SP12 to a step SP14. At the step SP14, the MPEG-2 block-noise reduction information generation section 41B sets the value of the boundary-strength determination information BSM at 1. Then, the MPEG-2 block-noise reduction information generation section 41B ends the processing.

If the result of the determination made at the step SP9 is a negation, on the other hand, the MPEG-2 block-noise reduction information generation section 41B continues the processing from the step SP9 to a step SP15. At the step SP15, the MPEG-2 block-noise reduction information generation section 41B makes determination as to whether the DCT block boundary between the adjacent DCT block P and the filtering-subject DCT block Q coincides with a macroblock boundary in the same way as the step SP10. If the result of the determination made at the step SP15 is an affirmation, the MPEG-2 block-noise reduction information generation section 41B continues the processing from the step SP15 to a step SP16. At the step SP16, the MPEG-2 block-noise reduction information generation section 41B sets the value of the boundary-strength determination information BSM at 3. Then, the MPEG-2 block-noise reduction information generation section 41B ends the processing.

If the result of the determination made at the step SP15 is a negation, on the other hand, the MPEG-2 block-noise reduction information generation section 41B continues the processing from the step SP15 to a step SP17. At the step SP17, the MPEG-2 block-noise reduction information generation section 41B makes determination as to whether the macroblock QM including the filtering-subject DCT block Q serving as the subject of the processing has a DCT coefficient in the same way as the step SP12. If the result of the determination made at the step SP17 is an affirmation, the MPEG-2 block-noise reduction information generation section 41B continues the processing from the step SP17 to a step SP18. At the step SP18, the MPEG-2 block-noise reduction information generation section 41B sets the value of the boundary-strength determination information BSM at 2. Then, the MPEG-2 block-noise reduction information generation section 41B ends the processing. If the result of the determination made at the step SP17 is a negation, on the other hand, the MPEG-2 block-noise reduction information generation section 41B continues the processing from the step SP17 to a step SP19. At the step SP19, the MPEG-2 block-noise reduction information generation section 41B sets the value of the boundary-strength determination information BSM at 0. Then, the MPEG-2 block-noise reduction information generation section 41B ends the processing.

Figure 13:
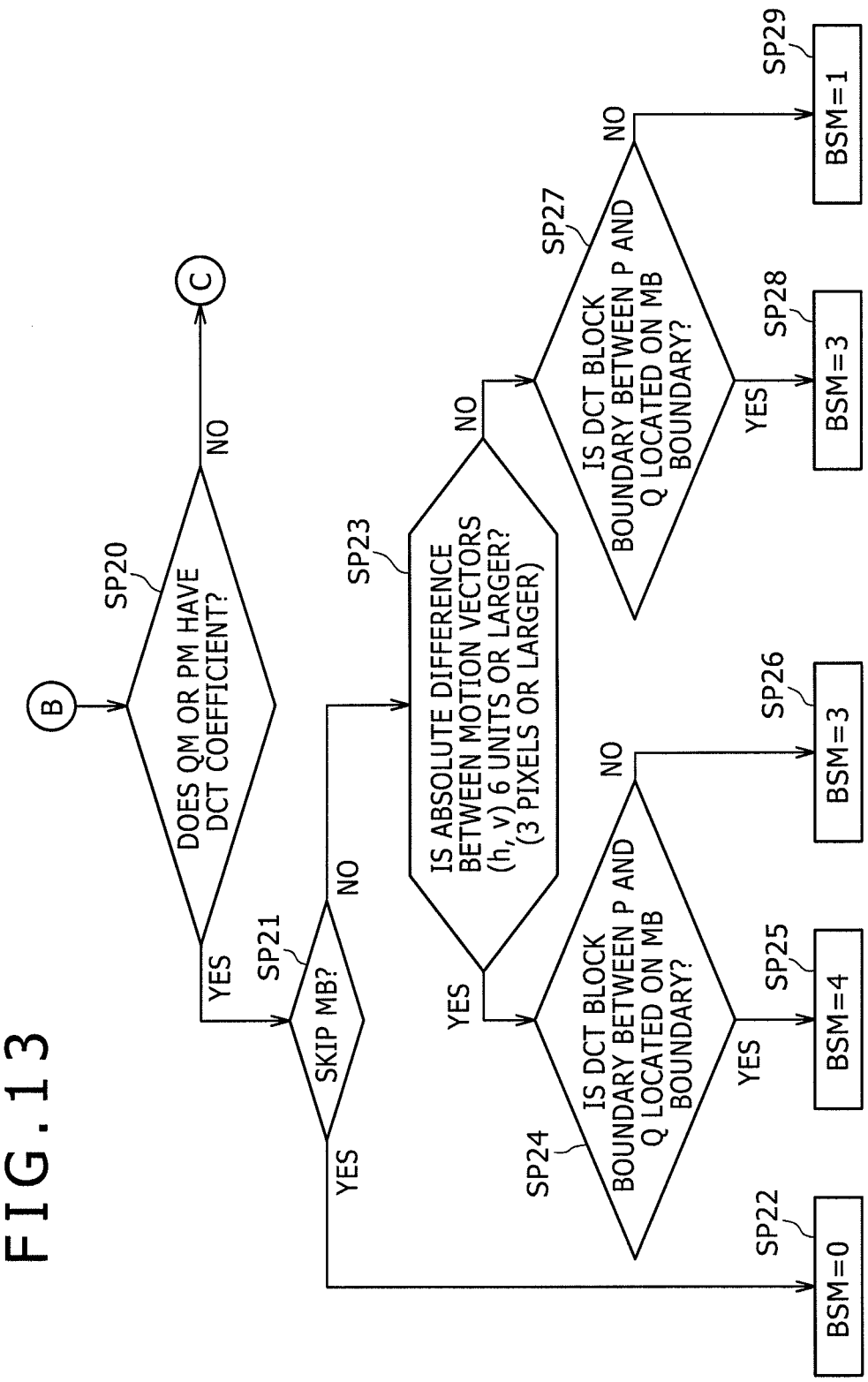
FIG. 13 shows a flowchart representing the procedure of processing carried out by the MPEG-2 block-noise reduction information generation section 41B as a continuation of processing, the procedure of which is represented by the flowchart shown in FIG. 11.

If the result of the determination made at the step SP8 of the flowchart shown in FIG. 11 is a negation, on the other hand, the MPEG-2 block-noise reduction information generation section 41B continues the processing from the step SP8 to a step SP20 of the flowchart shown in FIG. 13. At the step SP20, the MPEG-2 block-noise reduction information generation section 41B makes determination as to whether the macroblock QM or the macroblock PM has a DCT coefficient. Since a macroblock MB having a DCT coefficient includes a coded DCT block, the block-noise generation probability for such a macroblock MB is higher. Thus, if the result of the determination made at the step SP20 is an affirmation, the MPEG-2 block-noise reduction information generation section 41B continues the processing from the step SP20 to a step SP21.

At the step SP21, the MPEG-2 block-noise reduction information generation section 41B makes determination as to whether the macroblock QM is a skip macroblock MB. The skip macroblock MB is defined for the MPEG-2 coding/decoding method but not defined for the H.264/AVC coding/decoding method. In the case of a skip macroblock MB, a special method has been adopted. In accordance with this special method, in order to generate picture data from the MPEG-2 bit stream S1 in the decoding processing, a macroblock MB immediately preceding the skip macroblock MB in the horizontal direction is copied. Thus, the block-noise generation probability can be said to be extremely low. Therefore, in the case of a skip macroblock MB, the MPEG-2 block-noise reduction information generation section 41B sets the boundary-strength determination information BSM at a value which indicates that the filtering process is not desired. That is to say, if the result of the determination made at the step SP21 is an affirmation, the MPEG-2 block-noise reduction information generation section 41B continues the processing from the step SP21 to a step SP22. At the step SP22, the MPEG-2 block-noise reduction information generation section 41B sets the value of the boundary-strength determination information BSM at 0. Then, the MPEG-2 block-noise reduction information generation section 41B ends the processing.

If the result of the determination made at the step SP21 is a negation, on the other hand, the MPEG-2 block-noise reduction information generation section 41B continues the processing from the step SP21 to a step SP23. At the step SP23, the MPEG-2 block-noise reduction information generation section 41B computes the absolute value of a difference between motion vectors MV of the macroblock QM and the macroblock PM, making determination as to whether the difference absolute value is at least equal to a criterion value determined in advance in the same way as the step SP9. If the result of the determination made at the step SP23 is an affirmation, the MPEG-2 block-noise reduction information generation section 41B continues the processing from the step SP23 to a step SP24. Also at the step SP24, the MPEG-2 block-noise reduction information generation section 41B makes determination as to whether the DCT block boundary between the adjacent DCT block P and the filtering-subject DCT block Q coincides with a macroblock boundary in the same way as the step SP3. If the result of the determination made at the step SP24 is an affirmation, the MPEG-2 block-noise reduction information generation section 41B continues the processing from the step SP24 to a step SP25. At the step SP25, the MPEG-2 block-noise reduction information generation section 41B sets the value of the boundary-strength determination information BSM at 4. Then, the MPEG-2 block-noise reduction information generation section 41B ends the processing.

If the result of the determination made at the step SP24 is a negation, on the other hand, the MPEG-2 block-noise reduction information generation section 41B continues the processing from the step SP24 to a step SP26. At the step SP26, the MPEG-2 block-noise reduction information generation section 41B sets the value of the boundary-strength determination information BSM at 3. Then, the MPEG-2 block-noise reduction information generation section 41B ends the processing. If the result of the determination made at the step SP23 is a negation, on the other hand, the MPEG-2 block-noise reduction information generation section 41B continues the processing from the step SP23 to a step SP27. Also at the step SP27, the MPEG-2 block-noise reduction information generation section 41B makes determination as to whether the DCT block boundary between the adjacent DCT block P and the filtering-subject DCT block Q coincides with a macroblock boundary in the same way as the step SP24. If the result of the determination made at the step SP27 is an affirmation, the MPEG-2 block-noise reduction information generation section 41B continues the processing from the step SP27 to a step SP28. At the step SP28, the MPEG-2 block-noise reduction information generation section 41B sets the value of the boundary-strength determination information BSM at 3. Then, the MPEG-2 block-noise reduction information generation section 41B ends the processing. If the result of the determination made at the step SP27 is a negation, on the other hand, the MPEG-2 block-noise reduction information generation section 41B continues the processing from the step SP27 to a step SP29. At the step SP29, the MPEG-2 block-noise reduction information generation section 41B sets the value of the boundary-strength determination information BSM at 1. Then, the MPEG-2 block-noise reduction information generation section 41B ends the processing.

Figure 1:
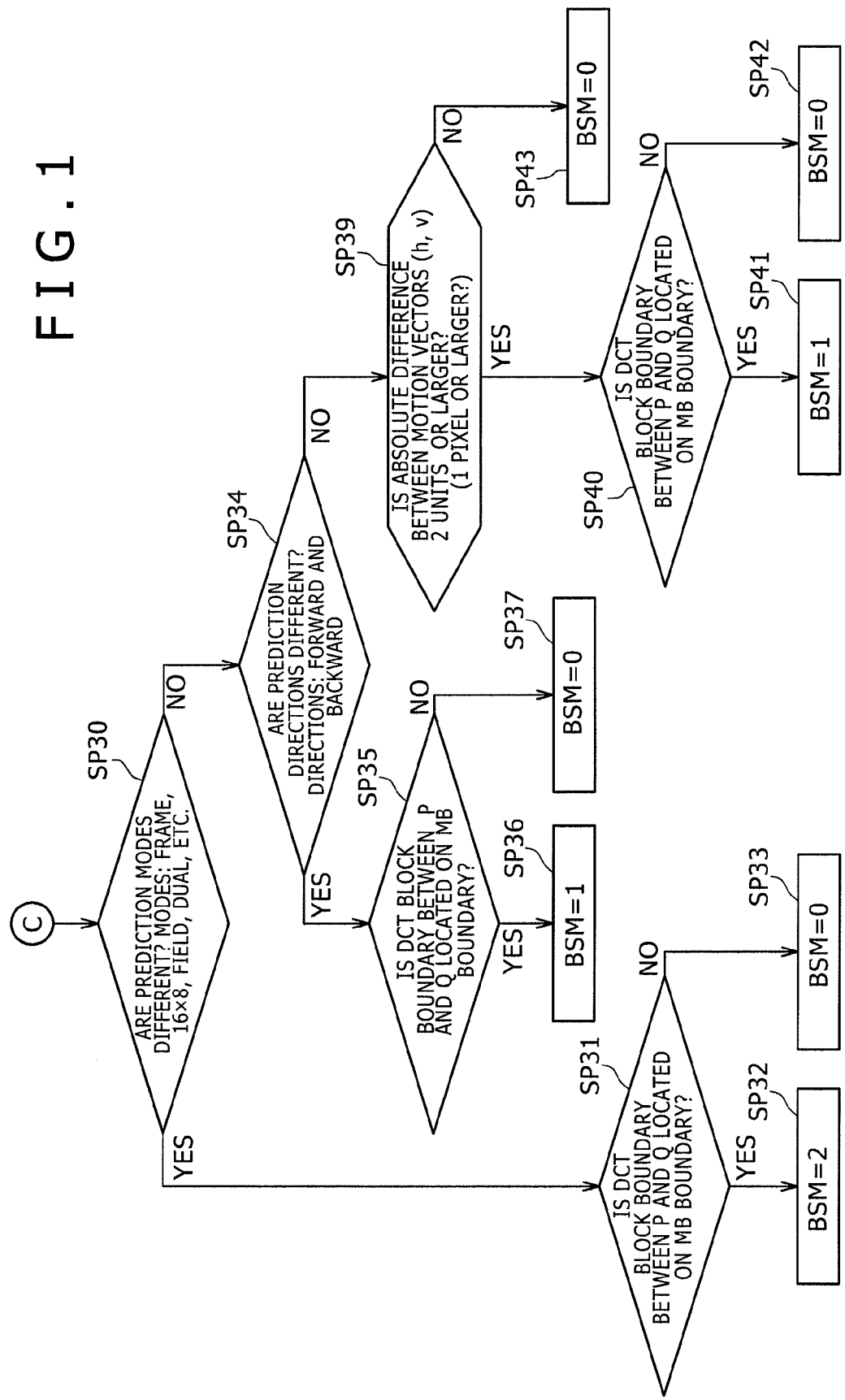
FIG. 1 shows a flowchart representing the procedure of processing carried out by an H.264/AVC block-noise reduction information generation section 41B employed in a decoding apparatus 31 according to a first embodiment of the present invention as a continuation of processing, the procedure of which is represented by a flowchart shown in FIG. 13.

If the result of the determination made at the step SP20 is a negation, on the other hand, the MPEG-2 block-noise reduction information generation section 41B continues the processing from the step SP20 to a step SP30 of the flowchart shown in FIG. 1. At the step SP30, the MPEG-2 block-noise reduction information generation section 41B makes determination as to whether the prediction mode of the macroblock QM is different from the prediction mode of the macroblock PM. The prediction mode of an MPEG-2 macroblock MB can be one of the six MPEG-2 prediction modes described above. As described above, an MPEG-2 prediction mode is determined on the basis of the information representing a motion vector MV and a prediction mode.

These six MPEG-2 prediction modes are defined for the MPEG-2 coding/decoding method but not defined for the H.264/AVC coding/decoding method. If the prediction mode of the macroblock QM is different from the prediction mode of the macroblock PM, the relevance of reference picture data to be referenced between the macroblock QM and the macroblock PM is low so that the block-noise generation probability is high. Thus, if the result of the determination made at the step SP30 is an affirmation, the MPEG-2 block-noise reduction information generation section 41B sets the value of the boundary-strength determination information BSM at 2 or 0. If the result of the determination made at the step SP30 is a negation, on the other hand, the MPEG-2 block-noise reduction information generation section 41B sets the value of the boundary-strength determination information BSM at 1 or 0.

To put it in detail, if the result of the determination made at the step SP30 is an affirmation, the MPEG-2 block-noise reduction information generation section 41B continues the processing from the step SP30 to a step SP31. At the step SP31, the MPEG-2 block-noise reduction information generation section 41B makes determination as to whether the DCT block boundary between the adjacent DCT block P and the filtering-subject DCT block Q coincides with a macroblock boundary in the same way as the step SP24. If the result of the determination made at the step SP31 is an affirmation, the MPEG-2 block-noise reduction information generation section 41B continues the processing from the step SP31 to a step SP32. At the step SP32, the MPEG-2 block-noise reduction information generation section 41B sets the value of the boundary-strength determination information BSM at 2. Then, the MPEG-2 block-noise reduction information generation section 41B ends the processing. If the result of the determination made at the step SP31 is a negation, on the other hand, the MPEG-2 block-noise reduction information generation section 41B continues the processing from the step SP31 to a step SP33. At the step SP33, the MPEG-2 block-noise reduction information generation section 41B sets the value of the boundary-strength determination information BSM at 0. Then, the MPEG-2 block-noise reduction information generation section 41B ends the processing.

If the result of the determination made at the step SP30 is a negation, on the other hand, the MPEG-2 block-noise reduction information generation section 41B continues the processing from the step SP30 to a step SP34. At the step SP34, the MPEG-2 block-noise reduction information generation section 41B makes determination as to whether the prediction direction of the macroblock QM is different from the prediction direction of the macroblock PM. If the prediction direction of the macroblock QM is different from the prediction direction of the macroblock PM, the relevance of reference picture data to be referenced between the macroblock QM and the macroblock PM is low so that the block-noise generation probability is high.

Thus, if the result of the determination made at the step SP34 is an affirmation, the MPEG-2 block-noise reduction information generation section 41B continues the processing from the step SP34 to a step SP35. At the step SP35, the MPEG-2 block-noise reduction information generation section 41B makes determination as to whether the DCT block boundary between the adjacent DCT block P and the filtering-subject DCT block Q coincides with a macroblock boundary in the same way as the step SP31. If the result of the determination made at the step SP35 is an affirmation, the MPEG-2 block-noise reduction information generation section 41B continues the processing from the step SP35 to a step SP36. At the step SP36, the MPEG-2 block-noise reduction information generation section 41B sets the value of the boundary-strength determination information BSM at 1. Then, the MPEG-2 block-noise reduction information generation section 41B ends the processing. If the result of the determination made at the step SP35 is a negation, on the other hand, the MPEG-2 block-noise reduction information generation section 41B continues the processing from the step SP35 to a step SP37. At the step SP37, the MPEG-2 block-noise reduction information generation section 41B sets the value of the boundary-strength determination information BSM at 0. Then, the MPEG-2 block-noise reduction information generation section 41B ends the processing.

If the result of the determination made at the step SP34 is a negation, on the other hand, the MPEG-2 block-noise reduction information generation section 41B continues the processing from the step SP34 to a step SP39. At the step SP39, the MPEG-2 block-noise reduction information generation section 41B computes the absolute value of a difference between motion vectors MV of the macroblock QM and the macroblock PM, making determination as to whether the difference absolute value is at least equal to a criterion value determined in advance in the same way as the step SP23 or SP9. It is to be noted that, in the case of the step SP39, however, the criterion value is smaller than the criterion value used at the steps SP23 and SP9. To put it concretely, in the case of the typical processing procedure represented by the flowchart shown in FIG. 1, the criterion value used at the step SP39 is set at two units or one pixel at the precision based on a half-pixel granularity.

If the result of the determination made at the step SP39 is an affirmation, the MPEG-2 block-noise reduction information generation section 41B continues the processing from the step SP39 to a step SP40. Also at the step SP40, the MPEG-2 block-noise reduction information generation section 41B makes determination as to whether the DCT block boundary between the adjacent DCT block P and the filtering-subject DCT block Q coincides with a macroblock boundary in the same way as the step SP35. If the result of the determination made at the step SP40 is an affirmation, the MPEG-2 block-noise reduction information generation section 41B continues the processing from the step SP40 to a step SP41. At the step SP41, the MPEG-2 block-noise reduction information generation section 41B sets the value of the boundary-strength determination information BSM at 1. Then, the MPEG-2 block-noise reduction information generation section 41B ends the processing. If the result of the determination made at the step SP40 is a negation, on the other hand, the MPEG-2 block-noise reduction information generation section 41B continues the processing from the step SP40 to a step SP42. At the step SP42, the MPEG-2 block-noise reduction information generation section 41B sets the value of the boundary-strength determination information BSM at 0. Then, the MPEG-2 block-noise reduction information generation section 41B ends the processing. If the result of the determination made at the step SP39 is a negation, on the other hand, the MPEG-2 block-noise reduction information generation section 41B continues the processing from the step SP39 to a step SP43. At the step SP43, the MPEG-2 block-noise reduction information generation section 41B sets the value of the boundary-strength determination information BSM at 0. Then, the MPEG-2 block-noise reduction information generation section 41B ends the processing.

Thus, in order to reduce the number of block noises, the deblocking filter 40 carries out a filtering process in the horizontal direction on picture data in an operating mode. In the 8×8 operating mode, the filtering process is carried out in macroblock units each having a size of 8×8 pixels.

FIGS. 14 to 17 show a flowchart representing the procedure of processing to generate boundary-strength determination information BSM for a DCT block boundary oriented in the horizontal direction. Thus, the boundary-strength determination information BSM generated in accordance with the processing procedure is used in the deblocking filter 40 for carrying a filtering process in the vertical direction. It is to be noted that macroblocks MB processed in accordance the processing procedure represented by the flowchart shown in FIGS. 14 to 17 are macroblocks MB denoted by reference notation D in the diagram of FIG. 10. One of the macroblocks MB is a macroblock QM including DCT blocks each serving as a subject of the processing. A macroblock MB located at a position adjacent to the start of a raster scan operation and separated away from the macroblock QM in the vertical direction is referred to as a macroblock PM. In line with the setting of the macroblock PM and the macroblock QM, a DCT block serving as the subject of the processing is referred to as a filtering-subject DCT block Q and a DCT block located on the upper side of the filtering-subject DCT block Q at a position adjacent to the filtering-subject DCT block Q is referred to as an adjacent DCT block P.

Figures 18A, 18B, 19A, 19B:
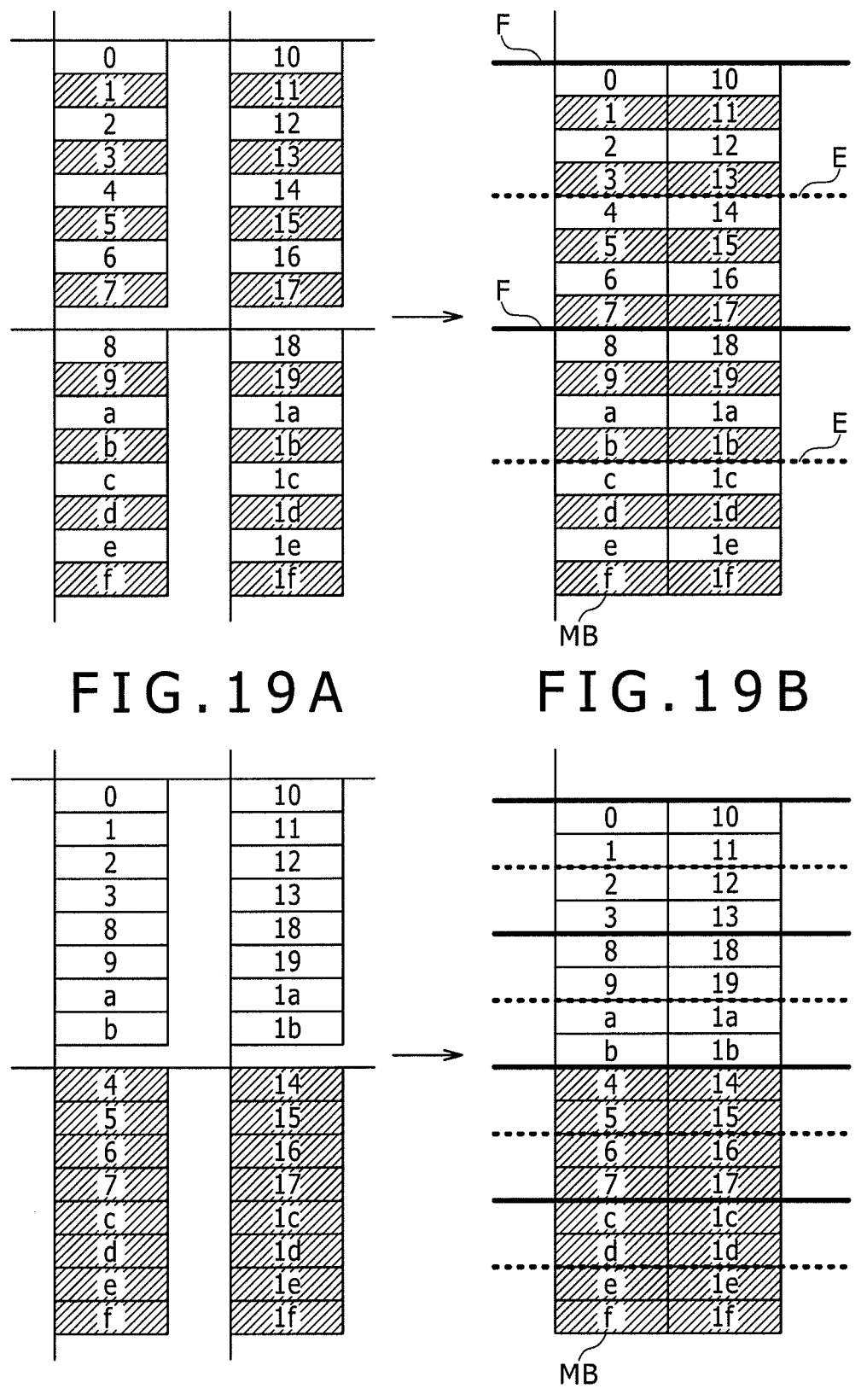

In the MPEG-2 coding/decoding method, a field structure not defined in the H.264/AVC coding/decoding method is defined. In the field structure, one field is set in one picture and a predicted value is generated for each field to be subjected to a coding process carried out in a DCT mode referred to as a field DCT mode. In addition, in the MPEG-2 coding/decoding method, a frame structure is also defined in addition to the field structure. In the frame structure, a predicted value is generated for each field or each frame to be subjected to a coding process carried out in respectively the field DCT mode or a DCT mode referred to as a frame DCT mode. FIGS. 18A and 18B are explanatory diagrams referred to in description of block noises generated as a result of a coding process carried out in the frame DCT mode for the frame structure whereas FIGS. 19A and 19B are explanatory diagrams referred to in description of block noises generated as a result of a coding process carried out in field DCT mode. It is to be noted that, in the explanatory diagrams of FIGS. 18 and 19, oblong hatching indicates field differences and similarities.

As shown in the diagram of FIG. 18A, in accordance with the MPEG-2 coding/decoding method, if the coding process is carried out in the frame DCT mode in the frame structure, block noises are generated on a DCT block boundary denoted by reference notation F. With the coding process carried out in the field DCT mode in the frame structure as shown in the diagram of FIGS. 19A and 19B, however, if the field DCT structure is expressed by making use of a frame DCT structure, block noises may be generated by a difference in orthogonal transform process in some cases at upper and lower portions sandwiching a vertical-direction inter-center-line gap between DCT block boundaries as indicated by reference notation E.

In order to solve the problem described above, in this embodiment, the deblocking filter 40 carries out a filtering process in the vertical direction in a 4×4 pixel mode. In the 4×4 pixel mode, the filtering process is carried out in DCT block units each having a size of 4 pixels×4 pixels. In this way, block noises generated also for the inter-center-line gap cited above can be repressed after the field DCT structure is converted into the frame DCT structure. Thus, the MPEG-2 block-noise reduction information generation section 41B sets boundary-strength determination information BSM for the inter-center-line gap. Every step in the flowchart shown in FIGS. 14 to 17 as a step showing merely a BSM value is a step showing the value of the boundary-strength determination information BSM for a DCT block boundary of the filtering-subject DCT block Q. An example of such a step is a step SP54 of the flowchart shown in FIG. 14. At such a step, the value of the boundary-strength determination information BSM for an inter-center-line gap of the filtering-subject DCT block Q serving as the subject of the processing is set at 0 which indicates that no filtering process needs to be carried out. Notation ALL in the flowchart shown in FIGS. 14 to 17 indicates setting of the values of both the boundary-strength determination information BSM for such a DCT block boundary and the boundary-strength determination information BSM for an inter-center-line gap of a filtering-subject DCT block Q. An example of a step showing notation ALL is a step SP57 of the flowchart shown in FIG. 14. A phrase stating "For others" in a step in the flowchart shown in FIGS. 14 to 17 indicates setting of the value of the boundary-strength determination information BSM for an inter-center-line gap of the filtering-subject DCT block Q serving as the subject of the processing.

Figure 14:
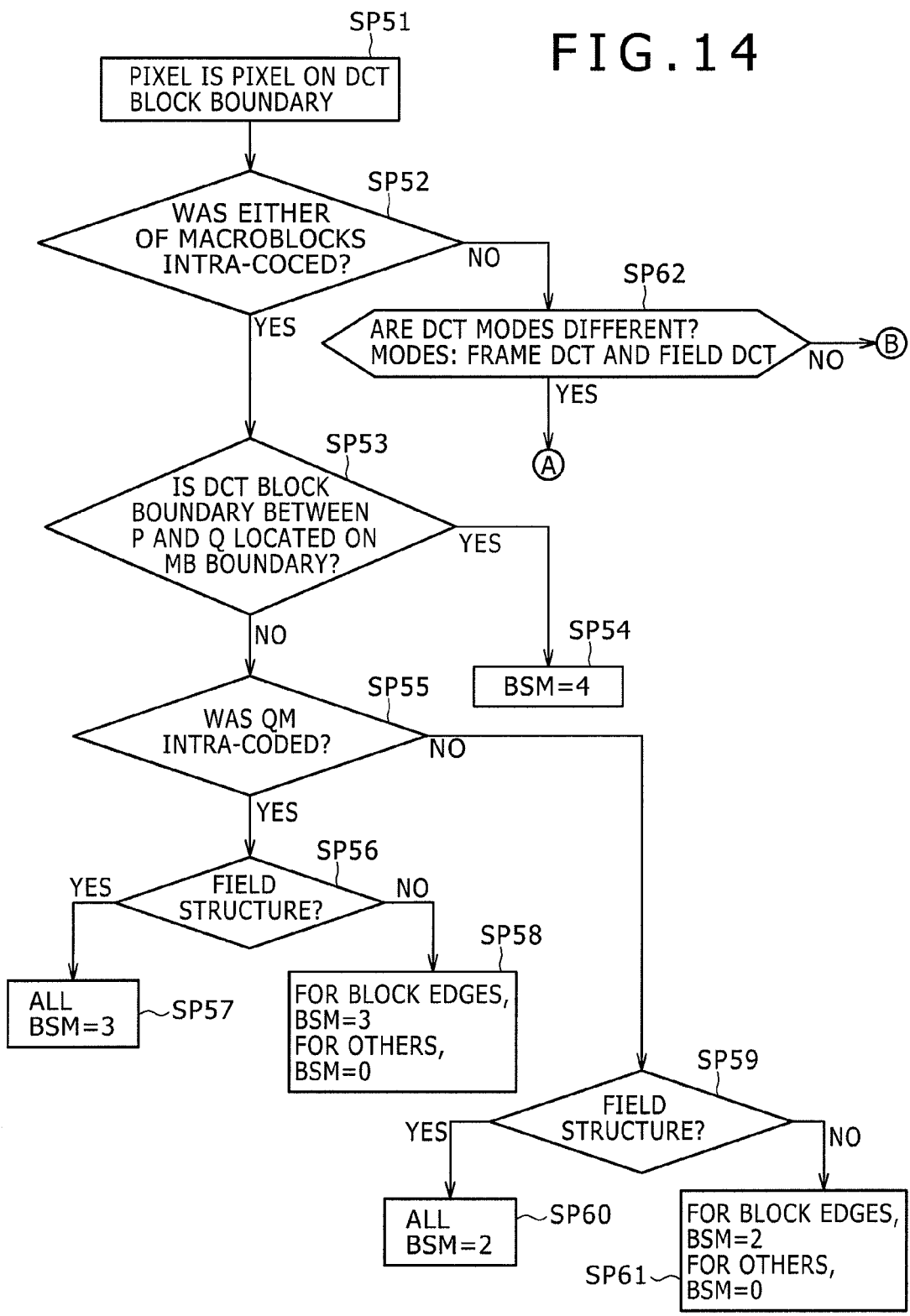
FIG. 14 shows a flowchart representing the procedure of processing carried out by an MPEG-2 block-noise reduction information generation section 41B employed the decoding apparatus 31 according to the first embodiment of the present invention for block boundaries oriented in the horizontal direction.

The MPEG-2 block-noise reduction information generation section 41B sequentially selects pieces of picture data typically in the raster scan order and, if the selected piece of picture data is found at a step SP51 of the flowchart shown in the diagram of FIG. 14 to be picture data adjacent to a DCT block boundary sandwiched by the adjacent DCT block P and the filtering-subject DCT block Q as a DCT block boundary on the upper end side of the processed filtering-subject DCT block Q, the MPEG-2 block-noise reduction information generation section 41B carries out this processing procedure in order to set boundary-strength determination information BSM.

Then, the MPEG-2 block-noise reduction information generation section 41B continues the processing from the step SP51 to a step SP52. At the step SP52, the MPEG-2 block-noise reduction information generation section 41B makes determination as to whether either the macroblock PM or the macroblock QM has been subjected to an intra-coding process. A DCT block completing an intra-coding process generates block noises with ease in comparison with a DCT block which has been subjected to an inter-coding process. Thus, if the result of the determination made at the step SP52 is an affirmation, the MPEG-2 block-noise reduction information generation section 41B continues the processing from the step SP52 to a step SP53. At the step SP53, the MPEG-2 block-noise reduction information generation section 41B makes determination as to whether the DCT block boundary between the adjacent DCT block P and the filtering-subject DCT block Q coincides with a macroblock boundary.

It is quite within the bounds of possibility that a quantization coefficient varies from macroblock MB to macroblock MB. Thus, if the DCT block boundary between the adjacent DCT block P and the filtering-subject DCT block Q coincides with a macroblock boundary, it is quite within the bounds of possibility that block noises are generated severely in comparison with a case in which the DCT block boundary between the adjacent DCT block P and the filtering-subject DCT block Q does not coincide with a macroblock boundary. Thus, if the result of the determination made at the step SP53 is an affirmation, the MPEG-2 block-noise reduction information generation section 41B continues the processing from the step SP53 to a step SP54. At the step SP54, the MPEG-2 block-noise reduction information generation section 41B sets the value of the boundary-strength determination information BSM for the DCT block boundary of the filtering-subject DCT block Q serving as the subject of the processing at 4 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP53 is a negation, on the other hand, the MPEG-2 block-noise reduction information generation section 41B continues the processing from the step SP53 to a step SP55. At the step SP55, the MPEG-2 block-noise reduction information generation section 41B makes determination as to whether the macroblock QM including the filtering-subject DCT block Q serving as the subject of the processing has been subjected to an intra-coding process. If the result of the determination made at the step SP55 is an affirmation, the MPEG-2 block-noise reduction information generation section 41B continues the processing from the step SP55 to a step SP56.

At the step SP56, the MPEG-2 block-noise reduction information generation section 41B makes determination as to whether the macroblock QM including the filtering-subject DCT block Q serving as the subject of the processing is a macroblock MB with a field (DCT) structure. If the result of the determination made at the step SP56 is an affirmation, the MPEG-2 block-noise reduction information generation section 41B continues the processing from the step SP56 to a step SP57. At the step SP57, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 3. Then, the MPEG-2 block-noise reduction information generation section 41B ends the processing.

If the result of the determination made at the step SP56 is a negation, on the other hand, the MPEG-2 block-noise reduction information generation section 41B continues the processing from the step SP56 to a step SP58. At the step SP58, the MPEG-2 block-noise reduction information generation section 41B sets the value of the boundary-strength determination information BSM for the DCT block boundary of the filtering-subject DCT block Q serving as the subject of the processing at 3 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP55 is a negation, on the other hand, the MPEG-2 block-noise reduction information generation section 41B continues the processing from the step SP55 to a step SP59. At the step SP59, the MPEG-2 block-noise reduction information generation section 41B makes determination as to whether the macroblock QM including the filtering-subject DCT block Q serving as the subject of the processing is a macroblock MB with a field (DCT) structure. If the result of the determination made at the step SP59 is an affirmation, the MPEG-2 block-noise reduction information generation section 41B continues the processing from the step SP59 to a step SP60. At the step SP60, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 2. Then, the MPEG-2 block-noise reduction information generation section 41B ends the processing.

If the result of the determination made at the step SP59 is a negation, on the other hand, the MPEG-2 block-noise reduction information generation section 41B continues the processing from the step SP59 to a step SP61. At the step SP61, the MPEG-2 block-noise reduction information generation section 41B sets the value of the boundary-strength determination information BSM for the DCT block boundary of the filtering-subject DCT block Q serving as the subject of the processing at 2 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP52 is a negation, on the other hand, the MPEG-2 block-noise reduction information generation section 41B continues the processing from the step SP52 to a step SP62. At the step SP62, the MPEG-2 block-noise reduction information generation section 41B makes determination as to whether the DCT mode of the macroblock PM is different from the DCT mode of the macroblock QM. If the DCT mode of the macroblock PM is different from the DCT mode of the macroblock QM, block noises are generated with ease in comparison with a case in which the DCT mode of the macroblock PM is the same as the DCT mode of the macroblock QM. Thus, if the DCT mode of the macroblock PM is different from the DCT mode of the macroblock QM, the MPEG-2 block-noise reduction information generation section 41B sets the boundary-strength determination information BSM at a value which will increase the strength of the filtering process to be carried out by the deblocking filter 40.

Figure 15:
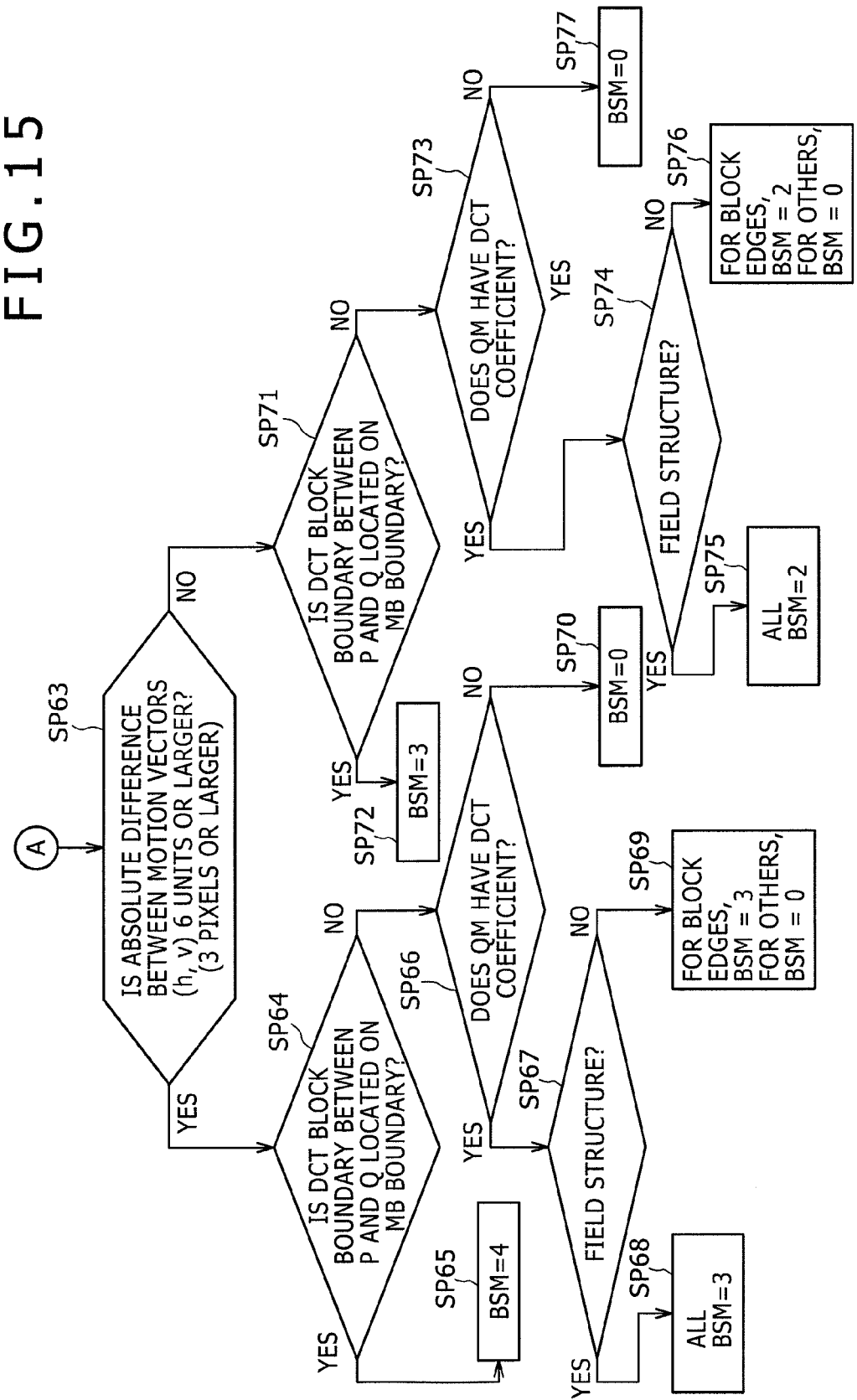
FIG. 15 shows a flowchart representing the procedure of processing carried out by the MPEG-2 block-noise reduction information generation section 41B as a continuation of processing, the procedure of which is represented by the flowchart shown in FIG. 14.

If the result of the determination made at the step SP62 is an affirmation, the MPEG-2 block-noise reduction information generation section 41B continues the processing from the step SP62 to a step SP63 of the flowchart shown in FIG. 15. At the step SP63, the MPEG-2 block-noise reduction information generation section 41B computes the absolute value of a difference between motion vectors MV of the macroblock QM and the macroblock PM, making determination as to whether the difference absolute value is at least equal to a criterion value determined in advance. In the case of the typical processing procedure represented by the flowchart shown in FIG. 15, the criterion value is set at six units or three pixels at the precision based on a half-pixel granularity.

If the result of the determination made at the step SP63 is an affirmation, the MPEG-2 block-noise reduction information generation section 41B continues the processing from the step SP63 to a step SP64. At the step SP64, the MPEG-2 block-noise reduction information generation section 41B makes determination as to whether the DCT block boundary between the adjacent DCT block P and the filtering-subject DCT block Q coincides with a macroblock boundary in the same way as the step SP53. If the result of the determination made at the step SP64 is an affirmation, the MPEG-2 block-noise reduction information generation section 41B continues the processing from the step SP64 to a step SP65. At the step SP65, the MPEG-2 block-noise reduction information generation section 41B sets the value of the boundary-strength determination information BSM for the DCT block boundary of the filtering-subject DCT block Q serving as the subject of the processing at 4 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP64 is a negation, on the other hand, the MPEG-2 block-noise reduction information generation section 41B continues the processing from the step SP64 to a step SP66. At the step SP66, the MPEG-2 block-noise reduction information generation section 41B makes determination as to whether the macroblock QM including the filtering-subject DCT block Q serving as the subject of the processing has a DCT coefficient. If the result of the determination made at the step SP66 is an affirmation, the MPEG-2 block-noise reduction information generation section 41B continues the processing from the step SP66 to a step SP67. At the step SP67, the MPEG-2 block-noise reduction information generation section 41B makes determination as to whether the macroblock QM including the filtering-subject DCT block Q serving as the subject of the processing is a macroblock MB with a field (DCT) structure in the same way as the steps SP56 and SP59. If the result of the determination made at the step SP67 is an affirmation, the MPEG-2 block-noise reduction information generation section 41B continues the processing from the step SP67 to a step SP68. At the step SP68, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 3. Then, the MPEG-2 block-noise reduction information generation section 41B ends the processing.

If the result of the determination made at the step SP67 is a negation, on the other hand, the MPEG-2 block-noise reduction information generation section 41B continues the processing from the step SP67 to a step SP69. At the step SP69, the MPEG-2 block-noise reduction information generation section 41B sets the value of the boundary-strength determination information BSM for the DCT block boundary of the filtering-subject DCT block Q serving as the subject of the processing at 3 and the value of the boundary-strength determination information BSM for the inter-center-line gap of the filtering-subject DCT block Q at 0. Then, the MPEG-2 block-noise reduction information generation section 41B ends the processing. If the result of the determination made at the step SP66 is a negation, on the other hand, the MPEG-2 block-noise reduction information generation section 41B continues the processing from the step SP66 to a step SP70. At the step SP70, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP63 is a negation, on the other hand, the MPEG-2 block-noise reduction information generation section 41B continues the processing from the step SP63 to a step SP71. At the step SP71, the MPEG-2 block-noise reduction information generation section 41B makes determination as to whether the DCT block boundary between the adjacent DCT block P and the filtering-subject DCT block Q coincides with a macroblock boundary in the same way as the step SP64. If the result of the determination made at the step SP71 is an affirmation, the MPEG-2 block-noise reduction information generation section 41B continues the processing from the step SP71 to a step SP72. At the step SP72, the MPEG-2 block-noise reduction information generation section 41B sets the value of the boundary-strength determination information BSM for the DCT block boundary of the filtering-subject DCT block Q serving as the subject of the processing at 3 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP71 is a negation, on the other hand, the MPEG-2 block-noise reduction information generation section 41B continues the processing from the step SP71 to a step SP73. At the step SP73, the MPEG-2 block-noise reduction information generation section 41B makes determination as to whether the macroblock QM including the filtering-subject DCT block Q serving as the subject of the processing has a DCT coefficient in the same way as the step SP66. If the result of the determination made at the step SP73 is an affirmation, the MPEG-2 block-noise reduction information generation section 41B continues the processing from the step SP73 to a step SP74. At the step SP74, the MPEG-2 block-noise reduction information generation section 41B makes determination as to whether the macroblock QM including the filtering-subject DCT block Q serving as the subject of the processing is a macroblock MB with a field (DCT) structure in the same way as the step SP67. If the result of the determination made at the step SP74 is an affirmation, the MPEG-2 block-noise reduction information generation section 41B continues the processing from the step SP74 to a step SP75. At the step SP75, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 2. Then, the MPEG-2 block-noise reduction information generation section 41B ends the processing.

If the result of the determination made at the step SP74 is a negation, on the other hand, the MPEG-2 block-noise reduction information generation section 41B continues the processing from the step SP74 to a step SP76. At the step SP76, the MPEG-2 block-noise reduction information generation section 41B sets the value of the boundary-strength determination information BSM for the DCT block boundary of the filtering-subject DCT block Q serving as the subject of the processing at 2 and the value of the boundary-strength determination information BSM for the inter-center-line gap of the filtering-subject DCT block Q at 0. Then, the MPEG-2 block-noise reduction information generation section 41B ends the processing. If the result of the determination made at the step SP73 is a negation, on the other hand, the MPEG-2 block-noise reduction information generation section 41B continues the processing from the step SP73 to a step SP77. At the step SP77, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

Figure 16:
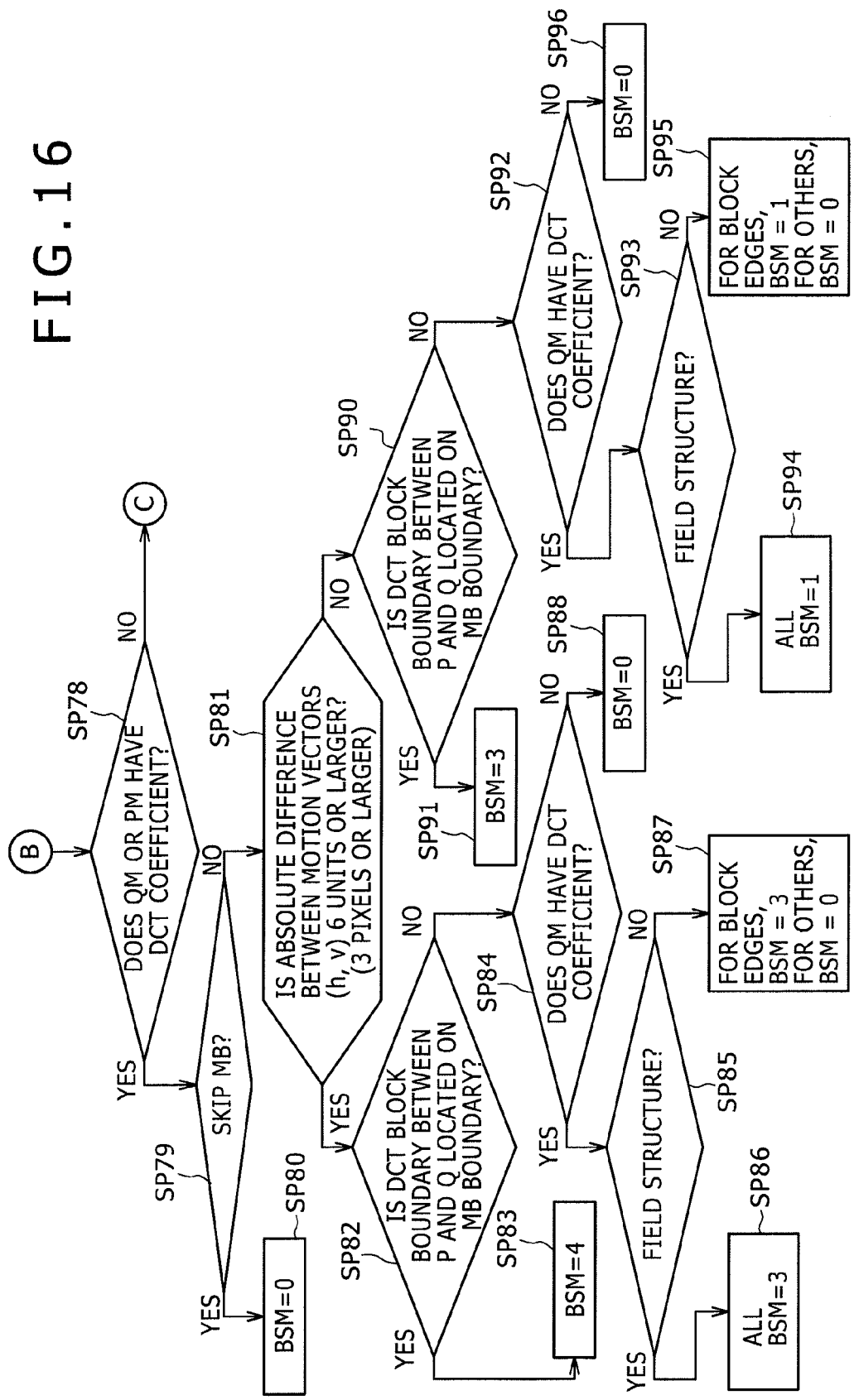
FIG. 16 shows a flowchart representing the procedure of processing carried out by the MPEG-2 block-noise reduction information generation section 41B as a continuation of processing, the procedure of which is represented by the flowchart shown in FIG. 14.

If the result of the determination made at the step SP62 of the flowchart shown in FIG. 14 is a negation, on the other hand, the MPEG-2 block-noise reduction information generation section 41B continues the processing from the step SP62 to a step SP78 of the flowchart shown in FIG. 16. At the step S78, the MPEG-2 block-noise reduction information generation section 41B makes determination as to whether the macroblock QM or the macroblock PM has a DCT coefficient. If the result of the determination made at the step SP78 is an affirmation, the MPEG-2 block-noise reduction information generation section 41B continues the processing from the step SP78 to a step SP79.

At the step SP79, the MPEG-2 block-noise reduction information generation section 41B makes determination as to whether the macroblock QM is a skip macroblock MB. The skip macroblock MB is defined for the MPEG-2 coding/decoding method but not defined for the H.264/AVC coding/decoding method. If the result of the determination made at the step SP79 is an affirmation, the MPEG-2 block-noise reduction information generation section 41B continues the processing from the step SP79 to a step SP80. At the step SP80, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP79 is a negation, on the other hand, the MPEG-2 block-noise reduction information generation section 41B continues the processing from the step SP79 to a step SP81. At the step SP81, the MPEG-2 block-noise reduction information generation section 41B computes the absolute value of a difference between motion vectors MV of the macroblock QM and the macroblock PM, making determination as to whether the difference absolute value is at least equal to a criterion value determined in advance in the same way as the step SP63. If the result of the determination made at the step SP81 is an affirmation, the MPEG-2 block-noise reduction information generation section 41B continues the processing from the step SP81 to a step SP82. Also at the step SP82, the MPEG-2 block-noise reduction information generation section 41B makes determination as to whether the DCT block boundary between the adjacent DCT block P and the filtering-subject DCT block Q coincides with a macroblock boundary in the same way as the step SP71. If the result of the determination made at the step SP82 is an affirmation, the MPEG-2 block-noise reduction information generation section 41B continues the processing from the step SP82 to a step SP83. At the step SP83, the MPEG-2 block-noise reduction information generation section 41B sets the value of the boundary-strength determination information BSM for the DCT block boundary of the filtering-subject DCT block Q serving as the subject of the processing at 4 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP82 is a negation, on the other hand, the MPEG-2 block-noise reduction information generation section 41B continues the processing from the step SP82 to a step SP84. At the step SP84, the MPEG-2 block-noise reduction information generation section 41B makes determination as to whether the macroblock QM including the filtering-subject DCT block Q serving as the subject of the processing has a DCT coefficient in the same way as the step SP66. If the result of the determination made at the step SP84 is an affirmation, the MPEG-2 block-noise reduction information generation section 41B continues the processing from the step SP84 to a step SP85.

At the step SP85, the MPEG-2 block-noise reduction information generation section 41B makes determination as to whether the macroblock QM including the filtering-subject DCT block Q serving as the subject of the processing is a macroblock MB with a field (DCT) structure in the same way as the steps SP56 and SP59. If the result of the determination made at the step SP85 is an affirmation, the MPEG-2 block-noise reduction information generation section 41B continues the processing from the step SP85 to a step SP86. At the step SP86, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 3. Then, the MPEG-2 block-noise reduction information generation section 41B ends the processing.

If the result of the determination made at the step SP85 is a negation, on the other hand, the MPEG-2 block-noise reduction information generation section 41B continues the processing from the step SP85 to a step SP87. At the step SP87, the MPEG-2 block-noise reduction information generation section 41B sets the value of the boundary-strength determination information BSM for the DCT block boundary of the filtering-subject DCT block Q serving as the subject of the processing at 3 and the value of the boundary-strength determination information BSM for the inter-center-line gap of the filtering-subject DCT block Q at 0. Then, the MPEG-2 block-noise reduction information generation section 41B ends the processing. If the result of the determination made at the step SP84 is a negation, on the other hand, the MPEG-2 block-noise reduction information generation section 41B continues the processing from the step SP84 to a step SP88. At the step SP88, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP81 is a negation, on the other hand, the MPEG-2 block-noise reduction information generation section 41B continues the processing from the step SP81 to a step SP90. Also at the step SP90, the MPEG-2 block-noise reduction information generation section 41B makes determination as to whether the DCT block boundary between the adjacent DCT block P and the filtering-subject DCT block Q coincides with a macroblock boundary in the same way as the step SP82. If the result of the determination made at the step SP90 is an affirmation, the MPEG-2 block-noise reduction information generation section 41B continues the processing from the step SP90 to a step SP91. At the step SP91, the MPEG-2 block-noise reduction information generation section 41B sets the value of the boundary-strength determination information BSM for the DCT block boundary of the filtering-subject DCT block Q serving as the subject of the processing at 3 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP90 is a negation, on the other hand, the MPEG-2 block-noise reduction information generation section 41B continues the processing from the step SP90 to a step SP92. At the step SP92, the MPEG-2 block-noise reduction information generation section 41B makes determination as to whether the macroblock QM including the filtering-subject DCT block Q serving as the subject of the processing has a DCT coefficient in the same way as the step SP84. If the result of the determination made at the step SP92 is an affirmation, the MPEG-2 block-noise reduction information generation section 41B continues the processing from the step SP92 to a step SP93.

At the step SP93, the MPEG-2 block-noise reduction information generation section 41B makes determination as to whether the macroblock QM including the filtering-subject DCT block Q serving as the subject of the processing is a macroblock MB with a field (DCT) structure in the same way as the step SP85. If the result of the determination made at the step SP93 is an affirmation, the MPEG-2 block-noise reduction information generation section 41B continues the processing from the step SP93 to a step SP94. At the step SP94, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 1. Then, the MPEG-2 block-noise reduction information generation section 41B ends the processing.

If the result of the determination made at the step SP93 is a negation, on the other hand, the MPEG-2 block-noise reduction information generation section 41B continues the processing from the step SP93 to a step SP95. At the step SP95, the MPEG-2 block-noise reduction information generation section 41B sets the value of the boundary-strength determination information BSM for the DCT block boundary of the filtering-subject DCT block Q serving as the subject of the processing at 1 and the value of the boundary-strength determination information BSM for the inter-center-line gap of the filtering-subject DCT block Q at 0. Then, the MPEG-2 block-noise reduction information generation section 41B ends the processing. If the result of the determination made at the step SP92 is a negation, on the other hand, the MPEG-2 block-noise reduction information generation section 41B continues the processing from the step SP92 to a step SP96. At the step SP96, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

Figure 17:
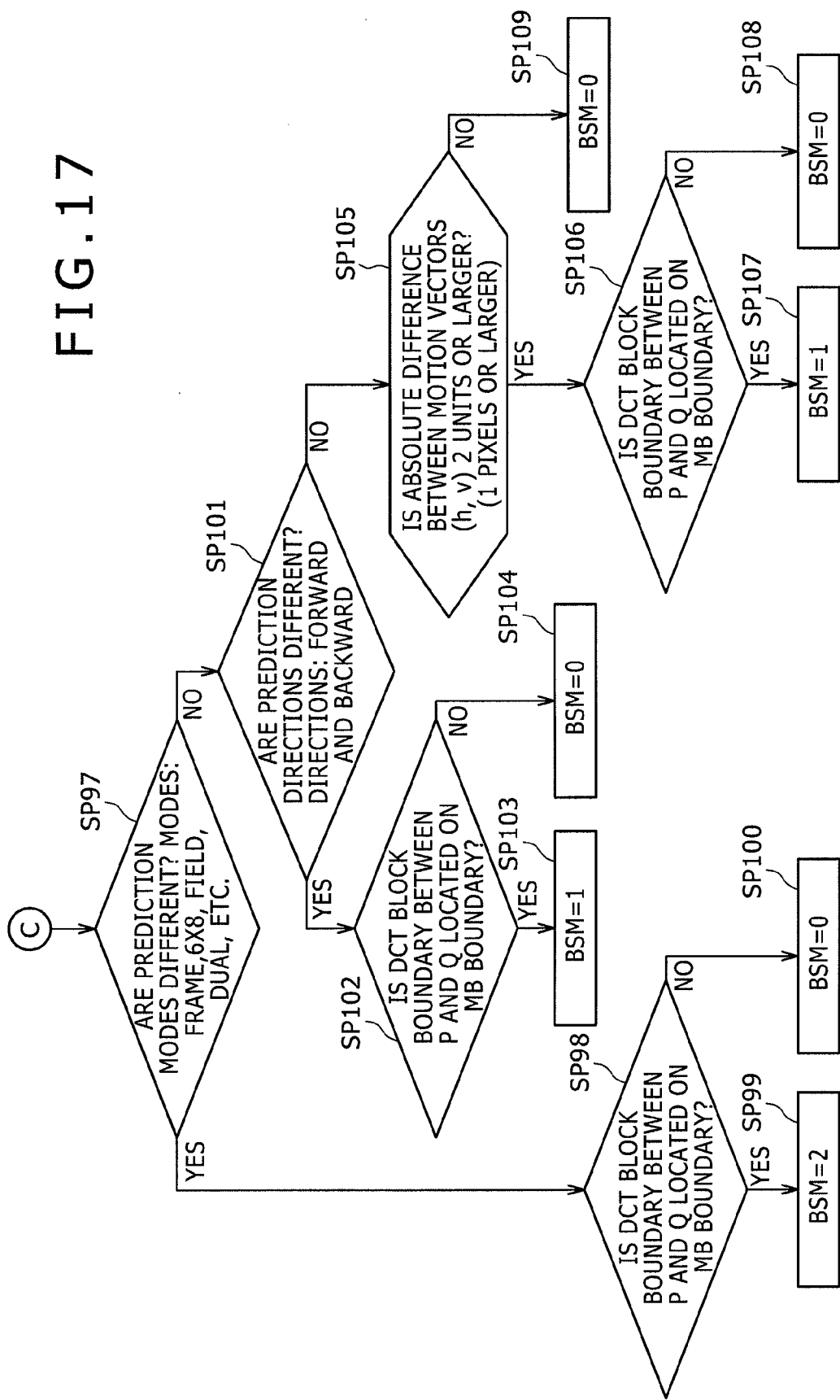
FIG. 17 shows a flowchart representing the procedure of processing carried out by the MPEG-2 block-noise reduction information generation section 41B as a continuation of processing, the procedure of which is represented by the flowchart shown in FIG. 16.

If the result of the determination made at the step SP78 is a negation, on the other hand, the MPEG-2 block-noise reduction information generation section 41B continues the processing from the step SP78 to a step SP97 of the flowchart shown in FIG. 17. At the step SP97, the MPEG-2 block-noise reduction information generation section 41B makes determination as to whether the prediction mode of the macroblock QM is different from the prediction mode of the macroblock PM in the same way as the step SP30. If the result of the determination made at the step SP97 is an affirmation, the MPEG-2 block-noise reduction information generation section 41B continues the processing from the step SP97 to a step SP98. At the step SP98, the MPEG-2 block-noise reduction information generation section 41B makes determination as to whether the DCT block boundary between the adjacent DCT block P and the filtering-subject DCT block Q coincides with a macroblock boundary in the same way as the step SP31. If the result of the determination made at the step SP98 is an affirmation, the MPEG-2 block-noise reduction information generation section 41B continues the processing from the step SP98 to a step SP99. At the step SP99, the MPEG-2 block-noise reduction information generation section 41B sets the value of the boundary-strength determination information BSM for the DCT block boundary of the filtering-subject DCT block Q serving as the subject of the processing at 2 and the value of the boundary-strength determination information BSM for the inter-center-line gap of the filtering-subject DCT block Q at 0. Then, the MPEG-2 block-noise reduction information generation section 41B ends the processing. If the result of the determination made at the step SP98 is a negation, on the other hand, the MPEG-2 block-noise reduction information generation section 41B continues the processing from the step SP98 to a step SP100. At the step SP100, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP97 is a negation, on the other hand, the MPEG-2 block-noise reduction information generation section 41B continues the processing from the step SP97 to a step SP101. At the step SP101, the MPEG-2 block-noise reduction information generation section 41B makes determination as to whether the prediction direction of the macroblock QM is different from the prediction direction of the macroblock PM.

If the result of the determination made at the step SP101 is an affirmation, the MPEG-2 block-noise reduction information generation section 41B continues the processing from the step SP101 to a step SP102. At the step SP102, the MPEG-2 block-noise reduction information generation section 41B makes determination as to whether the DCT block boundary between the adjacent DCT block P and the filtering-subject DCT block Q coincides with a macroblock boundary in the same way as the step SP98. If the result of the determination made at the step SP102 is an affirmation, the MPEG-2 block-noise reduction information generation section 41B continues the processing from the step SP102 to a step SP103. At the step SP103, the MPEG-2 block-noise reduction information generation section 41B sets the value of the boundary-strength determination information BSM for the DCT block boundary of the filtering-subject DCT block Q serving as the subject of the processing at 1 and the value of the boundary-strength determination information BSM for the inter-center-line gap of the filtering-subject DCT block Q at 0. Then, the MPEG-2 block-noise reduction information generation section 41B ends the processing. If the result of the determination made at the step SP102 is a negation, on the other hand, the MPEG-2 block-noise reduction information generation section 41B continues the processing from the step SP102 to a step SP104. At the step SP104, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP101 is a negation, on the other hand, the MPEG-2 block-noise reduction information generation section 41B continues the processing from the step SP101 to a step SP105. At the step SP105, the MPEG-2 block-noise reduction information generation section 41B computes the absolute value of a difference between motion vectors MV of the macroblock QM and the macroblock PM, making determination as to whether the difference absolute value is at least equal to a criterion value determined in advance in the same way as the step SP63 or SP81. It is to be noted that, in the case of the step SP105, however, the criterion value is smaller than the criterion value used at the steps SP63 and SP81. To put it concretely, in the case of the typical processing procedure represented by the flowchart shown in FIG. 17, the criterion value used at the step SP105 is set at two units or one pixel at the precision based on a half-pixel granularity.

If the result of the determination made at the step SP105 is an affirmation, the MPEG-2 block-noise reduction information generation section 41B continues the processing from the step SP105 to a step SP106. Also at the step SP106, the MPEG-2 block-noise reduction information generation section 41B makes determination as to whether the DCT block boundary between the adjacent DCT block P and the filtering-subject DCT block Q coincides with a macroblock boundary in the same way as the step SP102. If the result of the determination made at the step SP106 is an affirmation, the MPEG-2 block-noise reduction information generation section 41B continues the processing from the step SP106 to a step SP107. At the step SP107, the MPEG-2 block-noise reduction information generation section 41B sets the value of the boundary-strength determination information BSM for the DCT block boundary of the filtering-subject DCT block Q serving as the subject of the processing at 1 and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP106 is a negation, on the other hand, the MPEG-2 block-noise reduction information generation section 41B continues the processing from the step SP106 to a step SP108. At the step SP108, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

If the result of the determination made at the step SP105 is a negation, on the other hand, the MPEG-2 block-noise reduction information generation section 41B continues the processing from the step SP105 to a step SP109. At the step SP109, the MPEG-2 block-noise reduction information generation section 41B sets each of the value of the boundary-strength determination information BSM for the DCT block boundary of the filtering-subject DCT block Q serving as the subject of the processing and the value of the boundary-strength determination information BSM for the inter-center-line gap of the filtering-subject DCT block Q at 0. Then, the MPEG-2 block-noise reduction information generation section 41B ends the processing.

Thus, also in the case of the MPEG-2 coding/decoding method, the value of the boundary-strength determination information BSM is set in accordance with whether an intra coding process or an inter coding process has been carried out on a DCT block serving as the subject of processing and a DCT block adjacent to the DCT block serving as the subject of processing and in accordance with whether or not the boundary between the adjacent DCT blocks each serving as an orthogonal transform process unit coincides with the boundary between adjacent predicted-value generation units which are each a macroblock MB. In addition, the value of the boundary-strength determination information BSM is set to increase the strength of the filtering process on conditions including the condition that prediction modes for generating the predicted values merely for the MPEG-2 coding/decoding method in adjacent orthogonal transform process units are different from each other.

(2) Operations of the Embodiment

In the decoding apparatus 31 with the configuration described earlier by referring to the block diagram of FIG. 2, during the decoding processing carried out on an H.264/AVC bit stream S2, the entropy decoding section 32 receives the H.264/AVC bit stream S2 and carries out an entropy decoding process as a part of the decoding processing, which is being carried out by the decoding apparatus 31, on the H.264/AVC bit stream S2. The motion prediction section 33 extracts information such as a motion vector MV and information used for identifying a reference frame from data output by the entropy decoding section 32, supplying the extracted information to the motion compensation section 34. The motion compensation section 34 makes use of the information received from the motion prediction section 33 to carry out a motion compensation process on reference picture data stored in the FM (frame memory) 35 and outputs a predicted value corresponding to an inter coding process, which has been carried out previously by a coding apparatus to generate the H.264/AVC bit stream S2, to the addition section 39. The motion compensation section 34 outputs a predicted value for each predicted-value generation unit which has a typical size of 16 pixels×16 pixels or 8 pixels×16 pixels. The intra prediction section 36 generates a predicted value corresponding to an intra coding process, which has been carried out by the coding apparatus to generate the H.264/AVC bit stream S2, on the basis of data output by the addition section 39. The intra prediction section 36 also outputs a predicted value for each predicted-value generation unit cited above. The inverse quantization (IQ) section 37 carries out an inverse quantization process as a part of the decoding processing, which is being carried out by the decoding apparatus 31, on the H.264/AVC bit stream S2, which is data output by the entropy decoding section 32, in order to generate a DCT (Discrete Cosine Transform) coefficient. The inverse quantization section 37 carries out the inverse quantization process in orthogonal transform process units which are each a DCT block unit having a size of 4 pixels×4 pixels. The inverse DCT transform section 38 carries out an inverse DCT process as a part of the decoding processing, which is being carried out by the decoding apparatus 31, on the DCT coefficient output by the inverse quantization section 37 in order to generate a prediction error. The addition section 39 cited above carries out an addition process as a part of the decoding processing, which is being carried out by the decoding apparatus 31, to add a predicted value output by the motion compensation section 34 or the intra prediction section 36 to the prediction error generated by the inverse DCT transform section 38 in order to generate picture data.

The deblocking filter 40 removes block noises from the H.264/AVC bit stream S2 which is the picture data output by the addition section 39 and stores the picture data with no block noises in the frame memory 35. In the decoding apparatus 31, the picture data generated by the deblocking filter 40 is held on a temporary basis in the frame memory 35. Then, pictures of the picture data stored in the frame memory 35 are rearranged in order to produce a video signal SV. The H.264/AVC block-noise reduction information generation section 41A finds filtering-location identifying information DP indicating the position of a DCT block, from which block noises are to be removed, from a variety of parameters set in the H.264/AVC bit stream S2. In addition, the H.264/AVC block-noise reduction information generation section 41A also sets the boundary-strength determination information BS indicating the strength of the filtering process in accordance with, among other criteria, whether an intra coding process or an inter coding process has been carried out on an orthogonal transform process unit serving as the subject of processing and an orthogonal transform process unit adjacent to the orthogonal transform process unit serving as the subject of processing and in accordance with whether or not the boundary between the adjacent orthogonal transform process units coincides with the boundary between predicted-value generation units as described earlier by referring to the diagrams of FIGS. 3 and 4. On top of that, the H.264/AVC block-noise reduction information generation section 41A also detects a quantization parameter QP for every macroblock MB.

The H.264/AVC block-noise reduction information generation section 41A outputs the filtering-location identifying information DP, the boundary-strength determination information BS and the quantization parameter QP, which have been found from the H.264/AVC bit stream S2 to the deblocking filter 40. On the basis of the filtering-location identifying information DP, the boundary-strength determination information BS and the quantization parameter QP, the deblocking filter 40 carries out the filtering process to remove block noises from the H.264/AVC bit stream S2 in the vertical and horizontal directions by adaptively changing the strength of the filtering process in accordance with Eqs. (1) to (14) and the tables shown in FIGS. 5 and 6. As a result of the filtering process carried out by dynamically changing the strength of the filtering process in accordance with, among other criteria, whether an intra coding process or an inter coding process has been carried out on an orthogonal transform process unit serving as the subject of processing and an orthogonal transform process unit adjacent to the orthogonal transform process unit serving as the subject of processing and in accordance with whether or not the boundary between the adjacent orthogonal transform process units coincides with the boundary between predicted-value generation units, it is possible to effectively prevent high-frequency components of the picture data from deteriorating by repressing merely block noises. As a result, the decoding apparatus 31 is capable of effectively preventing the quality of the picture from deteriorating by reducing the number of block noises.

On the other hand, in the decoding apparatus 31, during the decoding processing carried out on an MPEG-2 bit stream S1, the entropy decoding section 32 receives the MPEG-2 bit stream S1 and carries out an entropy decoding process as a part of the decoding processing, which is being carried out by the decoding apparatus 31, on the MPEG-2 bit stream S1. The motion prediction section 33 extracts information such as a motion vector MV and information used for identifying a reference frame from data output by the entropy decoding section 32, supplying the extracted information to the motion compensation section 34. The motion compensation section 34 makes use of the information received from the motion prediction section 33 to carry out a motion compensation process on reference picture data stored in the FM (frame memory) 35 and outputs a predicted value corresponding to an inter coding process, which has been carried out previously by a coding apparatus to generate the MPEG-2 bit stream S1, to the addition section 39. The motion compensation section 34 outputs a predicted value for each predicted-value generation unit which has a typical size of 16 pixels×16 pixels. The intra prediction section 36 generates a predicted value corresponding to an intra coding process, which has been carried out previously by the coding apparatus to generate the MPEG-2 bit stream S1, on the basis of data output by the addition section 39. The intra prediction section 36 also outputs a predicted value for each predicted-value generation unit cited above. The inverse quantization (IQ) section 37 carries out an inverse quantization process as a part of the decoding processing, which is being carried out by the decoding apparatus 31, on the MPEG-2 bit stream S1, which is data output by the entropy decoding section 32, in order to generate a DCT (Discrete Cosine Transform) coefficient. The inverse quantization section 37 carries out the inverse quantization process in orthogonal transform process units which are each a DCT block unit having a size of 8 pixels×8 pixels. The inverse DCT transform section 38 carries out an inverse DCT process as a part of the decoding processing, which is being carried out by the decoding apparatus 31, on the DCT coefficient output by the inverse quantization section 37 in order to generate a prediction error. The addition section 39 cited above carries out an addition process as a part of the decoding processing, which is being carried out by the decoding apparatus 31, to add a predicted value output by the motion compensation section 34 or the intra prediction section 36 to the prediction error generated by the inverse DCT transform section 38 in order to generate picture data.

The deblocking filter 40 removes block noises from the MPEG-2 bit stream S1 which is the picture data output by the addition section 39 and stores the picture data with no block noises in the frame memory 35. In the decoding apparatus 31, the picture data generated by the deblocking filter 40 is held on a temporary basis in the frame memory 35. Then, pictures of the picture data stored in the frame memory 35 are rearranged in order to produce a video signal SV.

In the case of the MPEG-2 coding/decoding method, however, the use of the deblocking filter 40 is not planned. Thus, unlike the H.264/AVC bit stream S2, the MPEG-2 bit stream S1 does not include information used for setting the filtering-location identifying information DP, the boundary-strength determination information BS and the quantization parameter QP which are desired in control executed by the deblocking filter 40. It is therefore difficult to readily remove block noises from the MPEG-2 bit stream S1 by making use of the deblocking filter 40.

Thus, in the processing carried out by the decoding apparatus 31 to process the MPEG-2 bit stream S1, the MPEG-2 block-noise reduction information generation section 41B sets filtering-location identifying information DPM, boundary-strength determination information BSM and a quantization parameter QPM which correspond to the filtering-location identifying information DP, the boundary-strength determination information BS and the quantization parameter QP respectively. Then, the MPEG-2 block-noise reduction information generation section 41B supplies the filtering-location identifying information DPM, the boundary-strength determination information BSM and the quantization parameter QPM to the deblocking filter 40 as information to be used for removing block noises from the MPEG-2 bit stream S1.

To put it concretely, the MPEG-2 block-noise reduction information generation section 41B determines the position of a specific macroblock MB including a DCT block serving as the subject of the processing by finding the number of macroblocks MB composing one screen as well as the horizontal-direction and vertical-direction coordinates of the position of the specific macroblock MB. The horizontal-direction and vertical-direction coordinates of the specific macroblock MB are respectively the number of macroblocks MB arranged in the horizontal direction up to the position of the specific macroblock MB and the number of macroblocks MB arranged in the vertical direction up to the position. The filtering-location identifying information DPM is generated on the basis of the position of the specific macroblock MB as explained previously by referring to the diagram of FIG. 7.

The characteristic of the quantization process according to the H.264/AVC coding/decoding method is different from the characteristic of the quantization process according to the MPEG-2 coding/decoding method. For this reason, the MPEG-2 block-noise reduction information generation section 41B processes the MPEG-2 quantization scale code Q_SCALE in order to generate the quantization parameter QPM so as to make the characteristic of the quantization process according to the MPEG-2 coding/decoding method compatible with the characteristic of the quantization process according to the H.264/AVC coding/decoding method as explained before by referring to FIGS. (15) to (17) and the diagram of FIG. 9.

On the basis of the various kinds of information stored in, among others, the header of the MPEG-2 bit stream S1, the MPEG-2 block-noise reduction information generation section 41B identifies the picture types and other attributes for every macroblock MB. On the basis of the identified picture types and other attributes, the MPEG-2 block-noise reduction information generation section 41B sets the boundary-strength determination information BSM in accordance with, among other criteria, whether an intra coding process or an inter coding process has been carried out on a DCT block serving as the subject of processing and a DCT block adjacent to the DCT block serving as the subject of processing and in accordance with whether or not the boundary between the adjacent DCT blocks coincides with the boundary between predicted-value generation units which are each a macroblock MB as described earlier by referring to the flowcharts shown in FIGS. 1 and 9 to 17.

As a result, the decoding apparatus 31 is capable of removing block noises from the MPEG-2 bit stream S1 obtained as a result of the decoding processing based on the MPEG-2 coding/decoding method by making use of the deblocking filter 40 originally provided for the H.264/AVC coding/decoding method. Also in the decoding processing based on the MPEG-2 coding/decoding method, the filtering process is carried out by dynamically changing the strength of the filtering process in accordance with, among other criteria, whether an intra coding process or an inter coding process has been carried out on a DCT block serving as the subject of processing and a DCT block adjacent to the DCT block serving as the subject of processing and in accordance with whether or not the boundary between the adjacent DCT blocks coincides with the boundary between predicted-value generation units which are each a macroblock MB so that it is possible to remove block noises and, as a result, reduce the number of block noises in order to effectively prevent the quality of the picture from becoming poor.

In the MPEG-2 coding/decoding method, however, a field structure not defined in the H.264/AVC coding/decoding method is defined. In the field structure, the coding processing is carried out in a field prediction mode and a field DCT mode. In addition, in the MPEG-2 coding/decoding method, a frame structure is defined in addition to the field structure. In the frame structure, a predicted value is generated for each field or each frame and subjected to a coding process carried out in the field prediction mode and the field DCT mode respectively or a frame prediction mode or a frame DCT mode respectively.

Thus, if the deblocking filter 40 is controlled by taking the field structure into consideration, it is possible to reduce the number of block noises and effectively prevent the quality of the picture from becoming poor.

In order to set the boundary-strength determination information BSM for each of the vertical and horizontal directions, the MPEG-2 block-noise reduction information generation section 41B employed in the decoding apparatus 31 makes determination as to whether the DCT mode of the macroblock QM including the filtering-subject DCT block Q serving as the subject of the processing is different from the DCT mode of the macroblock PM adjacent to the macroblock QM at the step SP8 of the flowchart shown in FIG. 11 and the step SP62 of the flowchart shown in FIG. 14. If the DCT mode of the macroblock PM is different from the DCT mode of the macroblock QM, the unit of the orthogonal transform process for the macroblock PM is different from the unit of the orthogonal transform process for the macroblock QM so that block noises are generated severely in comparison with a case in which the DCT mode of the macroblock PM is the same as the DCT mode of the macroblock QM. Thus, if the DCT mode of the macroblock PM is different from the DCT mode of the macroblock QM, the MPEG-2 block-noise reduction information generation section 41B employed in the decoding apparatus 31 sets the boundary-strength determination information BSM at a value which will increase the strength of the filtering process to be carried out by the deblocking filter 40 to a magnitude greater than the strength of the filtering process to be carried out for a case in which the DCT mode of the macroblock PM is the same as the DCT mode of the macroblock QM. As a result, the decoding apparatus 31 is capable of reducing the number of block noises caused by the difference in DCT mode between the macroblock QM and the macroblock PM as noises inherent in the MPEG-2 coding/decoding method and, hence, making the noises less eye-catching.

In addition, at the step SP21 of the flowchart shown in FIG. 13 and the step SP79 of the flowchart shown in FIG. 16, the MPEG-2 block-noise reduction information generation section 41B employed in the decoding apparatus 31 makes determination as to whether the macroblock QM including the filtering-subject DCT block Q serving as the subject of the processing is a skip macroblock MB. In the case of a skip macroblock MB, the MPEG-2 block-noise reduction information generation section 41B employed in the decoding apparatus 31 sets the boundary-strength determination information BSM at a value which indicates that the filtering process is not desired. That is to say, if the result of the determination made at the step SP21 or SP79 is an affirmation, the MPEG-2 block-noise reduction information generation section 41B employed in the decoding apparatus 31 continues the processing from the step SP21 to the step SP22 or from the step SP79 to the step SP80. At each of the steps SP22 and SP80, the MPEG-2 block-noise reduction information generation section 41B employed in the decoding apparatus 31 sets the value of the boundary-strength determination information BSM at 0. As a result, in the case of a skip macroblock QM peculiar to the MPEG-2 coding/decoding method, the decoding apparatus 31 prevents high-frequency components from being repressed excessively, hence, effectively preventing the quality of the picture from becoming poor.

On top of that, the MPEG-2 block-noise reduction information generation section 41B employed in the decoding apparatus 31 makes determination as to whether the prediction mode of the macroblock QM including the filtering-subject DCT block Q serving as the subject of the processing is different from the prediction mode of the macroblock PM adjacent to the macroblock QM at the step SP30 of the flowchart shown in FIG. 1 and the step SP97 of the flowchart shown in FIG. 17. If the prediction mode of the macroblock QM including the filtering-subject DCT block Q serving as the subject of the processing is different from the prediction mode of the macroblock PM, the relevance of reference picture data to be referenced between the macroblock QM and the macroblock PM is low so that the block-noise generation probability is high. Thus, if the result of the determination made at the step SP30 or SP97 is an affirmation indicating that the prediction mode of the macroblock QM is different from the prediction mode of the macroblock PM, the MPEG-2 block-noise reduction information generation section 41B employed in the decoding apparatus 31 sets the boundary-strength determination information BSM at a value which will increase the strength of the filtering process to a magnitude greater than the strength of a filtering process carried out for a case in which the prediction mode of a specific macroblock MB is the same as the prediction mode of a macroblock MB adjacent to the specific macroblock MB. As a result, the decoding apparatus 31 is capable of reducing the number of block noises caused by the difference in prediction mode between the macroblock QM and the macroblock PM as noises inherent in the MPEG-2 coding/decoding method and, hence, making the noises less eye-catching.

Incidentally, in accordance with the H.264/AVC coding/decoding method, the orthogonal transform process is carried out in orthogonal transform process units which are each a DCT block unit having a size of 4 pixels×4 pixels whereas in accordance with the MPEG-2 coding/decoding method, the orthogonal transform process is carried out in orthogonal transform process units which are each a DCT block unit having a size of 8 pixels×8 pixels. As explained before by referring to the diagram of FIG. 3, the deblocking filter 40 carries out a filtering process on a boundary between two adjacent DCT blocks each serving as the orthogonal transform process unit. Thus, by driving the deblocking filter 40 to carry out a filtering process on a boundary between two adjacent DCT blocks each serving as the orthogonal transform process unit having a size of 8 pixels×8 pixels in both the horizontal and vertical directions in the processing to decode an MPEG-2 bit stream S1, block noises can be repressed.

If the case of a field structure for the vertical direction is taken into consideration, however, for the field structure, if the field DCT structure is expressed by making use of a frame DCT structure rearranged in the raster display order as a structure to be eventually displayed, block noises are generated by a difference in orthogonal transform process at upper and lower portions sandwiching a vertical-direction intercenter-line gap between DCT block boundaries as shown in the diagram of FIGS. 18A and 18B. Thus, in addition to block noises generated on the DCT block boundary, block noises are also generated in the vertical-direction inter-center-line gap between DCT block boundaries. The block noises generated in the vertical-direction inter-center-line gap between DCT block boundaries are block noises observed in a displayed picture of a video signal, which is obtained as a result of decoding processing based on the interlace method, in the time-axis direction. These block noises can be said to be block noises unique to the MPEG-2 coding/decoding method in which the field structure is defined.

In this case, the deblocking filter 40 employed in the decoding apparatus 31 carries out a filtering process for a DCT block boundary oriented in the vertical direction in an 8 pixel×8 pixel mode which is a 8 pixel×8 pixel processing mode in the H.264/AVC coding/decoding method and a filtering process for a DCT block boundary oriented in the vertical direction in a 4 pixel×4 pixel mode which is a 4 pixel×4 pixel processing mode in the H.264/AVC coding/decoding method, driving the deblocking filter 40 to remove block noises generated in a vertical-direction inter-center-line gap between DCT block boundaries.

In addition, in accordance with setting of the deblocking filter 40, in a process to generate boundary-strength determination information BSM for a DCT block boundary oriented in the horizontal direction, the MPEG-2 block-noise reduction information generation section 41B also sets the boundary-strength determination information BSM for a vertical-direction inter-center-line gap between DCT block boundaries. At the step SP67 of the flowchart shown in FIG. 15 as well as the steps SP85 and SP93 of the flowchart shown in FIG. 16, the MPEG-2 block-noise reduction information generation section 41B also makes determination as to whether the macroblock QM including the filtering-subject DCT block Q serving as the subject of the processing is a macroblock MB with a field (DCT) structure. If the result of the determination indicates that the macroblock QM including the filtering-subject DCT block Q serving as the subject of the processing is a macroblock MB with a field (DCT) structure, the MPEG-2 block-noise reduction information generation section 41B sets the boundary-strength determination information BSM that drives the deblocking filter 40 to carry out a filtering process for the vertical-direction inter-center-line gap between DCT block boundaries.

As a result, also in this case, the decoding apparatus 31 is capable of reducing the number of block noises caused by the field structure peculiar to the MPEG-2 coding/decoding method and, hence, more effectively preventing the quality of the picture from becoming poor.

(3) Effects of the Embodiment

In accordance with the configuration described above, the boundary strength determination information is set in accordance with whether an intra coding process or an inter coding process has been carried out on adjacent predicted-value generation units and in accordance with whether or not a boundary between adjacent orthogonal transform process units coincides with a boundary between the predicted-value generation units and, if the prediction modes for generating predicted values in the adjacent orthogonal transform process units are different from each other, the boundary-strength determination information is set at a value that enhances the strength of a filtering process. Thus, in comparison with the existing technology, a technology according to the embodiments of the present invention is capable of removing block noises with a high degree of reliability and, hence, effectively avoiding deteriorations of the quality of a picture by making use of a simple configuration.

In addition, if the predicted-value generation unit including an orthogonal transform process unit being processed is a skip macroblock peculiar to the MPEG-2 coding/decoding method, the embodiments of the present invention set the boundary strength determination information at a value which indicates that the filtering process is not desired. As a result, in the case of a skip macroblock, the embodiments of the present invention prevent high-frequency components from being repressed excessively, hence, effectively preventing the quality of the picture from becoming poor.

On top of that, if the orthogonal transform processing modes in adjacent orthogonal transform process units are different from each other, the embodiments of the present invention sets boundary-strength determination information at a value that increases the strength of a filtering process to a magnitude greater than the strength of the filtering process to be carried out for a case in which the adjacent orthogonal transform process units have the same orthogonal transform processing mode. As a result, the decoding apparatus 31 is capable of reducing the number of block noises caused by the difference in orthogonal transform processing mode between the adjacent orthogonal transform process units as noises inherent in the MPEG-2 coding/decoding method and, hence, making the noises less eye-catching.

In addition, boundary-strength determination information is generated for the filtering process to be carried out by the deblocking filter in the vertical direction separately from boundary-strength determination information generated for the filtering process to be carried out by the deblocking filter in the horizontal direction. The vertical-direction filtering process can be carried out for removing block noises which are generated by a difference in orthogonal transform process at upper and lower portions sandwiching a vertical-direction inter-center-line gap between DCT block boundaries when the field DCT structure is expressed by making use of a frame DCT structure rearranged in the raster display order as a structure to be eventually displayed. If the bit stream is a bit stream of the field structure, the boundary-strength determination information is generated to request that the filtering process be carried out by the deblocking filter for a boundary between adjacent orthogonal transform processing units and a vertical-direction inter-center-line gap between orthogonal transform processing unit boundaries. As a result, also in this case, the embodiments of the present invention are capable of reducing the number of block noises caused by the field structure peculiar to the MPEG-2 coding/decoding method and, hence, more effectively preventing the quality of the picture from becoming poor.

Second Embodiment

It is to be noted that, in the case of the first embodiment explained so far, a filtering process can also be carried out for a vertical-direction inter-center-line gap between DCT block boundaries. However, the scope of the embodiments of the present invention is by no means limited to the first embodiment. For example, the difference in DCT type can also be taken into consideration in order to carry out the filtering process more finely. That is to say, in the case of a field structure shown in the diagram of FIGS. 19A and 19B, a DCT block noise Q to be removed and a DCT block noise P adjacent to the DCT block noise Q may exist in the same macroblock MB. Even in this case, the two block noises, i.e., the DCT block noise Q and the DCT block noise P, are generated as noises of blocks created from a top field and a bottom field which are different from each other from the time point of view. In this case, the relevance and resemblance of the two block noises, i.e., the DCT block noise Q and the DCT block noise P, are low so that generation of block noises between the DCT blocks is predicted. In this case, the block noises are generated for every two adjacent lines each shown in the diagrams of FIGS. 19A and 19B as a dashed line. Thus, by configuring the deblocking filter 40 to carry out the filtering function also for every line gap between any adjacent two of such lines and by setting the boundary-strength determination information in accordance with the DCT type, it is possible to reduce the number of block noises with a higher degree of reliability.

Third Embodiment

Figure 20:
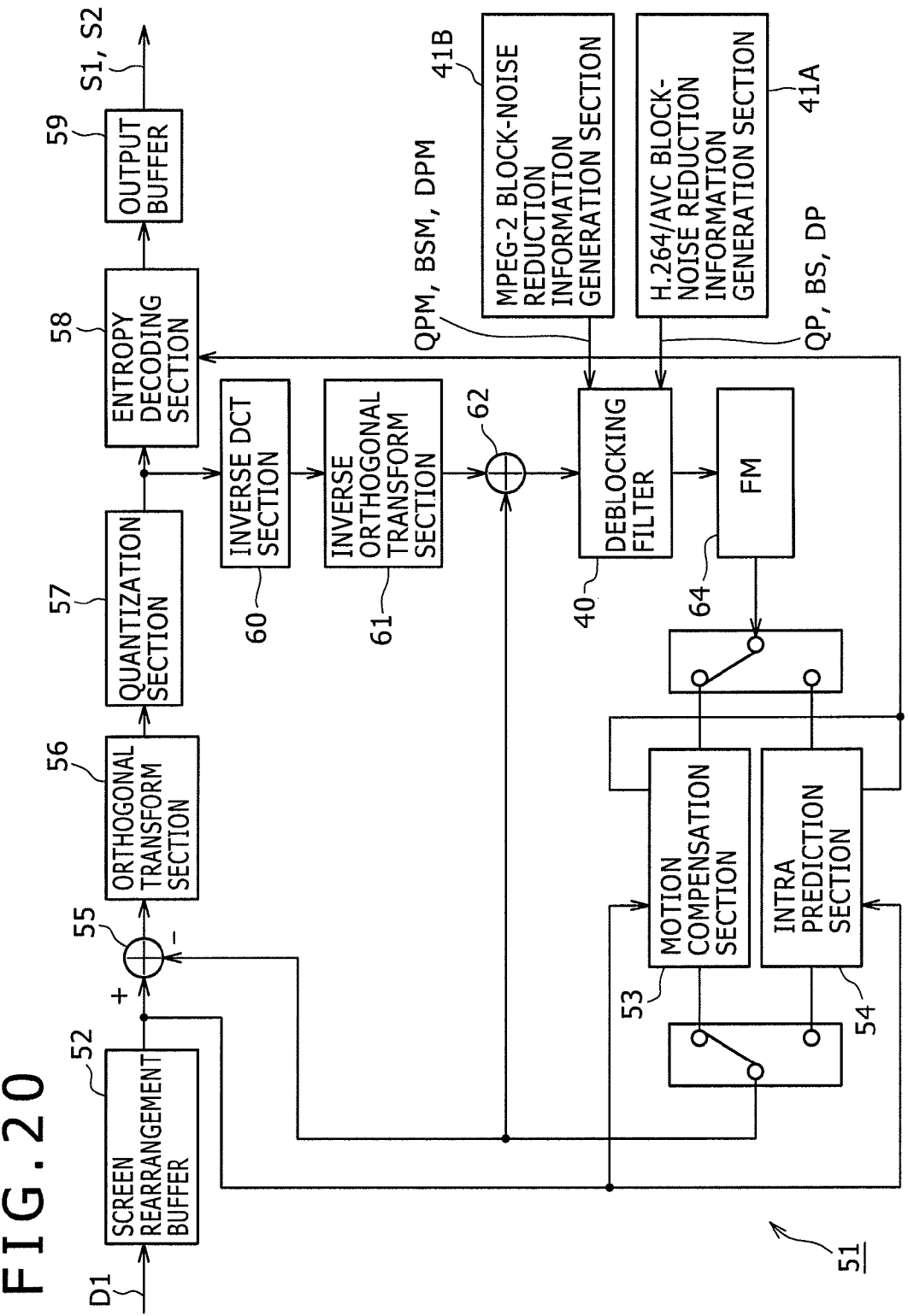
FIG. 20 is a block diagram showing a coding apparatus 51 according to a third embodiment of the present invention.
Figure 21:
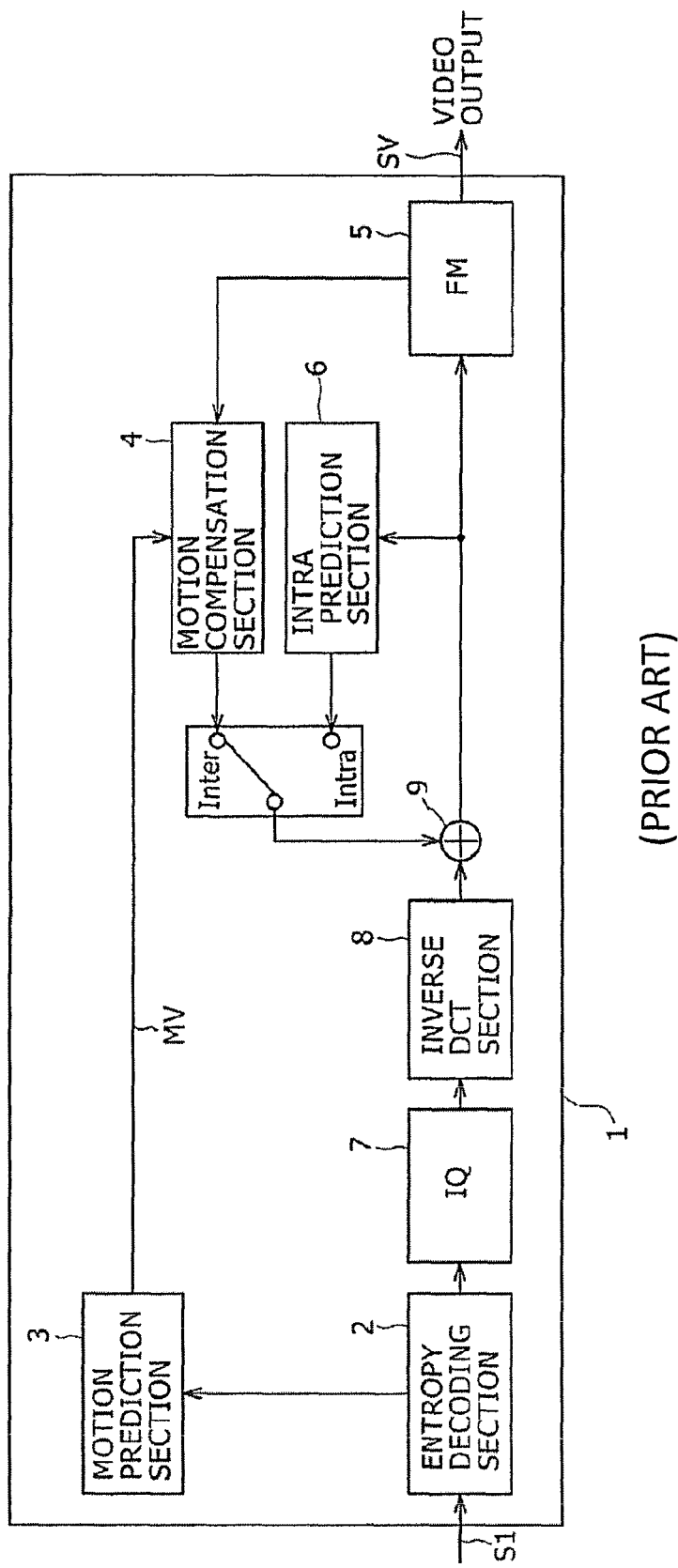
FIG. 21 is a block diagram showing the existing MPEG-2 decoding apparatus 1.
Figure 22:
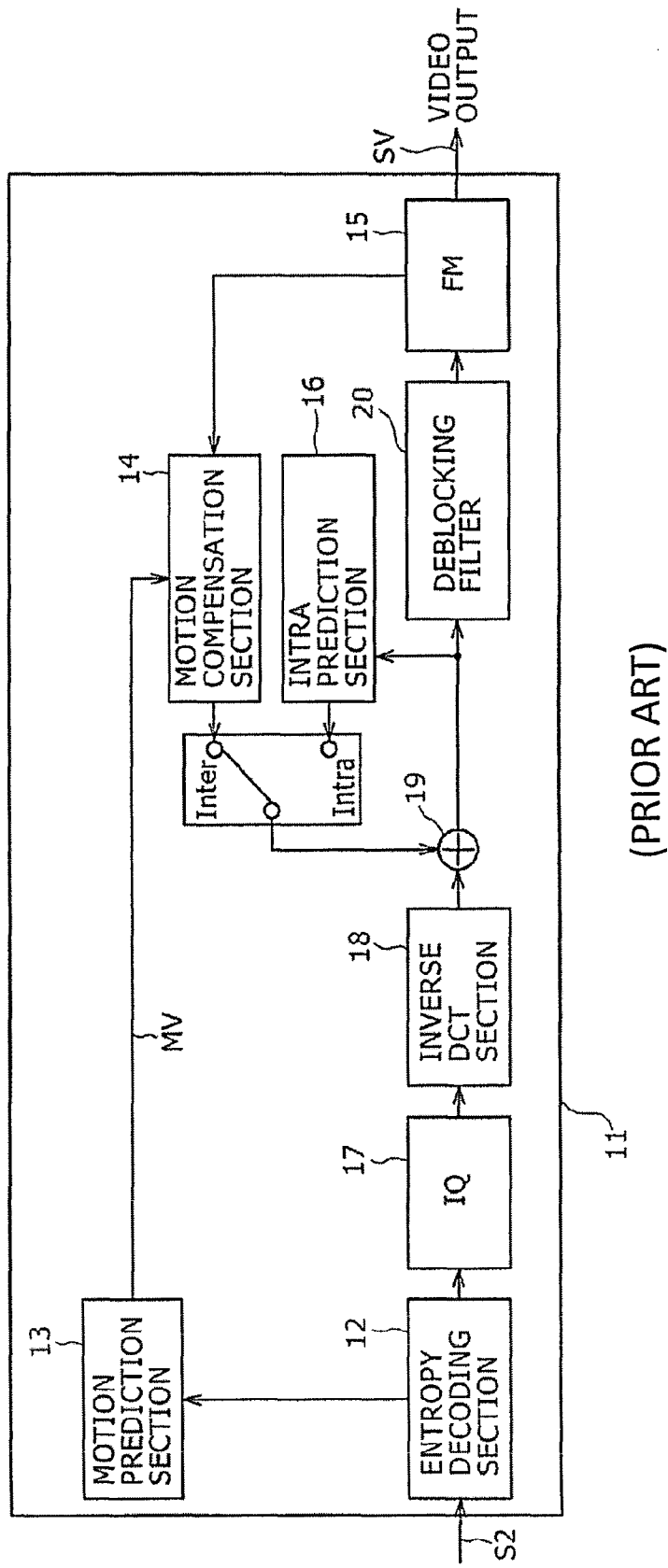
FIG. 22 is a block diagram showing the existing H.264/AVC decoding apparatus 11.
Figure 23:
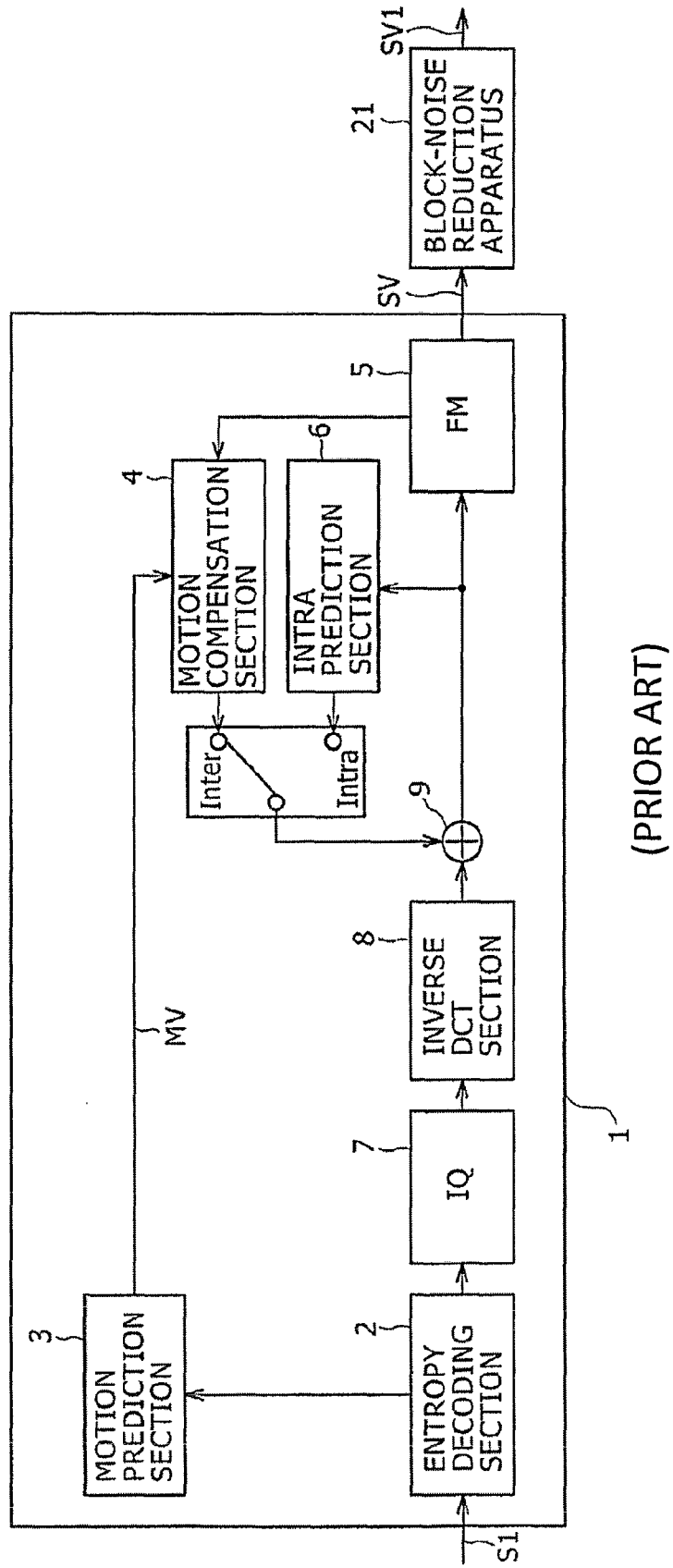
FIG. 23 is a block diagram showing the existing MPEG-2 decoding apparatus 1 provided with a block-noise reduction apparatus 21 for removing block noises.

FIG. 20 is a block diagram showing a coding apparatus 51 according to a third embodiment of the present invention. The coding apparatus 51 is a coding apparatus capable of generating both an MPEG-2 bit stream S1 and an H.264/AVC bit stream S2. The coding apparatus 51 is provided with a controller for switching the components employed in the coding apparatus 51 from coding operations for the MPEG-2 bit stream S1 to coding operations for the H.264/AVC bit stream S2 and vice versa so as to enable the coding apparatus 51 to generate an MPEG-2 bit stream S1 or an H.264/AVC bit stream S2. The controller itself is not shown in the figure though. It is to be noted that components employed in the coding apparatus 51 shown in the block diagram of FIG. 20 as components identical with their respective counterparts employed in the decoding apparatus 31 shown in the block diagram of FIG. 2 are denoted by the same reference numerals as the counterparts and the explanation of the identical components is omitted in order to avoid duplications of descriptions.

In the coding apparatus 51, a screen rearrangement buffer 52 is used for rearranging pictures of picture data D1 in accordance with picture types of the pictures and outputting data obtained as a result of the rearrangement to a subtraction section 55, a motion compensation section 53 and an intra prediction section 54. The motion compensation section 53 is a section for generating a predicted value of an inter coding process and outputting the predicted value to a subtraction section 55 whereas the intra prediction section 54 is a section for generating a predicted value of an intra coding process and outputting the predicted value to the subtraction section 55. The subtraction section 55 is a section for subtracting a predicted value output by the motion compensation section 53 or the intra prediction section 54 from the data output by the screen rearrangement buffer 52 as the result of the rearrangement process in order to compute a prediction error and outputting the error to an orthogonal transform section 56.

The orthogonal transform section 56 is a section for carrying out an orthogonal transform process on the prediction error received from the subtraction section 55 and outputting the result of the orthogonal transform process to a quantization section 57. The quantization section 57 is a section for quantizing data received from the orthogonal transform section 56 as the result of the orthogonal transform process and supplying the result of the quantization to an entropy decoding section 58 and an inverse quantization section 60. The entropy decoding section 58 is a section for carrying out an entropy coding process on the data received from the quantization section 57 as the result of the quantization and outputting by the result of the entropy coding process to an output buffer 59. The output buffer 59 is a memory used for adding information such as a motion vector MV to data generated by the entropy decoding section 58 as the result of the entropy coding process in order to generate an MPEG-2 bit stream S1 or an H.264/AVC bit stream S2.

The inverse quantization section 60 is a section for carrying out an inverse quantization process on data output by the quantization section 57 as the result of the inverse quantization process and outputting the result of the inverse quantization process to an inverse orthogonal transform section 61. The inverse orthogonal transform section 61 is a section for carrying out an inverse orthogonal transform process on data supplied by the inverse quantization section 60 as the result of the inverse quantization process in order to generate the prediction error as a result of decoding processing including the inverse quantization process carried out by the inverse quantization section 60 and the inverse orthogonal transform process carried out by the inverse orthogonal transform section 61. The inverse orthogonal transform section 61 outputs the prediction error to an addition section 62. The addition section 62 is a section for adding the prediction error received from the inverse orthogonal transform section 61 to the predicted value output by the motion compensation section 53 or the intra prediction section 54 in order to generate the picture data D1 as a result of decoding processing including the inverse quantization process carried out by the inverse quantization section 60, the inverse orthogonal transform process carried out by the inverse orthogonal transform section 61 and the addition operation carried out by the addition section 62. The addition section 62 outputs the picture data D1 to a deblocking filter 40. In the coding apparatus 51, the deblocking filter 40 functions as a section for removing block noises from picture data generated by the screen rearrangement buffer 52 as the picture data D1 and stores the picture data without the block noises in a frame memory (FM) 64 as reference picture data.

In the coding apparatus 51, an H.264/AVC block-noise reduction information generation section 41A sets filtering-location identifying information DP, boundary-strength determination information BS and a quantization parameter QP whereas an MPEG-2 block-noise reduction information generation section 41B sets filtering-location identifying information DPM, boundary-strength determination information BSM and a quantization parameter QPM. The H.264/AVC block-noise reduction information generation section 41A and the MPEG-2 block-noise reduction information generation section 41B supply the filtering-location identifying information DP, the boundary-strength determination information BS the quantization parameter QP, the filtering-location identifying information DPM, the boundary-strength determination information BSM and the quantization parameter QPM to the deblocking filter 40. It is to be noted that, in the same way as the decoding apparatus 31 described earlier, the H.264/AVC block-noise reduction information generation section 41A sets filtering-location identifying information DP, boundary-strength determination information BS and a quantization parameter QP on the basis of information extracted from an H.264/AVC bit stream S2 whereas the MPEG-2 block-noise reduction information generation section 41B sets filtering-location identifying information DPM, boundary-strength determination information BSM and a quantization parameter QPM on the basis of information extracted from an MPEG-2 bit stream S1. As an alternative, on the basis of necessary information received from sections such as the orthogonal transform section 56, the H.264/AVC block-noise reduction information generation section 41A sets filtering-location identifying information DP, boundary-strength determination information BS and a quantization parameter QP whereas the MPEG-2 block-noise reduction information generation section 41B sets filtering-location identifying information DPM, boundary-strength determination information BSM and a quantization parameter QPM. In addition, the MPEG-2 block-noise reduction information generation section 41B may supply the filtering-location identifying information DPM, the boundary-strength determination information BSM and the quantization parameter QPM to a decoding apparatus by including the filtering-location identifying information DPM, the boundary-strength determination information BSM and the quantization parameter QPM in an MPEG-2 bit stream S1 obtained as a result of the coding processing.

By making use the coding apparatus 51 designed in accordance with the third embodiment, it is possible to obtain the same effects as the first embodiment.

Fourth Embodiment

The embodiments described so far apply the present invention to the coding apparatus 51 capable of coding bit streams S2 and S1 by adoption of both the H.264/AVC and MPEG-2 coding/decoding methods respectively and the decoding apparatus 31 capable of decoding bit streams S2 and S1, which are received from the coding apparatus 51, by adoption of both the H.264/AVC and MPEG-2 coding/decoding methods respectively. However, the application scope of the embodiments of the present invention is by no means limited to the embodiments. For example, the embodiments of the present invention can also be applied to a wide range of coding and decoding apparatus including coding and decoding apparatus for processing bit streams by adoption of the MPEG-2 coding/decoding method and coding and decoding apparatus for processing bit streams for processing bit streams by adoption of both the MPEG-2 coding/decoding method and a method other than the H.264/AVC coding/decoding method.

In addition, the embodiments described so far apply the present invention to apparatus for processing an MPEG-2 bit stream S1 by making use of the deblocking filter 40 designed for the H.264/AVC coding/decoding method. However, the application scope of the embodiments of the present invention is by no means limited to the embodiments. For example, the embodiments of the present invention can also be applied to a wide range of apparatus including an apparatus for processing a bit stream conforming to a coding method of the same type as the MPEG-2 coding/decoding method by making use of the deblocking filter 40 designed for a coding method of the same type as the H.264/AVC coding/decoding method.

INDUSTRIAL APPLICABILITY

The embodiments of the present invention can be applied to a decoding apparatus capable of decoding bit streams typically conforming to both the H.264/AVC and coding/decoding methods.

It should be understood by those skilled in the art that various modifications, combinations, sub-combinations and alterations may occur depending on design requirements and other factor in so far as they are within the scope of the appended claims or the equivalents thereof.

What is claimed is:

1. A picture processing apparatus for carrying out decoding processing to produce picture data from a MPEG-2 bit stream generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation unit of said picture data and the true value of said picture data, said picture processing apparatus comprising:

an inverse orthogonal transform section configured to carry out an inverse orthogonal transform process as a part of said decoding processing in order to generate said prediction error;

a predicted-value generation section configured to generate said predicted value;

an addition section configured to carry out an addition operation as a part of said decoding processing so as to add said predicted value generated by said predicted-value generation section to said prediction error generated by said inverse orthogonal transform section as a result of said inverse orthogonal transform process in order to generate said picture data;

a deblocking filter configured to carry out a filtering process of removing block noises from said picture data output by said addition section for the MPEG-2 bit stream as a result of said addition operation on the basis of filtering-location identifying information used for indicating the position of a subject of said filtering process, boundary-strength determination information used for indicating the strength of said fettering process and a quantization parameter; and a control section configured to set (a) said filtering-location identifying information, (b) said boundary-strength determination information and (c) said quantization parameter from said MPEG-2 bit stream and supplying said filtering-location identifying information, said boundary-strength determination information as well as said quantization parameter to said deblocking filter, wherein, when said control section determines a macroblock has a field structure, said control section set said boundary-strength determination information for vertical-direction inter-center-line gap filter processing by said deblocking filter, wherein said control section sets said boundary-strength determination information in accordance with whether an intra coding process or an inter-coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, said control section sets said boundary-strength determination information so that said strength of said filtering process becomes large in comparison with a case in which said adjacent orthogonal transform process units have the same prediction mode.

2. The picture processing apparatus according to claim 1, wherein if said bit stream is a skip stream, said control section sets said boundary-strength determination information at a value that indicates that said filtering process is not to be carried out by said deblocking filter.

3. The picture processing apparatus according to claim 1, wherein if modes of said orthogonal transform process in adjacent orthogonal transform process units are different from each other, said control section sets said boundary-strength determination information at a value that indicates that said filtering process is to be carried out by said deblocking filter at a strength greater than a case in which said adjacent orthogonal transform process units have the same mode of said orthogonal transform process.

4. A picture processing apparatus for carrying out decoding processing to produce picture data selectively from one of a first bit stream of MPEG-2 generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation unit of said picture data and the true value of said picture data, and a second bit stream of H.264 AVC generated previously in processing performed typically by a coding apparatus to code said picture data by setting picture types for each frame and by carrying out said orthogonal transform process for each orthogonal transform process unit of said picture data on said prediction error, said picture processing apparatus comprising:
  an inverse orthogonal transform section configured to carry out an inverse orthogonal transform process as a part of said decoding processing in order to generate said prediction error;
  a predicted-value generation section configured to generate said predicted value;
  an addition section configured to carry out an addition operation as a part of said decoding processing so as to add said predicted value generated by said predicted-value generation section to said prediction error generated by said inverse orthogonal transform section as a result of said inverse orthogonal transform process in order to generate said picture data;
  a deblocking filter configured to carry out a filtering process of removing block noises from said picture data output by said addition section for one of the first bit stream and the second bit stream as a result of said addition operation on the basis of filtering-location identifying information used for indicating the position of a subject of said filtering process, boundary-strength determination information used for indicating the strength of said filtering process and a quantization parameter; and
  a control section configured to set (a) said filtering-location identifying information, (b) said boundary-strength determination information and (c) said quantization parameter from said first bit stream and said second bit stream and supplying said filtering-location identifying information, said boundary-strength determination information as well as said quantization parameter to said deblocking filter, wherein, for the first bit stream when said control section determines a macroblock has a field structure, said control section set said boundary-strength determination information for vertical-direction inter-center-line gap filter processing by said deblocking filter,
  wherein said control section sets said boundary-strength determination information in accordance with whether an intra coding process or an inter coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, in a process carried out by said control section in order to generate said boundary-strength determination information from said first bit stream, said control section sets said boundary-strength determination information so that said strength of said filtering process becomes large in comparison with a case in which said adjacent orthogonal transform process units have the same prediction mode.

5. A picture processing method for carrying out decoding processing to produce picture data from a MPEG-2 bit stream generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation unit of said picture data and the true value of said picture data, said picture processing method comprising the steps of:
  carrying out an inverse orthogonal transform process as a part of said decoding processing in order to generate said prediction error;
  generating said predicted value;
  carrying out an addition operation as a part of said decoding processing so as to add said predicted value generated at said predicted-value generation step to said prediction error generated at said inverse orthogonal transform step as a result of said inverse orthogonal transform process in order to generate said picture data;
  carrying out a filtering process of removing block noises from said picture data output at said addition step for the MPEG-2 bit stream as a result of said addition operation on the basis of filtering-location identifying information used for indicating the position of a subject of said filtering process, boundary-strength determination information used for indicating the strength of said filtering process and a quantization parameter; and
  setting (a) said filtering-location identifying information, (b) said boundary-strength determination information and (c) said quantization parameter from said MPEG-2 bit stream and supplying said filtering-location identifying information, said boundary-strength deter determination information as well as said quantization parameter to said deblocking filtering process step, wherein, when said control section determines a macroblock has a field structure, said control section set said boundary-strength determination information for vertical-direction inter-center-line gap filter processing by said deblocking filter,
  wherein said setting step is carried out to set said boundary-strength determination information in accordance with whether an intra coding process or an inter coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, said boundary-strength determination information is set so that said strength of said filtering process becomes large in comparison with a case in which said adjacent orthogonal transform process units have the same prediction mode.

6. A picture processing method for carrying out decoding processing to produce picture data selectively from one of a first bit stream of MPEG-2 generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation unit of said picture data and the true value of said picture data, and a second bit stream of H.264 AVC generated previously in processing performed typically by a coding apparatus to code said picture data by setting picture types for each frame and by carrying out said orthogonal transform process for each orthogonal transform process unit of said picture data on said prediction error, said picture processing method comprising the steps of:

carrying out an inverse orthogonal transform process as a part of said decoding processing in order to generate said prediction error;

generating said predicted value;

carrying out an addition operation as a part of said decoding processing so as to add said predicted value generated at said predicted-value generation step to said prediction error generated at said inverse orthogonal transform step as a result of said inverse orthogonal transform process in order to generate said picture data;

carrying out a filtering process of removing block noises from said picture data output by said addition step for one of the first bit stream and the second bit stream as a result of said addition operation on the basis of filtering-location identifying information used for indicating the position of a subject of said filtering process, boundary-strength determination information used for indicating the strength of said filtering process and a quantization parameter; and setting (a) said filtering-location identifying information, (b) said boundary-strength determination information and (c) said quantization parameter from said first bit stream and said second bit stream and supplying said filtering-location identifying information, said boundary-strength determination information as well as said quantization parameter to said deblocking filtering process step, wherein, for the first bit stream when said control section determines a macroblock has a field structure, said control section set said boundary-strength determination information for vertical-direction inter-center-line gap filter processing by said deblocking filter, wherein said setting step is carried out to set said boundary-strength determination information in accordance with whether an intra coding process or an inter coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, in a process to generate said boundary-strength determination information from said first bit stream, said boundary-strength determination information is set so that said strength of said filtering process becomes large in comparison with a case in which said adjacent orthogonal transform process units have the same prediction mode.

7. A computer program recorded on a non-transitory computer-readable medium, said program implementing a picture processing method for carrying out decoding processing to produce picture data from a MPEG-2 bit stream generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation unit of said picture data and the true value of said picture data, said program comprising the steps of:

carrying out an inverse orthogonal transform process as a part of said decoding processing in order to generate said prediction error;

generating said predicted value;

carrying out an addition operation as a part of said decoding processing so as to add said predicted value generated at said predicted-value generation step to said prediction error generated at said inverse orthogonal transform step as a result of said inverse orthogonal transform process in order to generate said picture data;

carrying out a filtering process of removing block noises from said picture data output at said addition step for the MPEG-2 bit stream as a result of said addition operation on the basis of filtering-location identifying information used for indicating the position of a subject of said filtering process, boundary-strength determination information used for indicating the strength of said filtering process and a quantization parameter; and setting (a) said filtering-location identifying information, (b) said boundary-strength determination information and (c) said quantization parameter from said MPEG-2 bit stream and supplying said filtering-location identifying information, said boundary-strength determination information as well as said quantization parameter to said deblocking filtering process step, wherein, when said control section determines a macroblock has a field structure, said control section set said boundary-strength determination information for vertical-direction inter-center-line gap filter processing by said deblocking filter, wherein said setting step is carried out to set said boundary-strength determination information in accordance with whether an intra coding process or an inter coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, said boundary-strength determination information is set so that said strength of said filtering process becomes large in comparison with a case in which said adjacent orthogonal transform process units have the same prediction mode.

8. A computer program recorded on a non-transitory computer-readable medium, said program implementing a picture processing method for carrying out decoding processing to produce picture data selectively from a first bit stream of MPEG-2 generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation unit of said picture data and the true value of said picture data, and a second bit stream of H.264 AVC generated previously in processing performed typically by a coding apparatus to code said picture data by setting picture types for each frame and by carrying out said orthogonal transform process for each orthogonal transform process unit of said picture data on said prediction error, said program comprising the steps of:

carrying out an inverse orthogonal transform process as a part of said decoding processing in order to generate said prediction error;

generating said predicted value;

carrying out an addition operation as a part of said decoding processing so as to add said predicted value generated at said predicted-value generation step to said prediction error generated at said inverse orthogonal transform step as a result of said inverse orthogonal transform process in order to generate said picture data;

carrying out a filtering process of removing block noises from said picture data output by said addition step for one of the first bit stream and the second bit stream as a result of said addition operation on the basis of filtering-location identifying information used for indicating the position of a subject of said filtering process, boundary-strength determination information used for indicating the strength of said filtering process and a quantization parameter; and setting (a) said filtering-location identifying information, (b) said boundary-strength determination information and (c) said quantization parameter from said first bit stream and said second bit stream and supplying said filtering-location identifying information, said boundary-strength determination information as well as said quantization parameter to said deblocking filtering process step, wherein, for the MPEG-2 bit stream when said control section determines a macroblock has a field structure, said control section set said boundary-strength determination information for vertical-direction inter-center-line gap filter processing by said deblocking filter, wherein said setting step is carried out to set said boundary-strength determination information in accordance with whether an intra coding process or an inter coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, in a process to generate said boundary-strength determination information from said first bit stream, said boundary-strength determination information is set so that said strength of said filtering process becomes large in comparison with a case in which said adjacent orthogonal transform process units have the same prediction mode.

9. A non-transitory computer-readable medium used for recording a program implementing a picture processing method for carrying out decoding processing to produce picture data from a MPEG-2 bit stream generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation unit of said picture data and the true value of said picture data, said program comprising the steps of:

carrying out an inverse orthogonal transform process as a part of said decoding processing in order to generate said prediction error;

generating said predicted value;

carrying out an addition operation as a part of said decoding processing so as to add said predicted value generated at said predicted-value generation step to said prediction error generated at said inverse orthogonal transform step as a result of said inverse orthogonal transform process in order to generate said picture data;

carrying out a filtering process of removing block noises from said picture data output at said addition step for the MPEG-2 bit stream as a result of said addition operation on the basis of filtering-location identifying information used for indicating the position of a subject of said filtering process, boundary-strength determination information used for indicating the strength of said filtering process and a quantization parameter; and setting (a) said filtering-location identifying information, (b) said boundary-strength determination information and (c) said quantization parameter from said MPEG-2 bit stream and supplying said filtering-location identifying information, said boundary-strength determination information as well as said quantization parameter to said deblocking filtering process step, wherein, when said control section determines a macroblock has a field structure, said control section set said boundary-strength determination information for vertical-direction inter-center-line gap filter processing by said deblocking filter, wherein said setting step is carried out to set said boundary-strength determination information in accordance with whether an intra coding process or an inter coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, said boundary-strength determination information is set so that said strength of said filtering process becomes large in comparison with a case in which said adjacent orthogonal transform process units have the same prediction mode.

10. A non-transitory computer-readable medium used for recording a program implementing a picture processing method for carrying out decoding processing to produce picture data selectively from a first bit stream of MPEG-2 generated previously in processing performed typically by a coding apparatus to code said picture data by selection of setting of picture types from a frame structure of said picture data and from a field structure of said picture data and by execution of an orthogonal transform process for each orthogonal transform process unit of said picture data on a prediction error, which is a difference between a predicted value generated for each predicted-value generation it of said picture data and the true value of said picture data, and a second bit stream of H.264 ACV generated previously in processing performed typically by a coding apparatus to code said picture data by setting picture types for each frame and by carrying out said orthogonal transform process for each orthogonal transform process unit of said picture data on said prediction error, said program comprising the steps of:

carrying out an inverse orthogonal transform process as a part of said decoding processing in order to generate said prediction error;

generating said predicted value;

carrying out an addition operation as a part of said decoding processing so as to add said predicted value generated at said predicted-value generation step to said prediction error generated at said inverse orthogonal transform step as a result of said inverse orthogonal transform process in order to generate said picture data;

carrying out a filtering process of removing block noises from said picture data output by said addition step for one of the first bit stream and the second bit stream as a result of said addition operation on the basis of filtering-location identifying information used for indicating the position of a subject of said filtering process, boundary-strength determination information used for indicating the strength of said filtering process and a quantization parameter; and setting (a) said filtering-location identifying information, (b) said boundary-strength determination information and (c) said quantization parameter from said first bit stream and said second bit stream and supplying said filtering-location identifying information, said boundary-strength determination information as well as said quantization parameter to said deblocking filtering process step, wherein, for the first bit stream when said control section determines a macroblock has a field structure, said control section set said boundary-strength determination information for vertical-direction inter-center-line gap filter processing by said deblocking filter, wherein said setting step is carried out to set said boundary-strength determination information in accordance with whether an intra coding process or an inter coding process has been carried out on adjacent predicted-value generation units and in accordance with whether or not a boundary between adjacent orthogonal transform process units coincides with a boundary between said predicted-value generation units and, wherein if prediction modes for generating said predicted values in adjacent orthogonal transform process units are different from each other, in a process to generate said boundary-strength determination information from said first bit stream, said boundary-strength determination information is set so that said strength of said filtering process becomes large in comparison with a case in which said adjacent orthogonal transform process units have the same prediction mode.

* * * * *